United States Patent
Yegingil et al.

(10) Patent No.: US 12,247,151 B2
(45) Date of Patent: Mar. 11, 2025

(54) DOPED BeO COMPOUNDS FOR OPTICALLY STIMULATED LUMINESCENCE (OSL) AND THERMOLUMINESCENCE (TL) RADIATION DOSIMETRY

(71) Applicants: THOMAS JEFFERSON UNIVERSITY, Philadelphia, PA (US); CUKUROVA UNIVERSITY, Saricam (TR)

(72) Inventors: Zehra Yegingil, Adana (TR); Enver Bulur, Ankara (TR); Volkan Altunal, Adana (TR); Yan Yu, Philadelphia, PA (US); Veysi Guckan, Adana (TR); Adam Dicker, Merion Station, PA (US)

(73) Assignees: Thomas Jefferson University, Philadelphia, PA (US); Cukurova University (TR)

( * ) Notice: Subject to any disclaimer, the term of this patent is extended or adjusted under 35 U.S.C. 154(b) by 1042 days.

(21) Appl. No.: 17/252,520

(22) PCT Filed: Jun. 17, 2019

(86) PCT No.: PCT/US2019/037487
§ 371 (c)(1),
(2) Date: Dec. 15, 2020

(87) PCT Pub. No.: WO2019/241781
PCT Pub. Date: Dec. 19, 2019

(65) Prior Publication Data
US 2021/0261861 A1     Aug. 26, 2021

Related U.S. Application Data

(60) Provisional application No. 62/685,649, filed on Jun. 15, 2018.

(51) Int. Cl.
C09K 11/77    (2006.01)
C01F 3/02     (2006.01)
G01T 1/10     (2006.01)

(52) U.S. Cl.
CPC .......... *C09K 11/7774* (2013.01); *C01F 3/02* (2013.01); *C09K 11/7769* (2013.01); *G01T 1/10* (2013.01);
(Continued)

(58) Field of Classification Search
CPC . C09K 11/7774; C09K 11/7769; C09K 11/55; C09K 11/64; C09K 11/7715;
(Continued)

(56) References Cited

U.S. PATENT DOCUMENTS 3,637,518 A * 1/1972 Nada .................... C04B 35/645
                                                252/301.4 F
4,224,519 A   9/1980 Gammage et al.
(Continued)

FOREIGN PATENT DOCUMENTS

RU        2141120 C1    11/1999

OTHER PUBLICATIONS

International Search Report and Written Opinion dated Sep. 9, 2019 for International Application No. PCT/US19/37487.
(Continued)

*Primary Examiner* — Andrew J. Oyer
(74) *Attorney, Agent, or Firm* — Saul Ewing LLP; Domingos J. Silva; Kathryn Doyle

(57) ABSTRACT

The present invention relates generally in part to BeO-based compounds that are capable of storing at least part of the energy of incident ionizing radiation and releasing at least part of the stored energy upon optical stimulation and heating. BeO-based compounds dosimetry was also developed in instrumentation, application and fundamental inves-
(Continued)

tigations. The present disclosure further relates the to the investigation of a BeO-based optically stimulated luminescence (OSL) dosimeter together with an OSL reader, and discusses the design and operation of an OSL reader, suitable to measure OSL emission of BeO-based dosimeters, for example beryllium oxide doped with sodium, dysprosium and erbium. The present disclosure further relates to the use of BeO-based compounds comprising BeO and at least one dopant selected from the group consisting of sodium, dysprosium and erbium as a fiber-coupled OSL dosimeter.

16 Claims, 50 Drawing Sheets

(52) U.S. Cl.
CPC ...... *C01P 2002/52* (2013.01); *C01P 2002/70* (2013.01); *C01P 2006/37* (2013.01)

(58) Field of Classification Search
CPC .......... C09K 11/7766; C01F 3/02; C01F 3/00; G01T 1/10; C01P 2002/52; C01P 2002/70; C01P 2006/37; C04B 35/632; C04B 2235/3203; C04B 2235/3206; C04B 2235/3208; C04B 2235/3217; C04B 2235/3227; C04B 2235/3229; C04B 2235/3275; C04B 2235/3281; C04B 35/6267; C04B 35/62675; C04B 35/63444; C04B 2235/443; C04B 2235/448; C04B 2235/3201; C04B 2235/3224; C04B 2235/604; C04B 35/08
See application file for complete search history.

(56) References Cited

U.S. PATENT DOCUMENTS

| 4,956,559 A | 9/1990 | Shiraishi |
|---|---|---|
| 2013/0248721 A1 | 9/2013 | Williams |

OTHER PUBLICATIONS

Santos, et al., "Characterization of a real-time fiber-coupled beryllium oxide (BeO) luminescence dosimeter in X-ray beams", Radiat Meas; 53, 2013, 1-7.

Huston, et al., "Optically stimulated luminescent glass optical fibre dosimeter", Radiat Prot Dosimetry; 101, 2002, 23-6.

Jahn, et al., "Progress in 2D-OSL-dosimetry with beryllium oxide", Radiation Measurements 46.12: Fig 1; abstract; p. 1908, col. 1; p. 1909, col. 1 [online] URL <https://www.sciencedirect.com/science/article/pii/S 1350448711003027>, 2011, 1908-1911.

Jahn, et al., "The BeOmax system—Dosimetry using OSL of BeO for several applications", Radiat. Meas., vol. 56, Sep. 2013, 324-327.

Magnes, et al., "Fiber optic remote gamma dosimeters based on optically stimulated luminescence: State-of-theart at CEA", Paper Presented at 11th International Congress of the International Radiation Protection Association, Madrid, Spain, 2004.

Polf, et al., "A real-time, fibre optic dosimetry system using Al2O3 fibres", Radiat Prot Dosimetry; 100, 2002, 301-4.

Pradhan, et al., "Glycosphingolipids in the Regulation of the Nervous System", Journal of medical physics/Association of Medical Physicists of India 33.3: 85, col. 1 [online], 2008, 91.

Santos, et al., "Evaluation of a real-time BeO ceramic fiber-coupled luminescence dosimetry system for dose verification of high dose rate brachytherapy", Med. Phys., vol. 42, No. 11, Oct. 2015, 6349-6356.

Santos, et al., "Investigation of a fibre-coupled beryllium oxide (BeO) ceramic luminescence dosimetry system", Radiat. Meas., vol. 70,, Nov. 2014, 52-58.

Sommer, et al., "A mm-Scale Dosimetry System Based on Optically Stimulated Luminescence of Beryllium Oxide for Investigation of Dose Rate Profiles in Constricted Environments", WM2012 Conference, Feb. 26-Mar. 1, 2012, Phoenix, AZ.

Sommer, et al., "A new personal dosimetry system for HP(IO) and HP(0.07) photon dose based on OSL dosimetry of beryllium oxide", Radiation Measurements, 46, 2011, 1818-1821.

Sommer, et al., "Beryllium oxide as optically stimulated luminescence dosimeter", Radiation Measurements, 43, 2008, 353-356.

Sommer, et al., "New aspects of a BeO-based optically stimulated luminescence dosimeter", Radiation Measurements, 42, 617-620, 2007, 617-620.

Teichmann, et al., "Real time dose rate measurements with fiber optic probes based on the RL and OSL of beryllium oxide", Radiat. Meas., vol. 90, Jul. 2016, 201-204.

Yukihara, "Luminescence properties of BeO optically stimulated luminescence (OSL) detectors", Radiat. Meas., vol. 46, No. 6-7, Jun. 2011, 580-587.

\* cited by examiner

DOPED BeO COMPOUNDS FOR OPTICALLY STIMULATED LUMINESCENCE (OSL) AND THERMOLUMINESCENCE (TL) RADIATION DOSIMETRY

CROSS-REFERENCE TO RELATED APPLICATIONS

The present application is a 35 U.S.C. § 371 national phase application from, and claims priority to, PCT International Patent Application No. PCT/US2019/037487, filed Jun. 17, 2019, which claims priority under 35 U.S.C. § 119 (e) to U.S. Provisional Application No. 62/685,649, filed Jun. 15, 2018, all of which are hereby incorporated by reference herein in their entireties.

FIELD OF INVENTION

This application is generally related a dosimetric system using optically stimulated luminescence (OSL) and thermoluminescence (TL) of BeO based ceramic dosimeters and an OSL reader for the detection of ionizing radiation. A simple OSL treatment has been developed performing stimulation of BeO based compounds with blue light LEDs and reading of luminescence at all exposure levels.

BACKGROUND OF INVENTION

About OSL

TL dosimeters are widely used for measurements of the ionizing radiation dose originated from the exposure to X-rays, gamma rays, beta particles, alpha particles and neutrons. TL is a two-step process: a) creation of free electrons and holes by ionizing radiation and subsequent trapping of these charge carriers at the lattice defects (traps) b) eviction of the trapped charge by heating the dosimeter at controlled rate to high temperatures; following by a radiative electron-hole recombination resulting in the TL. The integrated emitted luminescence intensity can be used to determine the radiation dose. This type of dosimeter typically requires an expensive reader and the dose information can only be read once.

The phenomenological principles of the OSL and TL are the same. Whereas in TL the signal of emitted luminescence is obtained by heating the sample previously exposed to ionizing radiation, for OSL the signal is obtained by shining a beam of light onto it; in both cases the signal, which is luminescence emitted by material, is measured by means of a highly sensitive device, usually a photomultiplier. The use of OSL is a promising way to satisfy all dosimetric requirements for a phosphor (McKeever, 2001). Reusability of dosimeters, multiple reading procedures and the possibility of local (point) stimulation are advantages of OSL compared with, for example, TL dosimeters.

The first suggestion for optically stimulated luminescence (OSL) was as a potential radiation dosimetry tool in 1955 by Antonov-Romanovskii. He suggested using infra-red light to stimulate luminescence from irradiated strontium sulfide (Antonov-Romanovskii, et al., 1955). Braiunlich et al., (1967) and Sanborn and Beard (1967) studied the infra-red (IR) stimulated luminescence of sulfides, continuously monitored during the light exposure. Because the studied materials have high effective atomic numbers they performed unacceptable energy dependence. Besides, the OSL measurements suffered from thermal instability. Consequently, the use of IR-stimulated OSL from sulfides in dosimetry has not become established. Wider band gap materials with acceptable effective atomic numbers were worked by several groups. For example, delayed OSL of BeO was studied by Rhyner and Miller (1970). They exposed beryllium oxide samples to irradiation and subjected the irradiated materials to visible light for a specified period of time (up to 15 s). After a >2 s delay following the light exposure the luminescence from the sample is monitored for a preset time (up to 120 s). In this study, a single light stimulation period was used.

OSL method, as a dosimeter, was first used to measure quartz for dating sediments and archaeological samples (Huntley et al., 1985; Smith, 1990). Here, the goal is to determine the radiation dose absorbed by natural materials (archaeological artifacts and geological samples) exposed to background radiation after crystal formation. They monitored the OSL emission simultaneous with the light stimulation by keeping the stimulating light on the sample until the OSL signal has decayed to below the level of detection, i.e. the method of use is the CW-mode. In this mode, light stimulation and measurement of luminescence are made simultaneously and the luminescence system requires heavy filtering to discriminate between the stimulation light and the luminescence. Generally, these are of different wavelengths and one or other can be eliminated by the appropriate choice of optical filters.

It has been now used for more than 20 years as a method for monitoring occupational radiation dose (Yoder and Salasky, 1995). OSL dosimeters have been replaced with film badges. The OSL materials have been fabricated into a dosimeter that can be used for in vivo dosimetry for radiology and radiotherapy patients. The technique is currently used worldwide for radiation dosimetry using carbon-doped aluminum oxide ($Al_2O_3$:C) as the detector material (McKeever et al., 1999). The OSL technique has achieved commercial success because of the unique combination of optical readout, which provides precise control over the stimulation, and the properties of $Al_2O_3$:C. $Al_2O_3$:C has a high sensitivity to ionizing radiation and an OSL response that is linear with dose over several orders of magnitude (Akselrod et al., 1998a). In spite of these attractive features, the effective atomic number of $Al_2O_3$:C ($Z_{eff}$=11.3) and the lack of alternative OSL materials have been pointed out as disadvantages of the OSL technique (McKeever and Moscovitch, 2003). The effective atomic number of $Al_2O_3$:C causes the material to over-respond to low energy X-rays by a factor of up to ~3.5 (Bos, 2001). In this context, BeO offers an alternative to $Al_2O_3$:C in OSL dosimetry.

About BeO

Beryllium (Be) is a metal with unusual properties and is used in specific applications in the industry. Examples are found in copper, magnesium, and aluminum where it gives hardness and retains its good thermal and electrical conductivity. These properties are exploited in various applications in industry. Beryllium ceramics have found wide application in electronic industry, specifically for dissipation of the heat released during operation of radioelements of functional electronics. Beryllium oxide (BeO) is perhaps the most important material for thermal management of semiconductor devices. This ceramic material is an electrical insulator with a thermal conductivity higher than any other non-metal except diamond. Due to its unique features such as high heat conductivity (as high as that of aluminum), high electrical resistivity (>$10^{13}$ Ω-cm), high chemical and thermal stability, hardness (1250 kg/mm2), high melting point (2570° C.), high transparency over wide spectra range (121-7000 nm), a wide energy gap (10.6 eV) (Ivanov et al., 1989), high radiation stability to different forms of photon and corpuscular radiation, a low thermal neutron cross-section (10 mb), it is used as a material of heat sink, thermal shock resistance (refractory ware), high efficiency moderator and reflector in electronic and nuclear industry.

BeO is commercially available in the undoped form under the commercial name "Thermalox 995" manufactured by Brush Beryllium Co., Elmore, O H, USA, used for substrates, dosimeters and other electronics components, with a total content of impurities not exceeding 0.5% (Spurny and Hobzova, 1977), the major impurities being, 2150 p.p.m. Si, 945 p.p.m. Mg, 100 p.p.m. Fe, 60 p.p.m. Ca and 55 p.p.m. Al. After igniting a mixture with a proper mineralizer, the amorphous BeO is transferred into a micro-crystalline state (hexagonal wurtzite structure) which is further sintered under high temperature and pressure. Tomita and Tsutsumi used BeO ceramics (obtained from NGK Insulator Ltd, Japan) with impurities of silicon and calcium (100 p.p.m.), sodium (50 p.p.m.), magnesium, iron and nickel (20 p.p.m.) (1979).

BeO also displays strong TL together with tissue-equivalent ($Z_{eff}$=7.13) properties which underline its application as a TL dosimeter. BeO has been studied on for its dosimetric characteristics for around 60 years. In the dosimetry of x- and γ-rays some of the advantages of BeO over other TL materials are its commercial availability, low cost, chemical inertness, non-toxicity (as a ceramic), high sensitivity to ionizing radiations, good reproducibility of response, low fading, the absence of low temperature peaks and moderate energy dependence. The low neutron sensitivity makes the application of BeO promising in mixed c-neutron radiation fields, primarily as an inexpensive nuclear accident dosimeter (Lakosi et al., 1975). Its systematic studies as a thermoluminescence (TL) dosimeter were started in late 60's on a BeO ceramic material sintered by a British Company. At that time its properties such as good gamma sensitivity, simple glow curve, low energy dependence, low fading and very low sensitivity to thermal neutrons were found attractive. These features along with its being ready/commercial availability, small size and low cost caused this new TL material in practical dosimetry as an alternative of well-established lithium fluoride and lithium borate. The same dosimetric properties were shown in similar luminescence studies using BeO dosimetric material by the different research groups in the same time period (Tochilin et al., 1969; Scarpa et al., 1970a, b; Scarpa et al., 1971; Crase and Gammage, 1975; Gammage and Haywood, 1976). Due to high chemical stability, higher sensitivity and better homogeneity among the samples, BeO ceramics manufactured by Thermalox 995-Brush Wellman Inc., U.S.A., were used extensively for the radiation dosimetry purpose in the further studies by most of the researchers studied on BeO from early times by the present time. Benincasa et al. (1974) studied annealing properties, dose-response curves, spectral analysis of the light emitted by BeO, reproducibility, energy response, fading in the light/in the dark, sensitivity to thermal neutrons/to fast neutrons were studied using Thermalox 995 BeO dosimeters. They compared BeO with the other TL dosimeters and found the sensitivity of ceramic BeO appears to be one of the best among solid materials included in the survey (TLD-100, Li2B4O7:Mn, BeO:Na). The dark fading of the BeO samples were determined as 5-6% at the end of the two weeks and total decay reached 8% after two months. Under the very high light intensities a decay of 50% was reached after only 20-30 minutes. They proposed BeO as useful detector in the mixed γ+n field because when the equivalent dose (rem) is concerned the TL response of BeO to neutrons is so low that it can easily be regarded as negligible, as compared to gamma response. Yamasihita et al., studied lithium and sodium doped BeO and found them to be efficient and reliable thermoluminescence phosphors (1974). General dosimetric characteristics of Li and Na doped BeO such as TL glow curves, emission spectrum, dose-response linearity, fading, energy response and tribothermoluminescence have been described. They reported that BeO (Li) and BeO (Na) were linear at nearly same range (1 mR-100 mR, 2 mR-100 mR, respectively), with the light induced fading. A patent exists on the use of the above dosimeters for measuring absorbed radiation dose by Nada et al., 1975 (U.S. Pat. No. 3,926,836 A—1975).

A mixed BeO:TiO2 ceramic showing a high electrical conductivity has been characterized for Thermally Stimulated Exoelectron Emission (TSEE) and TL dosimetry (Kortov et al., 1993). TiO2 substructure was found to provide electrical conductivity whereas BeO substructure was found fully responsible for the dosimetric signals. The sintering was performed in a strongly reducing atmosphere in a graphite oven at ten different temperatures in the temperature range 1300-1600° C.

BeO has been considered as an alternative dosimeter material which may compete with the LiF (TLD 100) due to its near tissue-equivalence ($Z_{eff}$=7.1) and high sensitivity, comparable to that of LiF. A great number of studies have been carried out to characterize and develop the material for radiation dosimetry. The thermoluminescence properties of the Thermalox 995 BeO ceramics have been studied in detail and a great number of reports have been published. The radiation induced TL signal and its properties have been reviewed by Horowitz (1984), McKeever (1985) and McKeever et al. (1995). Thermalox 995 BeO dosimeters were identified as one of the most popular forms of BeO for TL studies (McKeever et al., 1995). The light sensitivity of the dosimetric TL signal was reported (McKeever et al., 1995) and proposed as an advantage for the suitability of the material as an OSL dosimeter (Markey et al., 1995). The OSL properties of BeO were investigated in detail by Bulur and colleagues (Bulur and Goksu, 1998; Bulur, 2007; Bulur and Yeltik, 2010).

Transparent BeO ceramics were prepared by hot pressing at a temperature not higher than 1520 K and pressure of 30 MPa, have been offered for ionizing radiation dosimetry and for use in laser technology (Kiiko, 2004; Kiiko et al., 2004). They added Lithium carbonate (0.5-1 wt %) and in some cases, the samples were doped with a small amount of boron oxide (0.01-0.2 wt %) or rare-earth metal oxides. The boron oxide additives had a positive effect on the microstructure and optical properties of transparent BeO ceramics.

The additives of rare-earth metals increased the quantum yield of luminescence of BeO ceramics. The samples exhibited a high sensitivity to ionizing radiation and transparency over a wide spectral range. These researchers have a Russian patent for transparent ceramics. (Kiiko, V. S., Kalinin, N. S., Rastyapin, V. V., and Lisienko, V. G., Dosimeter, RF Patent 2141120 (6 G 01 T 1/20,1/202), 1995).

Transparent oxide ceramics including BeO were studied as luminescence dosimeters, ESR dosimeters and scintillation dosimeters in the literature (Kiiko, 2001; Kiiko and Zuev, 1995; Kiiko et al., 1999; Kiiko and Makurin, 1997; Kiiko et al., 2001; Gammage and Cheka, 1976; Gammage and Garrison, 1974). (Richard B. Gammage, John H. Thorngate, Danny J. Christian, U.S. Pat. No. 4,224,519, Sep. 23, 1980; Method of improving BeO as a Thermoluminescent dosimeter).

Recent investigations (Sommer and Henniger, 2006; Sommer et al., 2007; 2008) of OSL characteristics of sintered BeO discs have clearly shown that in the optically stimulated luminescence (OSL) mode BeO has higher sensitivity than in the TL mode and its dose-response is linear from mGy level up to ~10 Gy. For more than ten years a valuable dosimetric method employing optically stimulated luminescence (OSL) of the material beryllium oxide (BeO) has been developed at Technical University Dresden (TU Dresden) (Sommer et al., 2007; 2008). Since 2006, with the BeOmax reader, a semi-commercial dosimetry system has been available for scientific as well as industrial users. The system has been continuously upgraded and adapted based on the requirements of the users. As a result, several forms of encapsulated dosimeters and handling techniques for bare BeO detectors are now available for dosimetric use. One detector form is a cylindric BeO substrate with a diameter and a height of 1 mm each.

Due to the near tissue equivalence of the material BeO, the method promises to be useful for personal dosimetry, too. A collaboration of Helmholtz Zentrum Muenchen, TU Dresden and IBA Dosimetry GmbH Schwarzenbruck developed the modular personal dosimetry system iBeOx according to the requirements of IEC 62387-1 for the evaluation of HP(10) and HP(0.07) photon doses (Sommer et al., 2011). Actually, iBeOx is established in Germany and Belgium as one of the personal dosimeters with official approval. The BeO detector material is offered as Thermalox 995® by Materion Ceramics, Tucson, Ariz. (former known as Brush Wellmann Inc.). Square chips of 4.7 mm edge length and 0.5 mm thickness are used as standard detectors for most applications. For special applications, detectors with very small dimensions of 1 mm each in diameter and height were developed, optimized and produced. All detectors are dry pressed and sintered. As result they have a good mechanical, thermal and chemical stability. Due to this and to insensitivity to humidity, it is even possible to irradiate bare detectors directly in liquid or radioactive environments and measure the dose with high accuracy after the decontamination, cleaning and drying procedure. The poisonous character of BeO powder can be eliminated for the sintered material.

Recently, Watanabe et al., studied the defect centers responsible for the thermoluminescence (TL) and optically stimulated luminescence (OSL) processes in BeO phosphor using Electron Spin Resonance (ESR) method (Watanabe et al., 2010). Zahedifar et al. (2012) doped BeO nanopowders with Mg using sol-gel method. The applicability of this nanostructure in TL dosimetry was examined following irradiation to the 137Cs gamma source. They observed that the additives of rare-earth metals increased the quantum yield of luminescence of BeO ceramics.

Recent investigations (Bulur and Goku, 1998; Sommer and Henniger, 2006; Sommer et al., 2008, Yukihara, 2011) of OSL characteristics of sintered BeO discs have clearly shown that in the optically stimulated luminescence (OSL) mode BeO has higher sensitivity than in the TL mode and its dose-response is linear from μGy level up to a few Gy. Thus, BeO dosimetry using OSL method offers a wide range of applications in radiation dosimetry. Thus, the OSL method offers a wide range of applications in radiation dosimetry.

BeO Ceramics are not Toxic

Beryllium metal and beryllium compounds soluble to water are toxic, but beryllium oxide is not soluble in water and not so toxic. C. M. Dettmer reported on the toxicity of some TL phosphors. In the rat group ingested LiF solution, 10 of 15 animals expired in 1 month, but in the rat group ingested BeO solution, no obvious symptom developed nor were there any deaths (Yamashita et al., 1974). BeO, particularly in dust form is dangerous to inhale although when stabilized as a BeO ceramic it is not dangerous. The BeO chips sintered at high temperatures (~1500 C) in industry does not have a toxic effect (Watanabe et al., 2010).

The dosimeter samples in this study are tightly pressed in pellet form and then sintered into ceramics, and no precautions were necessary for handling the dosimeter samples. However, precautions were taken not to inhale fine powder on the sample preparation process and we did not touch the samples with bare hand during preparation.

SUMMARY OF INVENTION

In this invention, the doped luminophore BeO was chosen to study on because of its expected good tissue equivalence (BeO: Zeff=7.13; biological tissue: Zeff=7.42), energy response and high sensitivity.

In this invention, dosimeters comprising, for example, beryllium oxide doped with sodium, dysprosium, and erbium; several methods of preparing, for example, beryllium oxide doped with sodium, dysprosium, and erbium; and methods of using, for example, beryllium oxide doped with sodium, dysprosium, and erbium to determine a dose of ionizing radiation are also described.

The present invention is a polycrystalline powder material, pressed in pellet form, comprising BeO as the base material and dopants selected from a group sodium (Na) metal ions and lanthanides of dysprosium (Dy) ions and erbium (Er) ions in an amount of 0.001% to 10% of said base material by mole. Alternatively, the dopants may be some metal ions of Aluminum (Al), Magnesium (Mg), Calcium (Ca), Lithium (Li); transition metal ions of Copper (Cu), Cobalt (Co) and some lanthanides of Terbium (Tb), Gadolinium (Gd), Lanthanum (La), Cerium (Ce), Praseodymium (Pr), Neodymium (Nd), Samarium (Sm), Europium (Eu) in an amount of 0.001% to 20% of said base material by mole at various combinations. In two other embodiments, Ca and Al may be the sole dopants.

The optical stimulation of BeO-based luminophores with blue light ($\lambda$~470 nm) is most effective. Then the dosimeters emit luminescence light in the ultraviolet range around 325 nm. The present invention relates an optically stimulated luminescence (OSL) reader corresponding in these essential facts of the polycrystalline powder material comprising for example BeO as the base material and dopants selected from the group Na metal ions and lanthanides of Dy ions and Er ions in an amount of 0.001% to 10% of said base material by mole. An optically stimulated luminescence (OSL) treatment was developed. A high power blue LED ($\lambda$peak ~475 nm, Cree XQEBLU-SB-0000-000000Y01) were used for CW-stimulation. A photomultiplier detects the OSL light. The dosimeter has a linear dose response range between ~0.1 Gy and ~50 Gy. It was suggested, that a modification of stimulation conditions would allow measurements down to 8 μGy. Dark fading, photon and electron energy dependence and reproducibility of OSL-signal were investigated and found it adequate for clinical and personal dosimeters' requirements. In addition, basic questions of the OSL-process in BeO have been performed to understand the novel dosimeter better.

In this invention we suggest a new fiber optic coupled novel OSL dosimeter that is based on the detection of luminescence from a BeO based ceramic dosimeter for example beryllium oxide doped with sodium, dysprosium and erbium. The unique physical and luminescence properties of BeO based ceramic dosimeter for example beryllium oxide doped with sodium, dysprosium and erbium fiber dosimeter as a near tissue equivalent material will permit novel solutions to accurate and reproducible in-vivo dose measurements with a linear dose rate and dose-response. It will meet the needs of current radiotherapy with characteristics including real-time, small volume, highly sensitive and reproducible dosimetry.

A preferred embodiment is directed towards a phosphor doped BeO compound capable of storing at least part of the energy of incident ionizing radiation and releasing at least part of the stored energy upon optical stimulation and heating. The said material comprising: a base material comprising beryllium oxide (BeO); at least, a first dopant comprising sodium (Na); second dopant comprising dysprosium (Dy); and a third dopant comprising erbium (Er).

In a further preferred embodiment, the Polycrystalline powder, wherein Na is present in said polycrystalline material in a quantity of between 0.05 and 10% of said based material by mole.

In a further preferred embodiment, the Polycrystalline powder, wherein said Na is present in said polycrystalline powder material in a quantity of about 5% of said base material by mole.

In a further preferred embodiment, the Polycrystalline powder, said Dy is present in said polycrystalline powder material in a quantity of between 0.01 and 2% of said base material by mole.

In a further preferred embodiment, the Polycrystalline powder, wherein Dy is present in said polycrystalline powder material in a quantity of about 0.1% of said base material by mole.

In a further preferred embodiment, the Polycrystalline powder, wherein said Er is present in said polycrystalline powder material in a quantity of between 0.001 and 0.5% of said base material by mole.

In a further preferred embodiment, the Polycrystalline powder, wherein Er is present in said polycrystalline powder material in a quantity of about 0.05% of said base material by mole.

In a further preferred embodiment, the Polycrystalline powder, wherein said first dopant is present in a quantity of between 0.05 and 10% of base material by mole: said second dopant is present in a quantity of between 0.01 and 2% of base material by mole; and said third dopant is present in a quantity of between 0.001 and 0.5% of base material by mole.

In a further preferred embodiment, the Polycrystalline powder, wherein said polycrystalline powder material includes metastable traps of charge. In a preferred embodiment, where said metastable TL traps of charge have delocalization temperatures about 200° C., 350° C. and 500° C. In a further preferred embodiment, where said metastable TL traps of charge have delocalization temperature about 200° C. and 350° C. contribute to the OSL signal. In a further preferred embodiment, where said metastable TL traps of charge have delocalization temperature about 500° C. does not contribute to the OSL signal.

A preferred embodiment is directed towards a polycrystalline powder material comprising: a base material comprising BeO; a first dopant comprising Na; a second dopant comprising Dy, and a third dopant comprising Er, wherein said polycrystalline powder material includes at least two groups of OSL traps at 200° C. and 350° C. and at least one group of TL traps in the 500° C. temperature region does not contribute to the OSL traps.

A further preferred embodiment is directed towards a method for preparing a phosphor doped BeO material as claimed in any one of the prior embodiments comprising a polycrystalline powder material, comprising the steps of: a) synthesize of a solution comprising a base material comprising BeO; b) doping a base material comprising BeO with a first dopant comprising sodium to form a doped material; c) doping the material, comprising Na—BeO doped with the second dopant Dy; and d) doping the material comprising Na,Dy—BeO doped with the third dopant comprising Er to form doped material of the prior embodiments.

In a further preferred embodiment, the method, wherein step a) is conducted using salt of beryllium ($BeSO_4.4H_2O \geq 99.0\%$). The sulfate salts of beryllium are dissolved stirring in distilled water.

In a further preferred embodiment, the method, wherein said solution is base material, nitrate base first doping material comprising Sodium nitrate ($NaNO_3 \geq 99.0\%$) is added to this solution at different concentrations. In a preferred embodiment, the nitrate base second doping material comprising Dysprosium (III) nitrate hydrate ($Dy(NO_3)_3 \cdot xH_2O \geq 99.9\%$) is added to the said material of the method, at different concentrations, wherein said solution is base material comprising BeO and first doping material comprising sodium. In a further preferred embodiment, the nitrate base third doping material comprising Erbium (II) nitrate pentahydrate ($Er(NO_3)_3 \cdot 5H_2O \geq 99.9\%$) is added to the said material of the method at different concentrations, wherein said solution is base material comprising BeO and first doping material comprising sodium and second doping material comprising dysprosium.

In a further preferred embodiment of the method, a certain amount of polyethyleneimine solution is dissolved in distilled water on the stirrer until it becomes transparent. Following the polyethyleneimine solution (50% (w/v) in $H_2O$) is added to the doped solution Na,Dy,Er—BeO of the method, a sufficient amount of ammonia ($H_5NO$, ACS reagent, 28.0-30.0% $NH_3$ basis) is slowly added to the solution by controlling pH as it will be nearly 7 and consequently the white precipitate formation is observed.

In a further embodiment, a crystalline material comprising a base material comprising BeO and a first dopant comprising Na; a second dopant comprising Dy; and a third dopant comprising Er wherein said polycrystalline material of any one of the methods described above is heated at a temperature of about 200° C. to 400° C. on a hot plate in atmosphere for polycrystallizing said doped material in atmosphere in order to form said polycrystalline powder material. In a preferred embodiment, the polycrystalline material, is heated with a rate 5° C. per minute up to 800° C. and keep at said temperature for a period of time of 4 hours in an ash furnace, in atmosphere in order said polycrystalline material to calcinate. In a preferred embodiment, the method, wherein said polycrystalline powder material comprises BeO:Na,Dy,Er.

In a preferred embodiment, the method, wherein said calcination is carried out and further step comprises cold pressing of said polycrystalline powder material with a weight of about 25 mg under 250 kg-force/$cm^2$ pressure for 1 min to get them in pellet form. In preferred embodiments, the said BeO:Na,Dy,Er pellets, have the diameter of about 6 mm and thickness of about 0.8 mm. In a preferred embodiment, the said BeO:Na,Dy,Er pellets are sintered at about 1600° C. in an ash furnace for about 4 hours in an atmosphere. In preferred embodiments, the BeO:Na,Dy,Er ceramic pellets cool down inside furnace to room temperature.

A preferred embodiment is directed towards a phosphor-doped BeO compound in ceramic pellet dosimeter form, capable of storing at least part of incident ionizing radiation and releasing at least part of the stored energy upon optical stimulation and upon heating prepared substantially according to any one of the preceding methods.

A preferred embodiment is directed towards a process for preparing doped BeO of suitable for use in preparing an optically stimulated luminescence radiation dosimeter wherein said dopants are selected from the group consisting of at least sodium, dysprosium and erbium, consisting essentially of the steps of: 1) preparing a mixture of undoped beryllium sulfate (BeSO$_4$.4H$_2$O≥99.0%) and ethylene glycol (C$_2$H$_6$O$_2$, Anhydrous, 99.8%) in stoichiometric ratios using magnetic stirrer; 2) adding at least, a first dopant comprising sodium (Na) to the said mixture of step 1) wherein said Na is present in said polycrystalline powder material in a quantity of about 5% of said base material by mole; 3) adding at least a second dopant comprising dysprosium (Dy) to the said mixture of step 1) wherein said Dy is present in said polycrystalline powder material in a quantity of about 0.1% of said base material by mole; 4) adding at least a third dopant comprising erbium (Er) to the said mixture of step 1) wherein said Er is present in said polycrystalline powder material in a quantity of about 0.05% of said base material by mole; 5) preparing a mixture of solutions comprising undoped BeO and at least three dopants selected from the group sodium, dysprosium and erbium as said in step 1, step 2, step 3 and step 4; 6) citric acid (C$_6$H$_8$O$_7$, ACS reagent, ≥99.5%) is added in the said mixture of step 5); 7) ammonium hydroxide solution (H$_5$NO, ACS reagent, 28.0-30.0% NH$_3$ basis) is added to the said mixture of step 6) providing pH value of ~7 of the mixture after stirring for 10 minutes with a magnetic stirrer; 8) a certain amount of poly(ethyleneimine) solution (50% (w/v) in H$_2$O) is diluted with double distilled water in another beaker; 9) a solution of said step 7) and a solution of said step 8) are added together under vigorous stirring to obtain a homogeneous material said in claim 1 as a precipitate; 10) obtained final precipitation becomes dark brown gel after heated on a hot plate at 350 C for 3 hours; 11) the organic gel of said step 10) is burned in an ash furnace by first gradually heating up to 500° C. with heating rate of 2° C. per minute and retained at 500° C. for 1 hour in an oxygen atmosphere; 12) cooling the obtained polycrystalline powder material of step 11) in the furnace to room temperature; 13) the obtained charred powder of said step 12) is calcinated in an ash furnace by first gradually heating up to 800° C. with heating rate of 5° C. per minute and retained at 800° C. for 4 hour in an oxygen atmosphere; 14) the polycrystalline powder material of said step 13) is crushed in an agate mortar; 15) cold pressing the said polycrystalline powder material of said step 14) for a period of time sufficient to prepare a pellet of the said material wherein said cold pressing is conducted at room temperature with a weight of about 25 mg under 250 kg-force/cm$^2$ pressure for 1 min to get them in pellet form; 16) the said material in claim 1, in pellet form of said step 15), is sintered in an ash furnace at 1600° C. for 4 hour in an atmosphere; and 17) cooling the pellets said in step 16) in the furnace to room temperature.

A further preferred embodiment is directed towards a phosphor-doped BeO compound in ceramic pellet dosimeter form, capable of storing at least part of incident ionizing radiation and releasing at least part of the stored energy upon optical stimulation and upon heating prepared substantially according to the method called VolVey with any one of steps of the prior embodiments.

Another embodiment is directed toward a phosphor doped BeO material capable of storing at least part of the energy of incident ionizing radiation and releasing at least part of the stored energy upon stimulation, said material comprising a base material comprising beryllium oxide and a dopant.

A further embodiment is directed toward a phosphor doped BeO material capable of storing at least part of the energy of incident ionizing radiation and releasing at least part of the stored energy upon stimulation, said material comprising a base material comprising beryllium oxide and a dopant, wherein the dopant is a metal.

Another embodiment is directed toward a phosphor doped BeO material capable of storing at least part of the energy of incident ionizing radiation and releasing at least part of the stored energy upon stimulation, said material comprising a base material comprising beryllium oxide and a dopant, wherein the dopant is at least any one of Sodium (Na), Dysprosium (Dy), Erbium (Er), Aluminum (Al), Magnesium (Mg), Calcium (Ca), Lithium (Li); transition metal ions of Copper (Cu), Cobalt (Co) and some lanthanides of Terbium (Tb), Gadolinium (Gd), Lanthanum (La), Cerium (Ce), Praseodymium (Pr), Neodymium (Nd), Samarium (Sm), or Europium (Eu).

Another embodiment is directed toward a phosphor doped BeO material capable of storing at least part of the energy of incident ionizing radiation and releasing at least part of the stored energy upon stimulation, said material comprising a base material comprising beryllium oxide and a dopant, wherein the dopant is at least any one of Sodium (Na), Dysprosium (Dy), Erbium (Er), Calcium (Ca), or Aluminum (Al).

A further embodiment is directed toward an apparatus comprising a phosphor doped BeO material capable of storing at least part of the energy of incident ionizing radiation and releasing at least part of the stored energy upon stimulation in connection with at least one optical fiber, said material comprising a base material comprising beryllium oxide and a dopant.

Another embodiment is directed toward an apparatus comprising a phosphor doped BeO material capable of storing at least part of the energy of incident ionizing radiation and releasing at least part of the stored energy upon stimulation in connection with at least one optical fiber and further comprising a detection filter in connection with the at least one optical fiber, said material comprising a base material comprising beryllium oxide and a dopant.

Another embodiment is directed toward an apparatus comprising a phosphor doped BeO material capable of storing at least part of the energy of incident ionizing radiation and releasing at least part of the stored energy upon stimulation in connection with at least one optical fiber, a detection filter in connection with the at least one optical fiber, and further comprising a photomultiplier detector disposed in proximity to the detection filter, said material comprising a base material comprising beryllium oxide and a dopant.

DETAILED DESCRIPTION OF THE EMBODIMENTS

Synthesis of BeO Doped with Sodium, Dysporsium, Erbium

BeO samples were synthesized by a known synthesis method using Beryllium sulfate tetrahydrate ($BeSO_4 \cdot 4H_2O$, ≥99.0%), Poly(ethyleneimine) solution (50% (w/v) in $H_2O$) and Ammonium hydroxide solution ($H_5NO$, ACS reagent, 28.0-30.0% $NH_3$ basis). Doping of the BeO samples were performed using Sodium nitrate ($NaNO_3$≥99.0%), Dysprosium (III) nitrate hydrate ($Dy(NO_3)_3 \cdot xH_2O$≥99.9%) and Erbium (II) nitrate pentahydrate ($Er(NO_3)_3 \cdot 5H_2O$≥99.9%).

Beryllium Oxide was doped with different concentrations of Sodium, Dysprosium and Erbium using precipitation method. Firstly, beryllium sulfate was mixed with distilled water using magnetic stirrer and wait until completely dissolved. Then, nitrate base doping material was added to this solution at different concentrations. On the other hand, a certain amount of polyethyleneimine solution was dissolved in distilled water on the stirrer until it becomes transparent. Dissolved polyethyleneimine solution was added to beryllium sulfate solution under vigorous stirring. Afterwards, a sufficient amount of ammonia was slowly added to the solution by controlling pH and consequently the white precipitate formation was observed. The precipitate was dried on the heater. In order to burn formed organics and to obtain BeO particles, the dried sample was calcinated at 800° C. with 5° C./min heating rate for 4 hours in an oxygen atmosphere. Finally, doped BeO white powders were achieved.

Achieved white BeO:Na,Dy,Er powders were studied in pellet forms for easy handling and having more settled OSL signals. BeO:Na,Er,Dy pellets were prepared using a hydraulic press with evacuable pellet dies under 250 kg force/cm$^2$ pressure for 1 min. In order to impart strength and integrity, prepared pellets were sintered at 1600° C., for 4 h in an oxygen atmosphere.

OSL and TL measurements were carried out using Risø, DA-20 model TL/OSL reader system. With the aim of checking the possibility of using TL and OSL signals of BeO:Na,Dy,Er pellets for dosimetric purposes, luminescence signals were obtained from BeO:Na,Dy,Er pellets which were irradiated with 0.1 Gy beta dose. The measurements of samples were started after half an hour of waiting at the room temperature after the sintering of the samples for stabilization of traps. TL and OSL measurements carried out and the results obtained are presented below.

OSL Signals of BeO:Na,Dy,Er Pellets (Irradiated with 0.1 Gy β-Doses)

Figure 1:
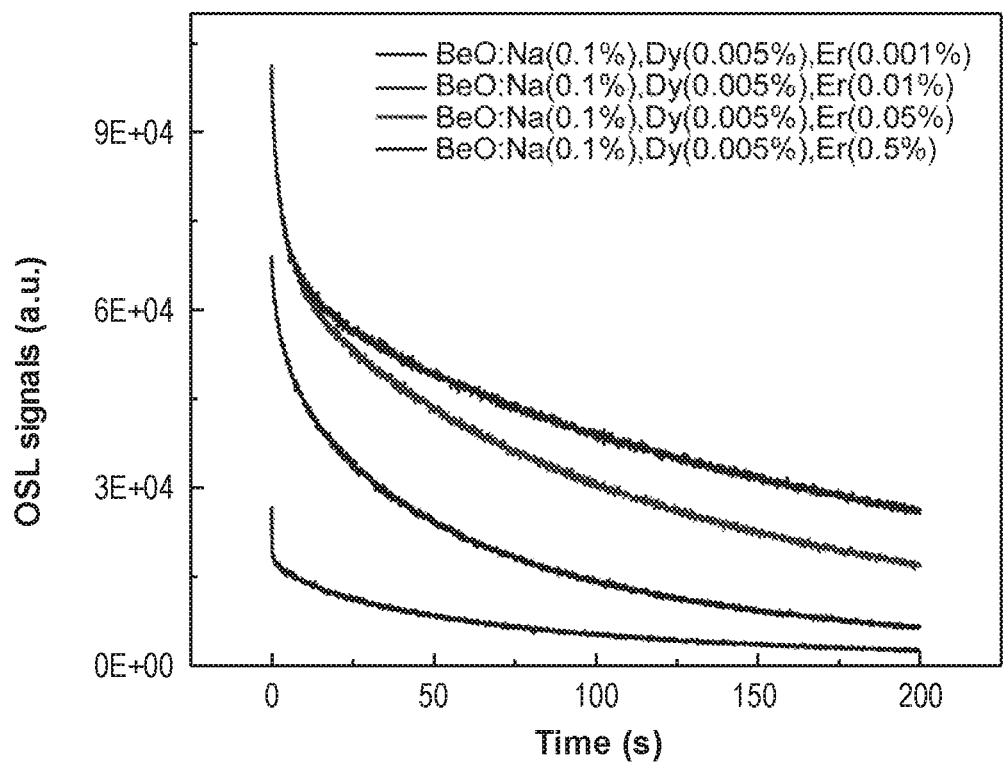
FIG. 1 OSL decay curves of BeO pellets doped with different Erbium concentration; the Sodium and Dysprosium concentrations were kept constant.
Figure 2:
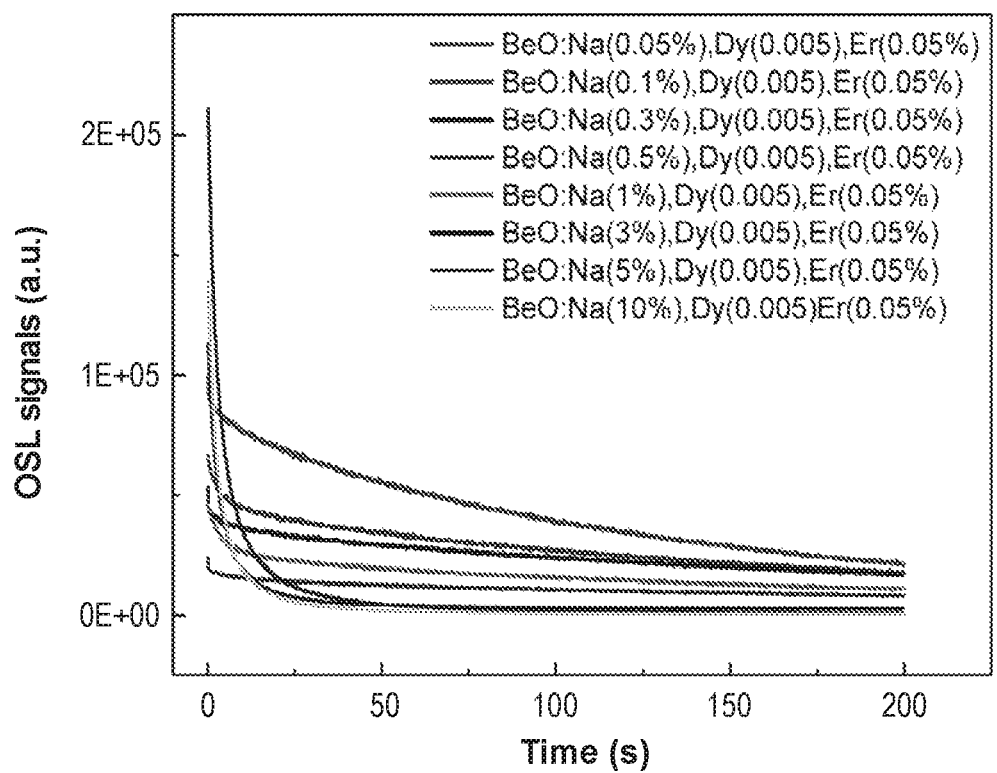
FIG. 2 OSL decay curves of BeO pellets doped with different Sodium concentration; Dysprosium and Erbium concentrations were kept constant.
Figure 3:
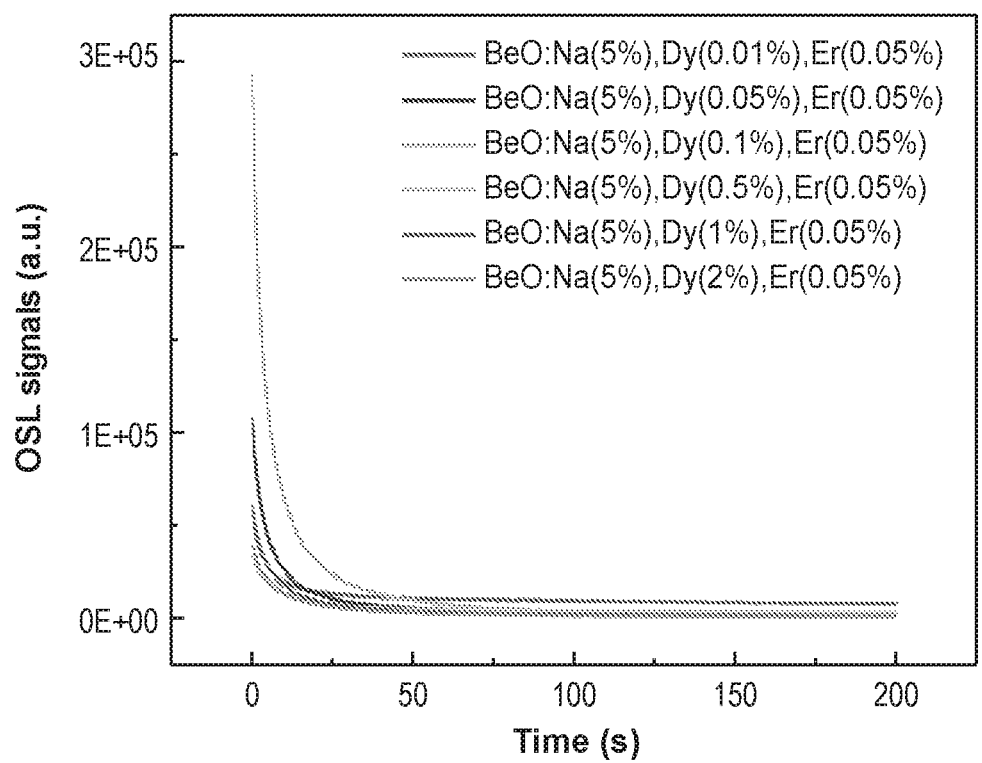
FIG. 3 depicts OSL decay curves from BeO pellets doped with various Dysprosium concentrations; Sodium and Erbium concentrations were kept constant.

In order to investigate the effect of dopant concentration on OSL signals of BeO, OSL measurements of BeO with various dopant concentrations for example, various Na, Dy, and Er concentrations were performed using blue light stimulation (stimulation time=200 s) after the irradiation with 0.1 Gy β-dose. First, we fixed Na and Dy concentrations as 0.1% and 0.005%, respectively and changed the Er concentration. FIG. 1 shows OSL signals of BeO:Na(0.1%), Dy(0.005%), Er(x %), with respect to various Er concentrations. As is seen from the FIG. 1, the highest OSL intensity of BeO:Na,Dy,Er was obtained with the Er concentration of 0.05%. Then, OSL signals of BeO:Na(x %), Dy(0.005%), Er(0.05%), were illustrated according to various Na concentrations (see FIG. 2). As is seen from the FIG. 2, doping percentage of Na 5% which gave the maximum OSL intensity was chosen for the Na concentration of the material. Finally, OSL signals of BeO:Na(5%), Dy(x %), Er(0.05%), were examined according to various Dy concentrations (see in FIG. 3). As is seen from the FIG. 3, the OSL signals with the maximum intensities were obtained from the combination of BeO:Na(5%), Dy(0.1%), Er(0.05%). For this reason, doping percentage of Dy was chosen as 0.1%.

Figure 4:
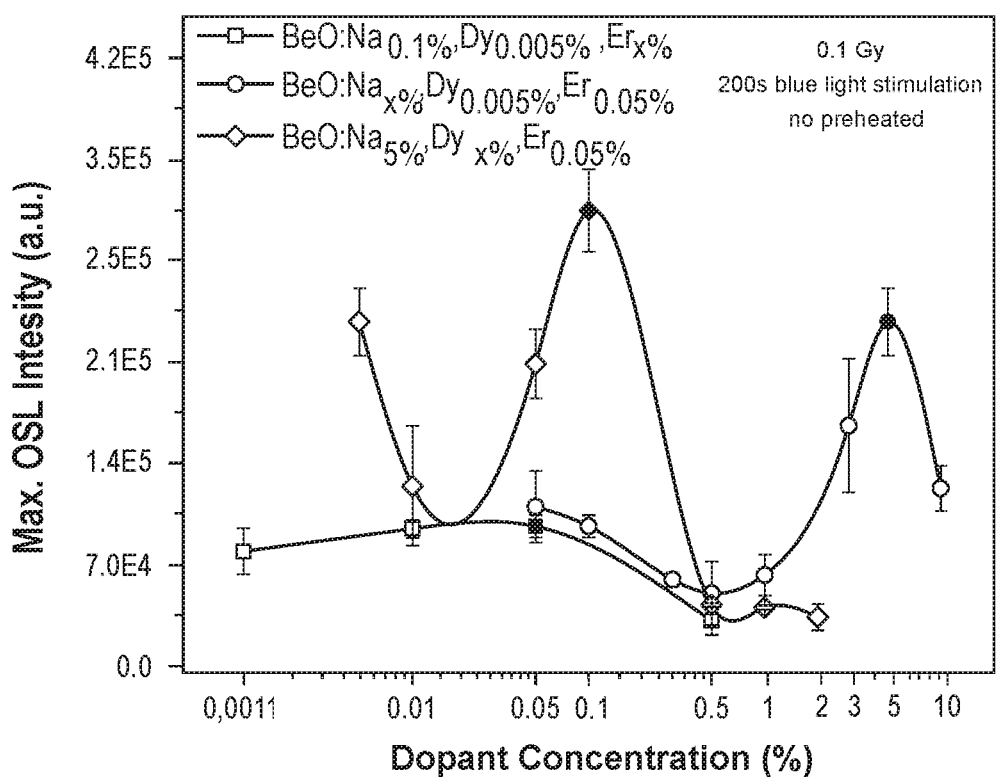
FIG. 4 depicts integrated OSL signals from BeO pellets of the triple combination of all dopants with various concentrations.

Changes of maximum OSL intensities for the triple combinations of all dopant concentrations were illustrated in FIG. 4.

XL Signals of BeO:Na,Dy,Er Pellets

Figure 33A:
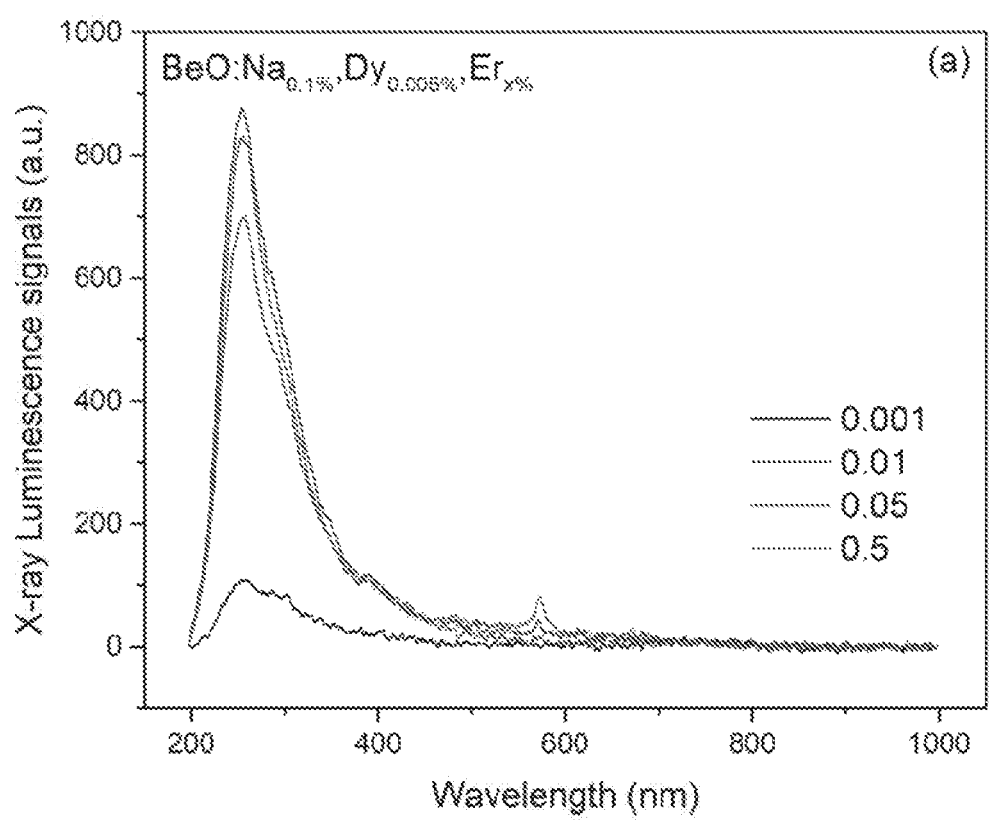
FIG. 33A. The changing in XL spectra of BeO:Na,Dy,Er ceramic pellet with various Er with constant BeO and Na.
Figure 33B:
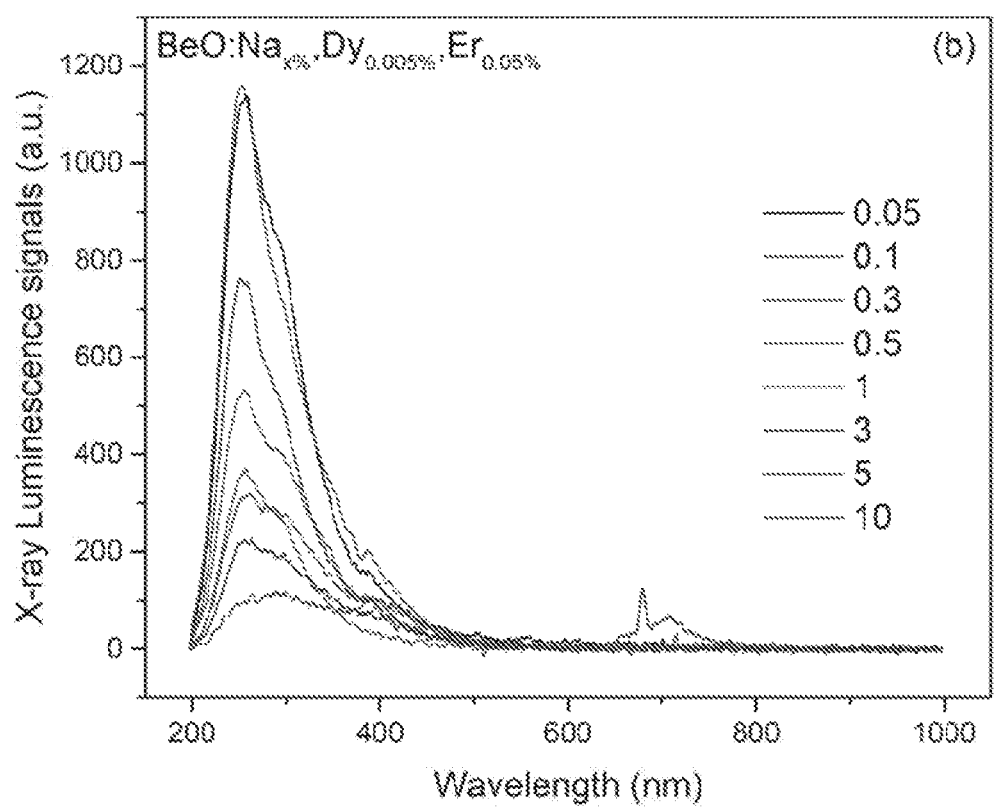
FIG. 33B. The changing in XL spectra of BeO:Na,Dy,Er ceramic pellet with various Na with constant BeO and Dy.
Figure 33C:
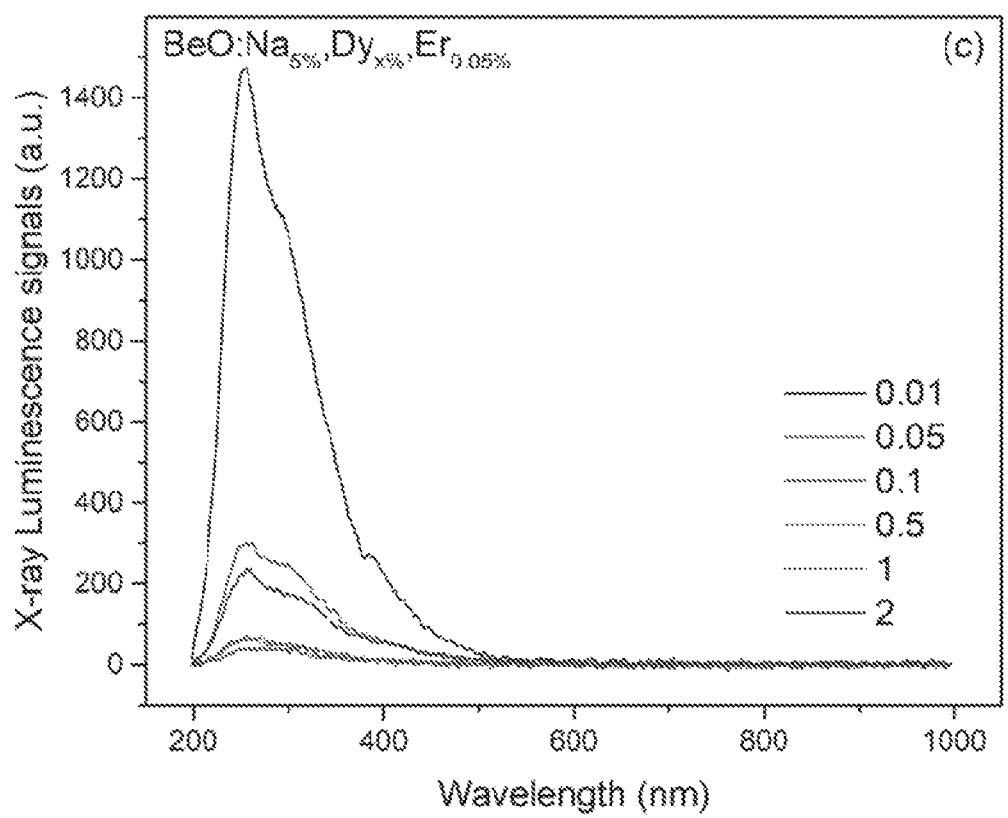
FIG. 33C. The changing in XL spectra of BeO:Na,Dy,Er ceramic pellet with various Dy with constant Er and Na.

Investigation of radioluminescence (X-ray luminescence, XL) characteristics is a good starting point for knowledge of the positions and general appearance of the luminescence bands. In this work, XL spectra of BeO with various Na, Dy, and Er concentrations were obtained using a resolution of 1 nm at room temperature and presented in FIGS. 33A-C. The XL spectra of all BeO:Na,Dy,Er pellets showed the same broad peak located between 200 and ~500 nm with a peak maximum at 250 nm with photon energies of ~4.9 eV. On the other hand, the effect of dopant concentration on X-ray luminescence signals were also investigated and illustrated as a function of wavelength in FIGS. 33A-C. While Er concentration increasing, an emission peak with increasing intensity was appeared at ~570 nm (see FIG. 33A). The observed emission peak represents the main characteristic emission line from the trivalent Dy. With the increasing of Na concentration, the characteristic emission lines of Dy+3 were observed from 650 to 750 nm for only 10% Na doped sample between the samples (see FIG. 33B). As a surprising result, the increase in Dy concentration resulted in a significant reduction in main BeO emission (see FIG. 33C) and the characteristic emission of Er at 407 nm could not be observed because it remained under the main emission peak of BeO. For this purpose, the most suitable material selection for personal dosimetry was performed by taking into consideration the results of CW-OSL measurement.

A New Method Carried Out

BeO dosimetric phosphors doped with Sodium, Dysprosium and Erbium were produced by a new method followed by heat treatment. In this method, citric acid ($C_6H_8O_7$) and ethylene glycol ($C_2H_6O_2$) solution were chosen for polymer construction in the solution and to create organic complex/fuel agent, respectively. Firstly, stoichiometric quantities of beryllium sulfate as starting material were solved in ethylene glycol solution using magnetic stirrer and waited until it was completely dissolved. Nitrate base doping materials was added to this solution at different concentrations. Then citric acid was added in this solution. Ammonium hydroxide solution as agents for pH adjustment was slowly dropped into ethylene glycol solution. The solution was obtained which the pH value ~7 after stirring for 10 min. On the other hand, a certain amount of polyethyleneimine solution was dissolved in distilled water on the stirrer. Dissolved polyethyleneimine solution was added to beryllium sulfate solution under vigorous stirring. After dried on the heater, the solution became dark brown gel. In order to burn formed organics, the dried sample was burned at 500° C. with 2° C./min heating rate for 1 hours in an oxygen atmosphere. Finally, the charred powder was calcinated at 800° C. with 5° C./min after it was thoroughly crushed in an agate mortar.

Figure 5:
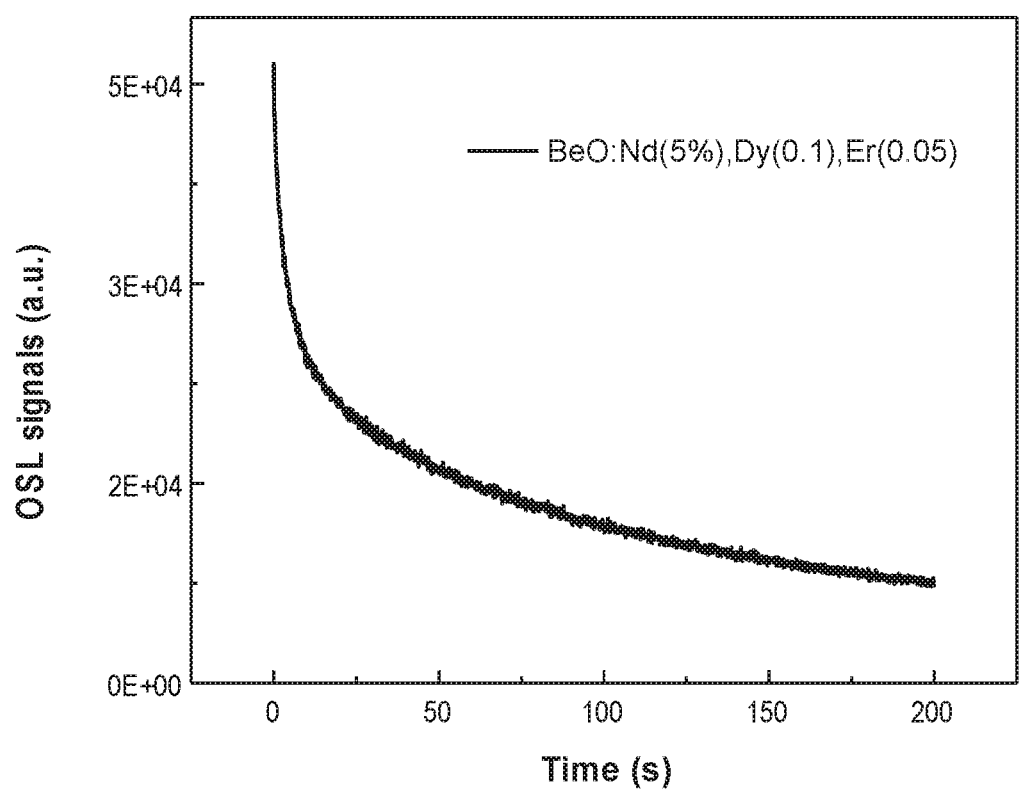
FIG. 5 depicts OSL decay curve from BeO pellet synthesized using the new method.

This method has the advantage of obtaining big grain diameters of phosphor along with their homogeneous size distribution for having better structure characteristics and better dosimetric properties. For example, FIG. 5 depicts OSL signals using blue light stimulation (stimulation time=200 s) after the irradiation with 0.1 Gy β-dose, from the BeO:Na(5%), Dy(0.1%), Er(0.05%) pellet synthesized using the new method.

Preheating Measurement

Figure 6:
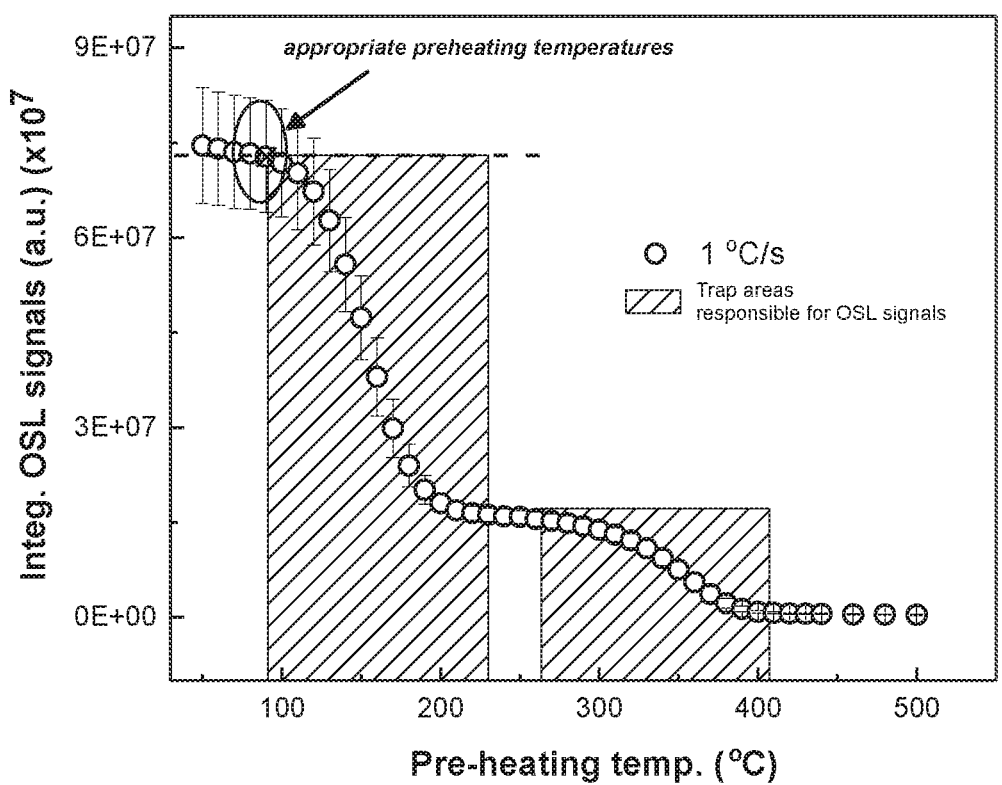
FIG. 6 depicts integrated OSL signals from BeO pellets after pre-heating them between 50-500° C. (with 1° C./s heating rate).

Pre-heating measurement was performed with the aim of determination appropriate pre-heating procedure of BeO. This procedure which allows removing the contribution of the unstable traps (low energy level traps) from OSL signals were examined in detail. The pre-heating duration time was kept constant for 10 seconds. BeO pellets were exposed to 0.5 Gy test dose, after then the pellets were pre-heated between 50-500° C. OSL signals were obtained from the pre-heated BeO pellets. After each irradiation, the same process was applied by increasing the temperature at 10° C. for each step. The integrated OSL signals of BeO pellets were plotted versus to pre-heating temperature for 1° C./s heating rate in FIG. 6.

Reusability of BeO:Na(5%), Dy(0.1%), Er(0.05%)

Irradiation: 0.5 Gy beta dose

Pre-heating: 100° C. for 60s

OSL reading: 200 sec. with 2000 data (time per data point: 0.1s)

Figure 7:
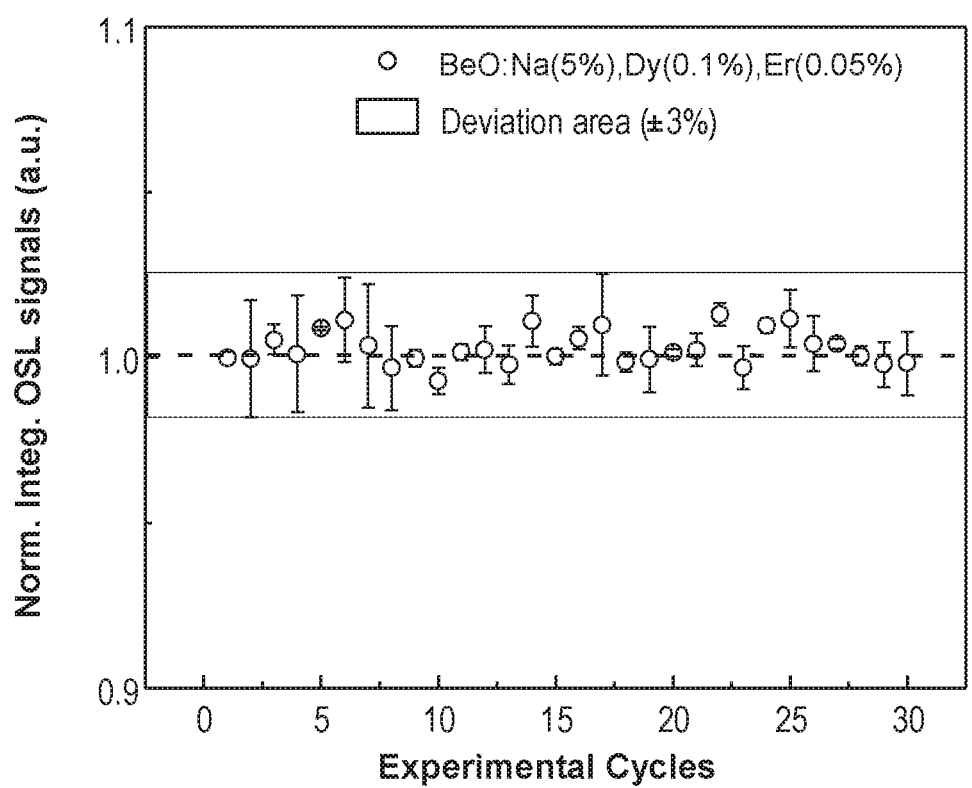
FIG. 7 depicts the reusability of integrated OSL signals from BeO:Na(5%), Dy(0.1%), Er(0.05%).

To test the reusability, the OSL signals from annealed three pellets of BeO were recorded after 0.5 Gy β-radiation exposure and the same procedure was repeated 30 times. The samples were pre-heated at 100° C. for 60 s to remove the unstable signals and then the OSL read-outs were performed by blue light stimulation for 200 seconds at room temperature (with the time per data point 0.1). Normalized integrated OSL signals were plotted according to experimental cycles for BeO, as it is given in FIG. 7. BeO OSL signals showed very regular repeatability for 30 cycles.

Therefore, it was observed that the reproducibility of the previous-radiation sensitivity appeared with the maximum deviation of ±2%.

Correlation Between TL and OSL Signals

Figure 8A:
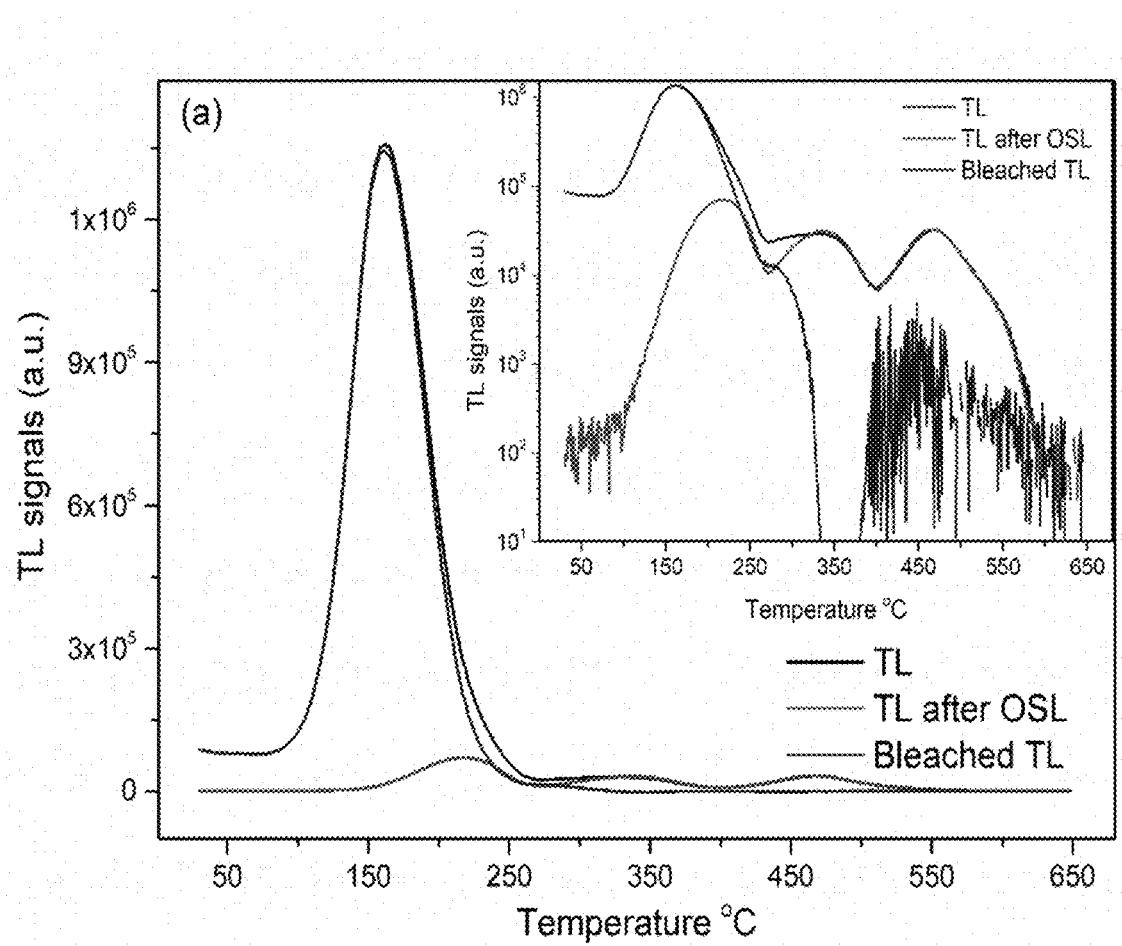
FIG. 8A depicts TL glow curve (direct TL), TL glow curve after (residual TL) obtained after OSL measurement (stimulation of 200s) and Bleached TL curve from the 0.5 Gy irradiated pellets.

In order to investigate the effect of the blue light stimulation on TL measurements, TL signals of glow curve from BeO pellets were obtained and compared with: Na,Dy,Er ceramic pellet, the TL signals glow curve (direct TL) and the TL glow curve obtained after OSL measurements of the same BeO:Na(5%), Dy(0.1%), Er(0.05%) pellets. Measurement (residual TL) were recorded up to 650° C. at a heating rate of 1° C./s, after being irradiated with 0.5 Gy beta dose. The TL measurements were performed up to 650° C. with heating rate of 1° C./s. Obtained TL FIG. 8A shows direct TL, residual TL and bleached TL glow curves for each pellet. Bleached TL curves were obtained by subtracting the residual TL from the direct TL. The bleached TL curve for each studied sample represents the optically active parts of the TL glow curves. As is seen from FIG. 8A, the 1st peak of the TL glow curve of BeO:Na,Dy,Er pellet were affected by optical stimulation whereas the 2nd and 3rd peaks were not. This effect of light exposure on TL glow curve provides us to say that the source of the OSL signal might be associated with the 170° C. TL peak. Inset of FIG. 8A, only for 2nd and 3rd better viewing due to low TL signals.

Figure 8B:
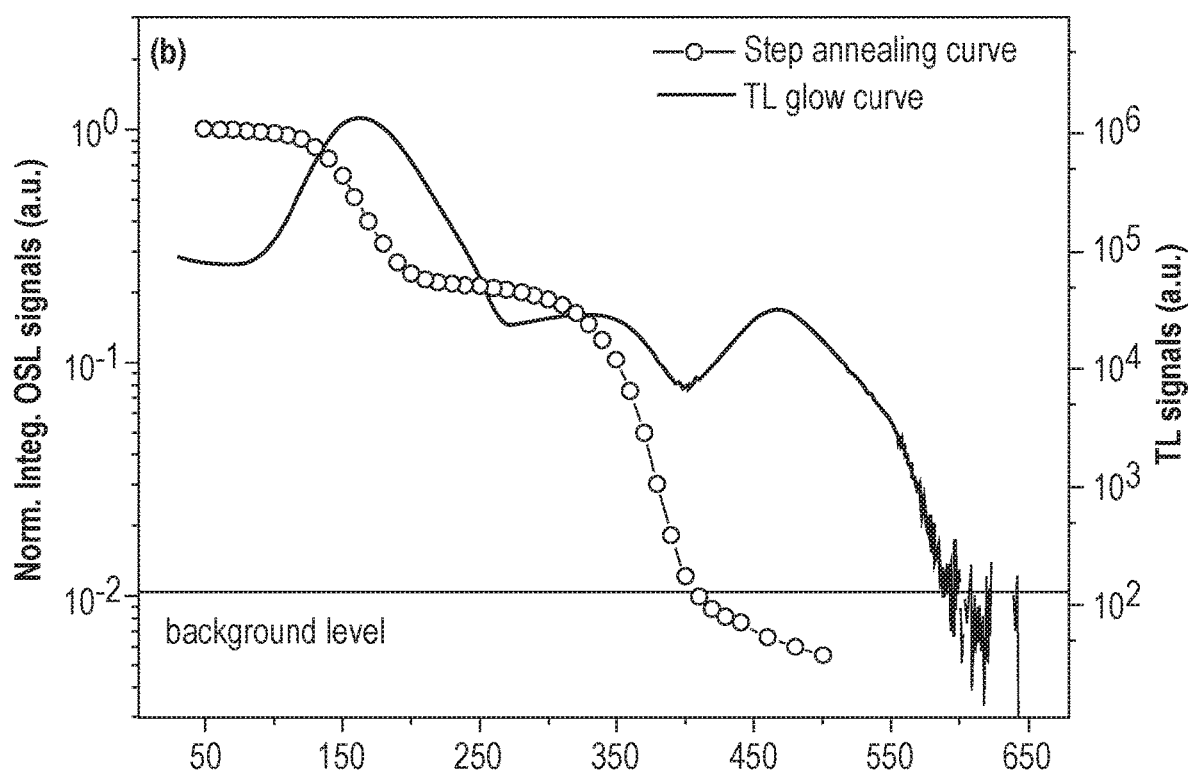
FIG. 8B shows Step annealing curves of OSL signals from 0.5 Gy irradiated pellets.

In order to investigate the correlation between this affected TL peak and the source of the OSL signals for the studied pellet, the step-annealing experiments (thermal-stability experiments) were performed in the temperature range from 50 to 500° C. with 10° C. increments, 5° C./s heating rates. For this purpose, the pellets repeatedly heated to an annealing temperature after irradiation with 0.5 Gy, and the remaining OSL signals were given in FIG. 8B. It can be reported that recorded using 200 s blue-light stimulation each time. The samples were depleted using TL measurements (up to 650° C.) following the OSL measurements. The changing of the integrated OSL signals (the sum of the counts obtained from 0 to 200 s) against the annealing temperatures were illustrated together with the TL curve for BeO:Na,Dy,Er pellet in BeO:Na(5%), Dy(0.1%), Er(0.05%) the TL peak ~175° C. was FIG. 8B. It is clearly seen from the step-annealing curve in FIG. 8B, the first decrease in OSL signals started after annealing temperature of 130° C. The decrease in OSL signals correlates with emptying of the 170° C. TL peak after the OSL stimulation. After the first decrease in the step-annealing curve, the OSL signals were very sensitive to blue light and faded very quickly. As seen from FIG. 8A, in the glow curves measured after OSL measurement the 175° C. peak nearly disappeared while the high temperature peaks seemed to be little affected stable up to 350° C. and started to the second decrease after this temperature. Following the complete discharging of the TL traps responsible for the 350° C. TL peak, the OSL signals reach the zero level. It shows that the source of the OSL signals is perhaps associated with both the 170 and 350° C. TL peaks and the OSL, most probably, employ the same recombination centers as the 170 and 350° C. TL peaks. As a result, optically active traps are correlating with the TL traps responsible from the TL peak observed at ~175° C. for the BeO pellets.

Dark Fading

Irradiation: 0.5 Gy beta dose
Pre-heating: 120° C. (with heating rate 5° C./s for 60 s)
TL reading: 650° C. (with heating rate 1° C./s)
OSL reading: 200 s with 2000 data (time per data point: 0.1s)

Figure 9:
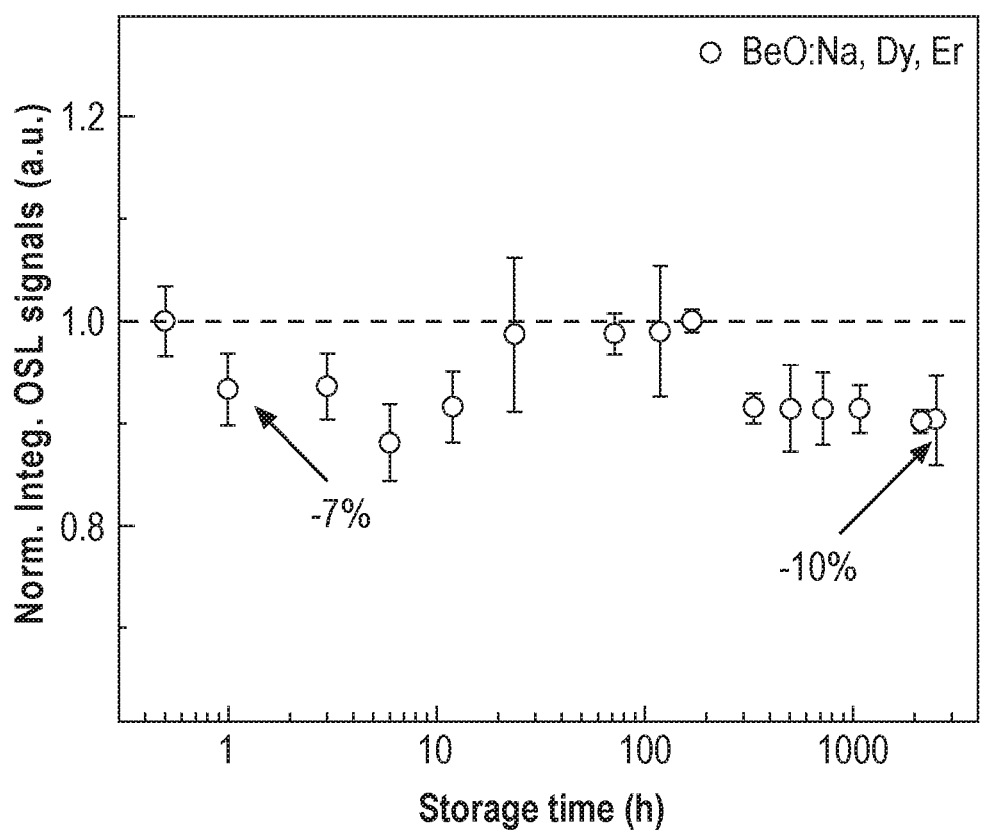
FIG. 9 shows the fading characteristics of the OSL signals from the BeO:Na,Dy,Er ceramic pellets as a function of storage time up to three months after 0.5 Gy beta dose initial exposure.

As a desirable property for all dosimetry application, trapped charge population must be stable at room temperature. In order to investigate whether charge population in traps are stable or not, fading characteristics of BeO:Na,Dy, Er ceramic pellets were checked by keeping three calibrated samples in dark at room temperature after irradiation with 0.5 Gy beta dose. The fading of the samples was observed for various time intervals during three months; starting after half an hour from the exposure (see FIG. 9). The decrease of integrated OSL signal was observed as ~7% at the end of 1 h. While the initial fall of the OSL signals at the end of the 6 h could be considered as a result of the escaping of electrons from the shallow traps at room temperature, the unexpected increase of the OSL signals with storage time during 12 h period could be related with the tunneling of escaped electrons from the shallow traps to deep traps at room temperature. Additionally, the OSL signals from the BeO pellets were first observed as very stable up to 1 week and slightly decreased (~10%) up to two weeks when compared with the first readout OSL signals. At the end of the three months, the material decreased to almost same level as the second week.

Dose Response

Irradiation: (0.1-50) Gy beta dose
Pre-heating: 120° C. (with heating rate 5° C./s for 60 s)
TL reading: 650° C. (with heating rate 1° C./s)
OSL reading: 200 sec. with 2000 data (time per data point: 0.1s)

Dose dependence of the OSL signals of BeO:Na(5%), Dy(0.1%), Er(0.05%) pellets and Thermalox995 BeO chips were checked between 0.1 Gy and 50 Gy beta doses. The exposed doses were 0.1, 0.2, 0.5, 1, 2, 5, 10, 20 and 50 Gy. The OSL signals were obtained from irradiated three samples of BeO:Na(5%), Dy(0.1%), Er(0.05%) pellets and Thermalox995 BeO chips by a 200 seconds blue light stimulation at room temperature, after preheating the samples at 100° C. for 10 s to remove the unstable signals (See FIG. 10). After each experimental cycle with the determined dose value, the residual signals of samples were depleted performing TL measurements from 50° C. up to 650° C. with the heating rate of 1° C./s.

Figure 10:
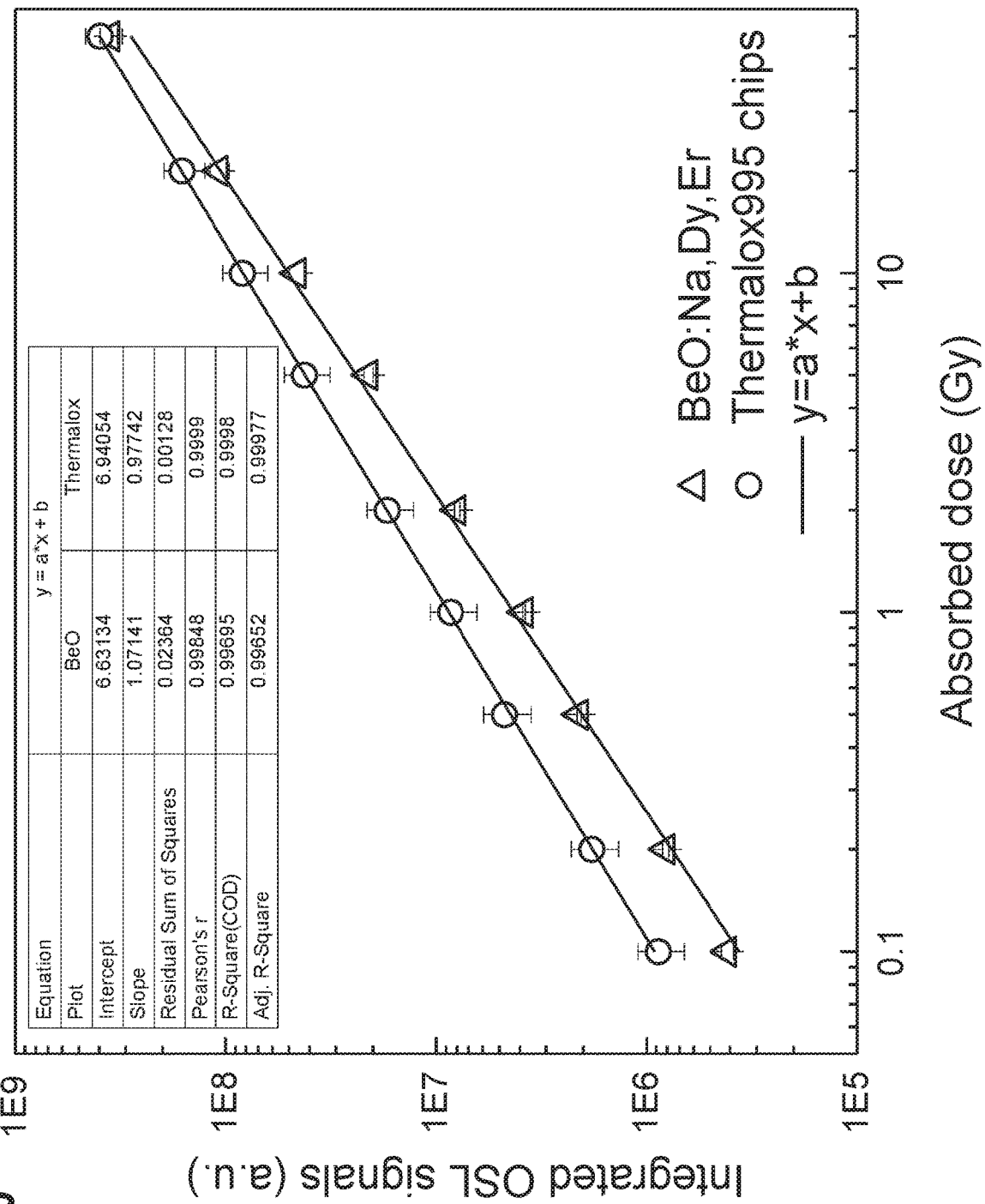
FIG. 10 depicts dose-responses of BeO:Na(5%), Dy(0.1%), Er(0.05%) pellets and Thermalox995 BeO chips.

As is seen from the FIG. 10, the integrated total OSL signals of the samples were fitted very well to a linear function (y=a*x+b). For BeO:Na(5%), Dy(0.1%), Er(0.05%) pellets and Thermalox995 BeO chips, the slope values of the fitted curves were found as 1.07 and 0.97, respectively. As a result, one may say that while BeO:Na (5%), Dy(0.1%), Er(0.05%) pellets shows sublinear characteristic; Thermalox995 BeO chips shows supralinear characteristic in the range of 0.1 Gy and 50 Gy.

Figure 11:
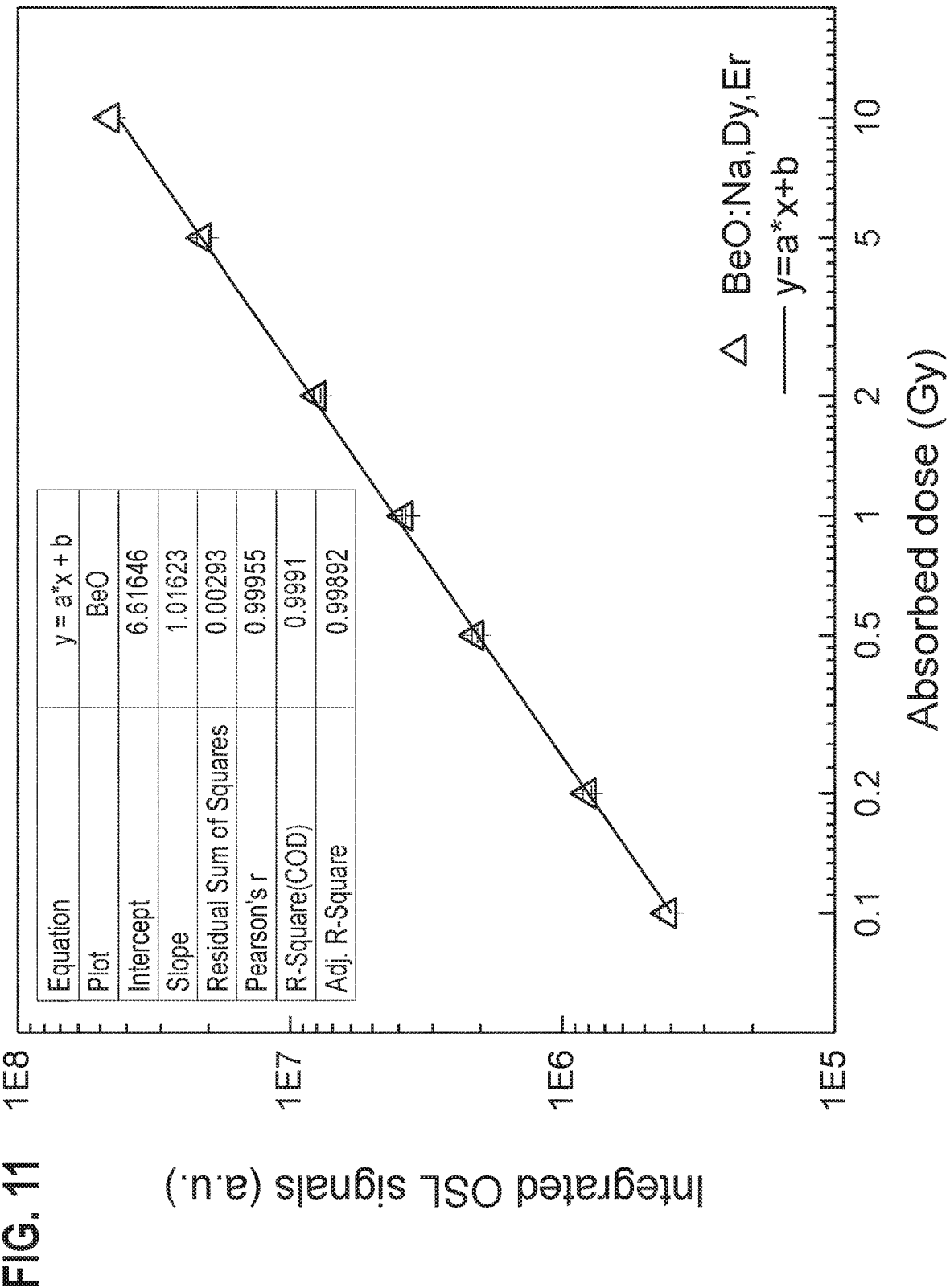
FIG. 11 depicts dose-response of BeO:Na(5%), Dy(0.1%), Er(0.05%) pellets up to 10 Gy.

In order to investigate linear characteristic region of BeO:Na(5%), Dy(0.1%), Er(0.05%) pellets, dose response curve was plotted from 0.1 Gy up to 10 Gy and fitted with a linear function (see in FIG. 11). According to this fitting, slope value was found as 1.01, and this result shows that OSL signals of BeO:Na(5%), Dy(0.1%), Er(0.05%) pellets have very good linear property up to 10 Gy.

On the other hand, the minimum detectable dose (MDD) of an OSL system is an important parameter to describe the ability of the system to measure low doses. The MDD is dependent on both the sensitivity of the reader and of the detector and can be estimated as the dose corresponding to three times the experimental standard deviation of the background.

The expression used in this work to calculate the MDD of a system was $$MDD = \left[\frac{3 \cdot s(BG)}{a}\right] \quad (1)$$

where s(BG) is the experimental standard deviation of the background measured using bleached detectors and, a, is the sensitivity (counts/mGy). In this case, a is the angular coefficient of the linear calibration curve obtained using detectors irradiated with known doses. As a result, MDD values were calculated and given in Table 1.

TABLE 1

Minimum detectable doses of BeO:Na(5%), Er(0.05%), Dy(0.1%) pellets and Thermalox995 BeO chips according to the total area and maximum intensity of the OSL signal with apparatus.
MDD (with Apparatus)

| # | Using total area | Using max intensity |
|---|---|---|
| BeO:Na, Dy, Er | 116.8 ± 2.3 µGy | 121.6 ± 6.6 µGy |
| Thermalox995 chip | 10.9 ± 2.9 µGy | 12.6 ± 1 µGy |

TABLE 2

Minimum detectable doses of BeO:Na(5%), Er(0.05%), Dy(0.1%) pellets and Thermalox995 BeO chips according to the total area and maximum intensity of the OSL signal without apparatus.
MDD (without Apparatus)

| # | Using total area | Using max intensity |
|---|---|---|
| BeO:Na, Dy, Er | 8.2 ± 0.8 µGy | 5.7 ± 0.2 µGy |
| Thermalox995 chip | 0.9 ± 0.2 µGy | 0.6 ± 0.1 µGy |

Energy Response

Figure 12A:
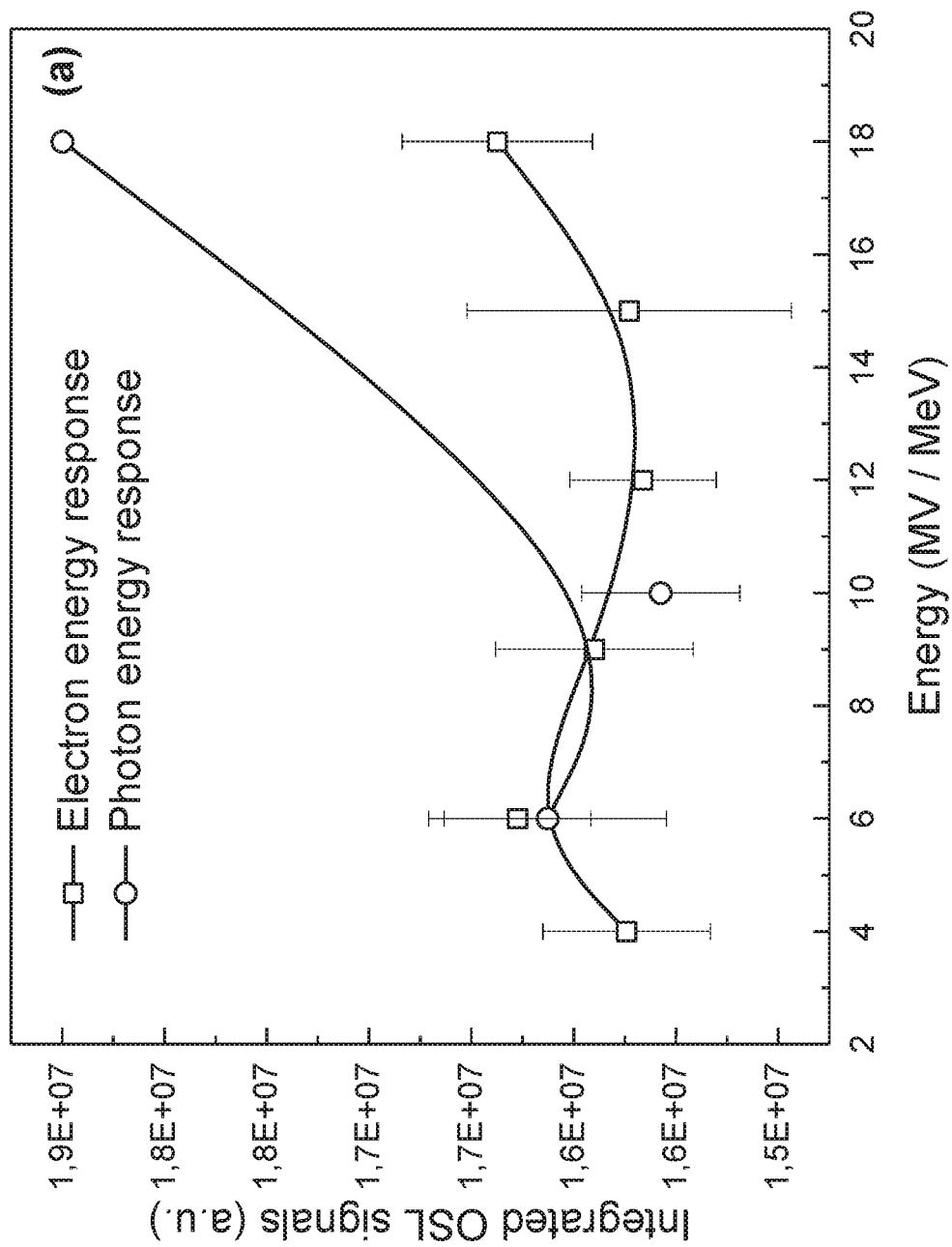
FIG. 12A shows various photon and electron energy dependence of BeO pellets for 0.2 Gy dose from a LINAC-MV energies.
Figure 12B:
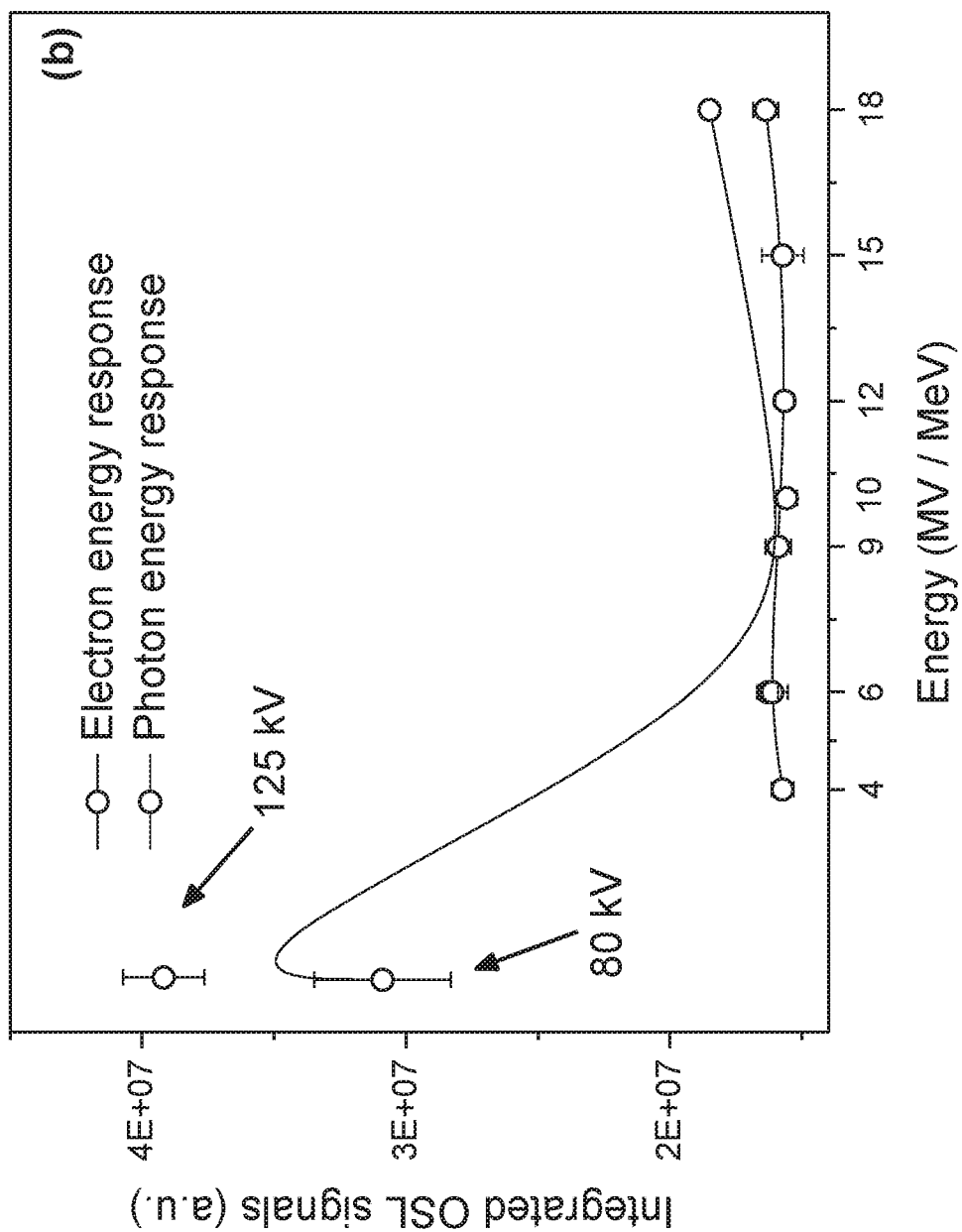
FIG. 12B shows various photon and electron energy dependence of BeO pellets for 0.2 Gy dose from Luminos Fusion fluoroscopy equipment-kV energies.

The BeO:Na(5%), Er(0.05%), Dy(0.1%) pellets were irradiated with electrons and photons having various energies. The absorbed dose amount was performed as 0.2 Gy for each irradiation. The electron energies used were 4, 6, 9, 12, 15 and 18 MeV from a linear accelerator. X-ray irradiations were performed with photons from a 6, 10 and 18 MV linear accelerator and a 0.385 MeV[192] IR source. In FIG. 12A, the distribution of data points is depicted as OSL sensitivity of samples versus photon and electron energies at the high energies. The upper and lower experimental standard deviation bar values of each data point for each energy value are overlapping with the other data's standard deviation bar. The results indicate that the OSL data of the energy response of BeO:Na(5%), Er(0.05%), Dy(0.1%) pellets did not change with different energy values except 18 MeV. Additionally, the photon response with the lower energy were plotted in FIG. 12B. According to the plot, BeO:Na (5%), Er(0.05%), Dy(0.1%) pellets were found to be more sensitive at low energy exposure.

Thermal Quenching

Figure 32A:
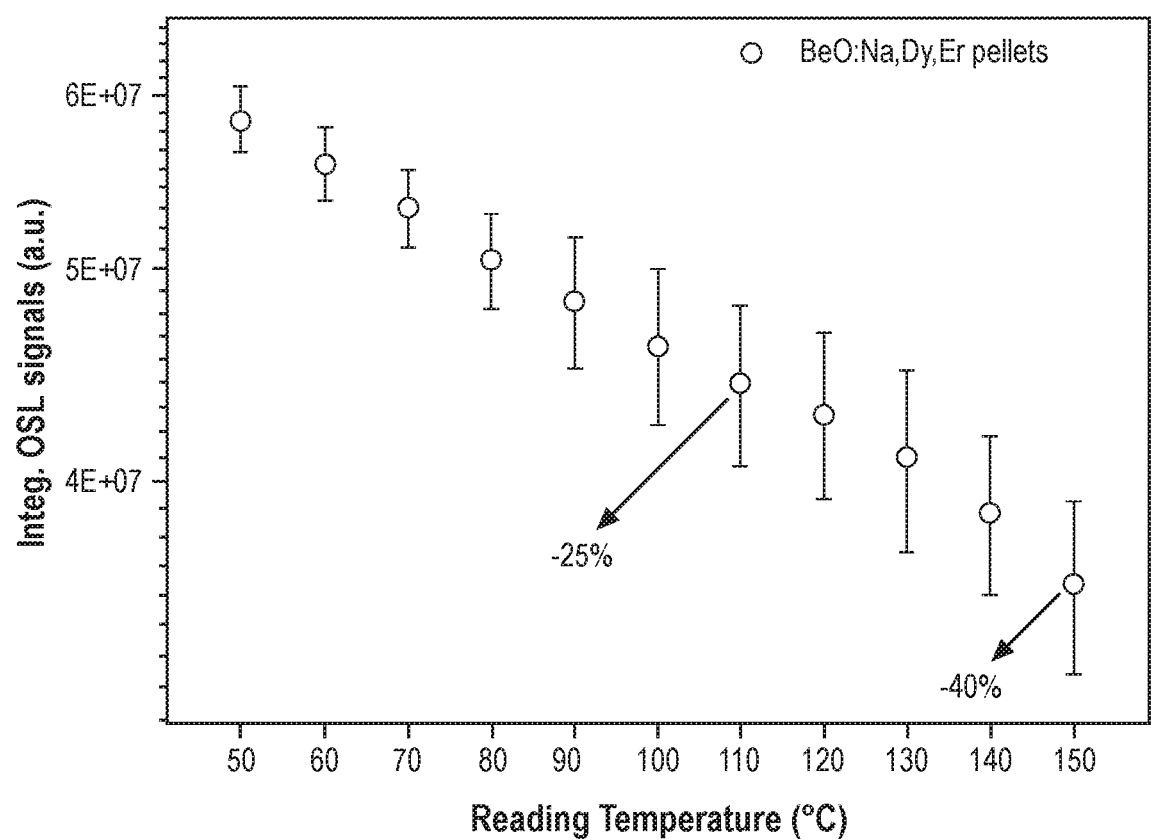
FIG. 32A. Integrated OSL signals of the BeO:Na,Dy,Er ceramic pellet at various reading temperatures after the irradiation with 0.5 Gy beta dose and preheating the samples at 110° C. for 60 s.

With the reduction in luminescence efficiency at temperatures higher than room temperature, thermal quenching is observed in many materials. In order to investigate the presence of thermal quenching which gives information about the increase in probability of non-radiative transitions from the excited to the ground state of the luminescence centers (the Mott-Seitz model) 1, the study of temperature dependence of OSL signals from the studied BeO:Na,Dy,Er ceramic pellet was checked after the irradiation with 0.5 Gy beta dose and preheating at 110° C. for 60 s. The temperature dependence of the OSL signal can be expressed by a function of the type $$I_{OSL}(T) = \eta(T) I_{OSL} = I_{OSL}/(1 + C \exp(-E_Q/kT))$$

where $I_{OSL}$ is OSL signal; $\eta(T)$ is luminescence efficiency as a function of temperature; C is a constant; $E_Q$ is the thermal activation energy for the non radiative process; k is the Boltzmann constant and T is the absolute temperature. In this work, OSL signals were obtained at various reading temperatures ranging from 50 to 150° C. with 10° C. increments as seen in FIG. 32A. After each OSL measurement, residual luminescent signals were deleted by performing TL readouts up to 650° C. and the samples were irradiated again with the same dose for the next measurement. As is seen from FIG. 32A, the reduction in luminescence intensity with increasing readout temperature demonstrates the presence of the strong thermal quenching. The integrated OSL signals obtained at 110° C. decreased by ~25% and at 150° C. decreased by ~40% when compared with that of OSL signals obtained at 50° C.

Figure 32B:
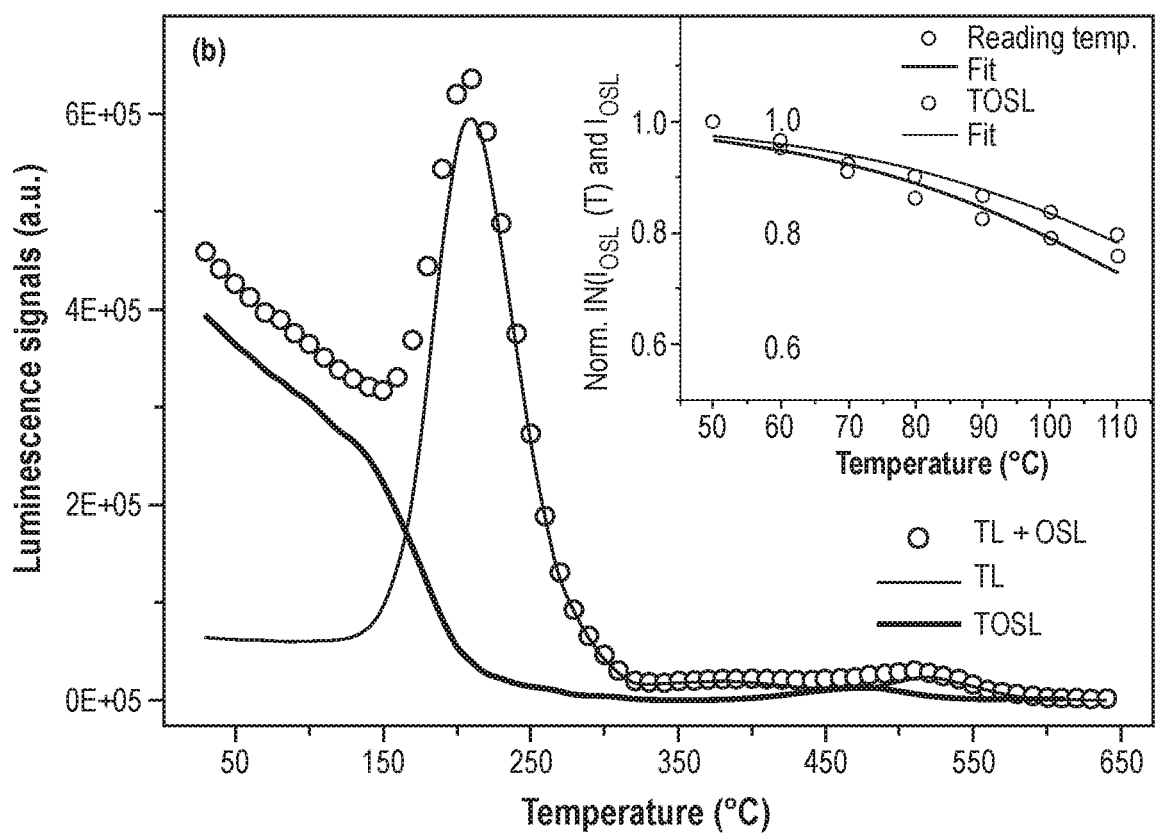
FIG. 32B. The TOSL curves from 0.5 Gy irradiated pellets for the BeO:Na,Dy,Er ceramic pellet. Insets: calculation of the thermal quenching energy using the signal intensities of TOSL curves and OSL signals obtained at various readout temperatures ranging from 50° C. to 150° C.

On the other hand, in order to get information about thermal quenching mechanism, TOSL curves can be used as an alternative method. A TOSL curve indicates the temperature dependence of the OSL signal which is obtained by subtracting the TL curve from the TL curve obtained with OSL stimulation. Here we used 0.1 s pulsed stimulation with 0.9 s time interval between the pulses while TL readout. The signals measured during the light stimulations are the combinations of the OSL as a function of temperature and the TL (i.e. TL+OSL). The measurements performed during the time interval between the pulses give the TL signals (TL). The difference between the TL+OSL and TL curves gives the TOSL curve providing information about the temperature dependence of the OSL process. FIG. 32B shows TL+OSL, TL and TOSL curve for the BeO:Na,Dy,Er with TL readout up to 650° C. at a rate of 5° C./s having blue-light stimulation at the same period. In FIG. 32B, from the TOSL curve, the OSL outputs have two decreased curves. First decrease is from 50° C. up to 150° C. and second one begins with 150° C. and reach to zero level at 250° C. It can be inferred that the first sharp decrease may be associated with the strong thermal quenching and the second decrease may be responsible for emptying the 170° C. dosimetric peak. The thermal quenching energies of the materials were evaluated using the data collected in OSL readouts (see FIG. 32A) and by fitting them into the Equation (2). We also used the reduction data in the initial parts of TOSL curves to evaluate the thermal quenching energies (see FIG. 32B). The obtained data were fitted to the curve given by Equation (2). The fitting curves and the estimated E_Q values (0.43 and 0.42 eV) using both methods were presented in the graphs of the insets of FIG. 32B, which plot the OSL signal intensity as a function of temperature.

Description of Invention for OSL Reader

There is provided herein an Optically Stimulated Luminescence (OSL) reader for obtaining the measurements of radiation exposure for BeO based compounds including BeO doped with Na, Dy, Er using OSL and for obtaining improved accurate OSL measurements over a great range of radiation exposures. This invention is a part of a dosimetry system which consists of BeO based novel OSL dosimetric materials including BeO doped with Na, Dy, Er and an OSL reader measures OSL versus time response from the predetermined materials obtained during blue light stimulation. In more particular, this invention provides a reliable dose value over a wide range of radiation doses exposed to OSL dosimetric materials including BeO doped with Na, Dy, and Er.

OSL Reader

Design and Construction of Portable OSL Reader

Figure 13:
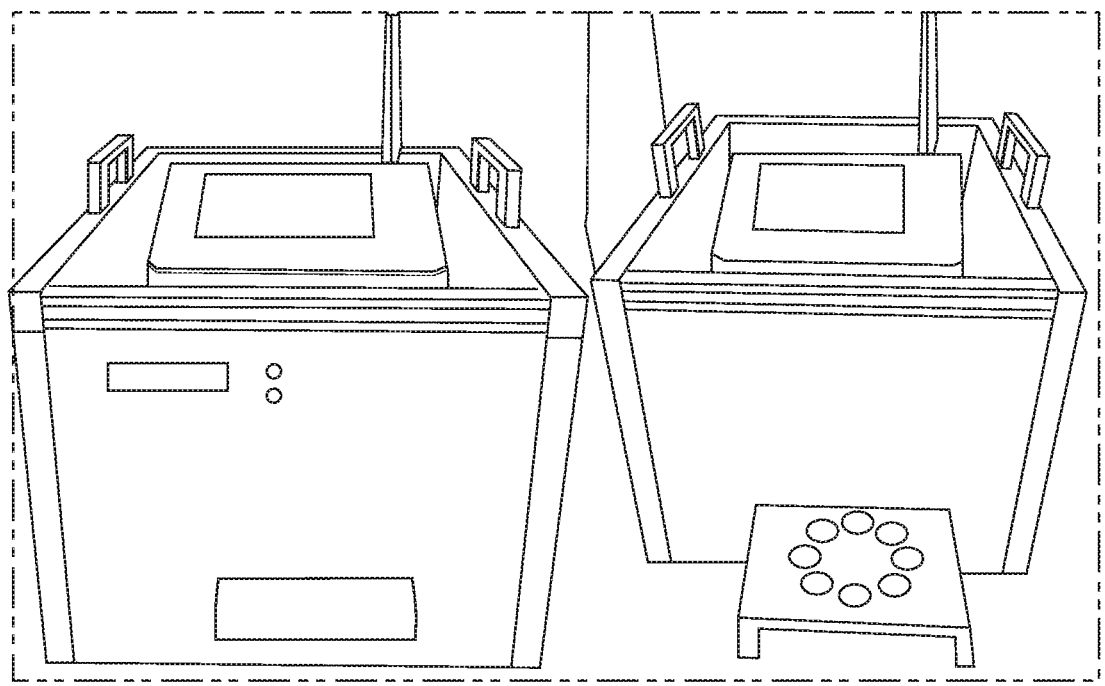
FIG. 13 depicts an OSL reader

An OSL measurement system should meet some essential criteria such as a stimulation light source with proper wavelength and power density, a luminescence detection system with high sensitivity and reliable sample positioning for automated multi-sample measurements. The system and its properties are shortly summarized below. The design consists of three main parts: 'measurement chamber', 'motorized sample changer unit' and 'measurement electronics and software'. General overview of the system can be seen in FIG. 13.

Figure 14:
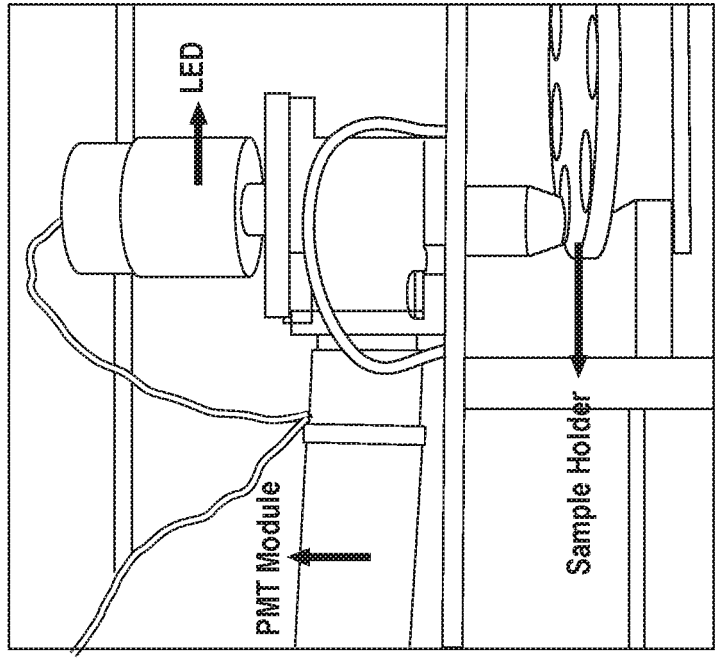
FIG. 14 depicts a simplified sketch of the measurement chamber (LEFT); picture of measurement chamber (RIGHT).
Figure 14:
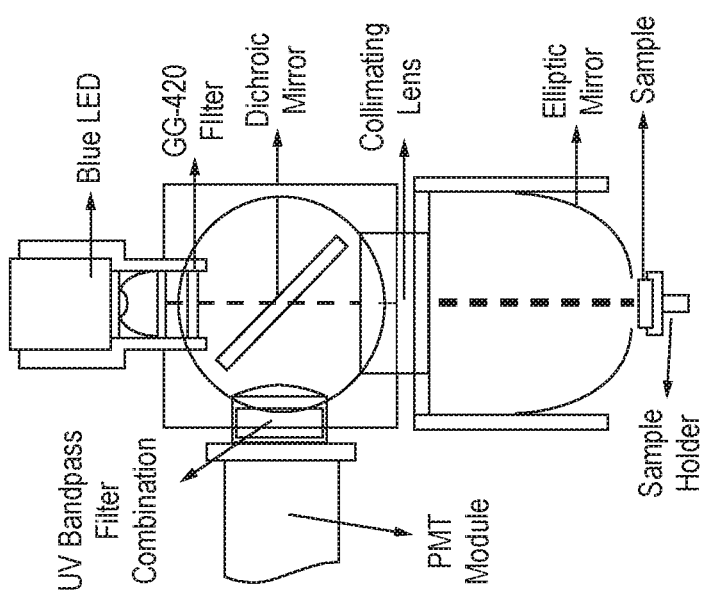

Measurement Chamber. Generally, commercial OSL dosimetry materials are stimulated using visible light whereas emission occurs at near ultraviolet (UV) region. BeO chips produced by Çukurova University group work in the same manner. Our portable OSL reader's measurement chamber designed for measuring these types of detectors. On the other hand, it is possible to change detection system for non-conventional dose detectors (such as TLD-400 and YAP:Mn, emitting in the visible region of the spectrum). A simplified view of the measurement chamber and a photo of the constructed reader is shown in FIG. 14.

Figure 15:
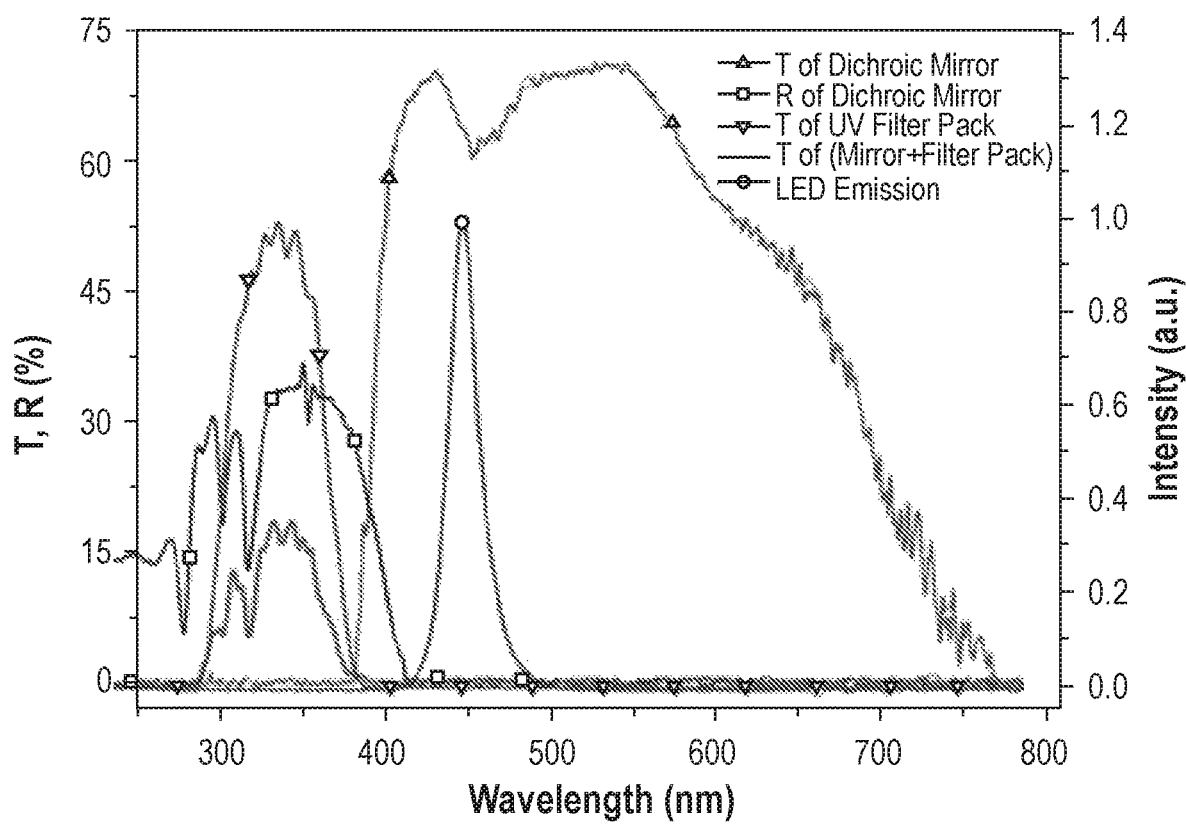
FIG. 15 depicts transmission spectrum of dichroic mirror (green/triangle). Reflection spectrum of dichroic mirror (black/square). Transmission spectrum of the UV filter pack (purple/reverse triangle). Transmission spectrum of dichroic mirror and UV filter pack combination (red/no symbol). Emission spectrum of Light Emitting Diode (blue/circle). Reflection and transmission spectra of the dichroic mirror are measured at 45° incident angle.

The measurement chamber consists of a high power blue LED ($\lambda$peak ~475 nm, Cree XQEBLU-SB-0000-000000Y01), photomultiplier tube (PMT) module, and associated optics for collimating and collecting stimulation and emitted light. It is placed on top of the measurement chamber and the. The emission was collimated using acrylic non-imaging optics. Optical properties of the measurement chamber including the LED emission spectra and filter characteristics are presented in FIG. 15.

The short wavelength emission from the LED was filtered using a glass long pass filter (Schott, GG420). Between the LED and the sample holder a dichroic mirror (which passes the visible and reflects the UV light) is placed at an angle of 45 degrees. After passing the dichroic mirror, the stimulation light is conveyed to the sample through a focusing optics (a UV grade biconvex lens) and illuminates the sample holder uniformly. The collimated luminescence light is reflected (with the help of the dichroic mirror) to the photo detector, which is located on the side of the measurement chamber. After passing a UV band pass filter (Hoya U-340+Schott DUG 11 combination with a pass band of 280-380 nm) the luminescence light reaches the PMT module.

Figure 16:
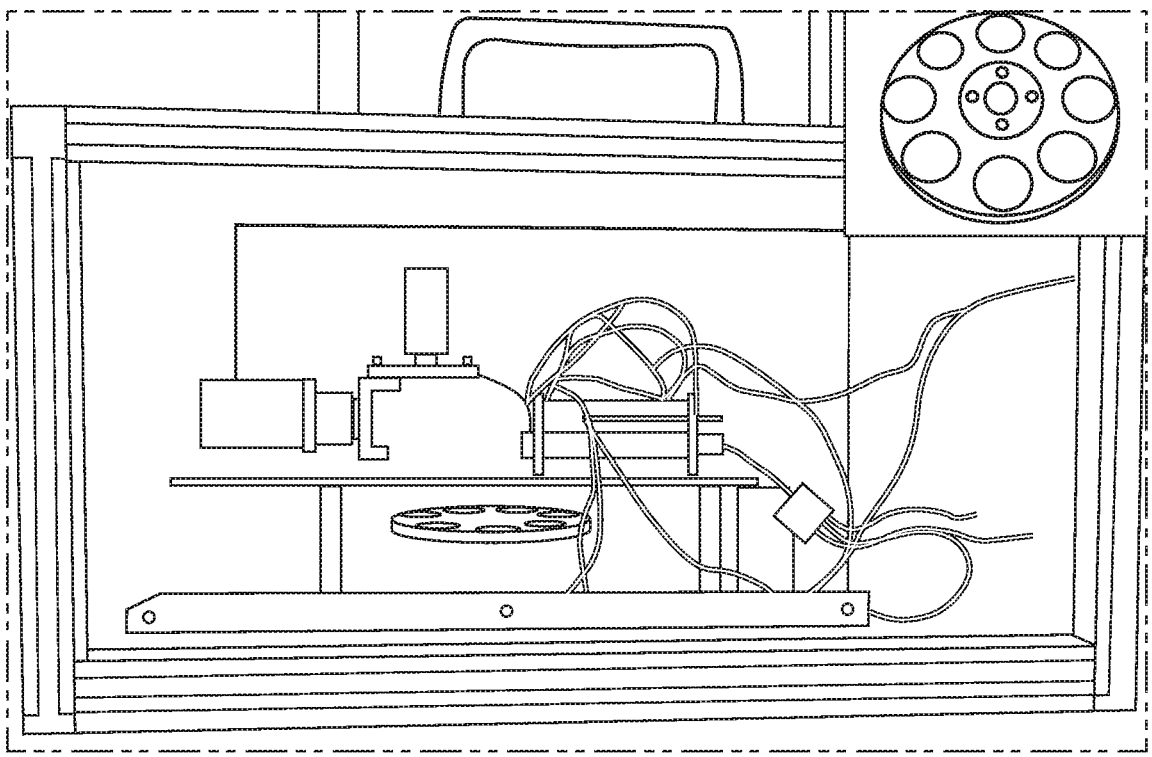
FIG. 16 Side view of the reader and picture of sample holder.

Motorized Sample Changer Unit. The OSL reader was designed for measuring the OSL from 8 samples. For this purpose, a sample wheel is rotate using a stepper motor and can bring the sample of interest to the focal plane of the focusing optics of the measurement chamber. A side view of the measurement chamber and the sample tray can be seen in FIG. 16. The sample tray is placed on a drawer mechanism so that it can go out for loading samples to the reader. It can be taken in and out using a switch placed on the front face of the reader unless there is an ongoing measurement process. Both sample wheel and drawer mechanisms are running with the help of stepper motors.

Figure 17:
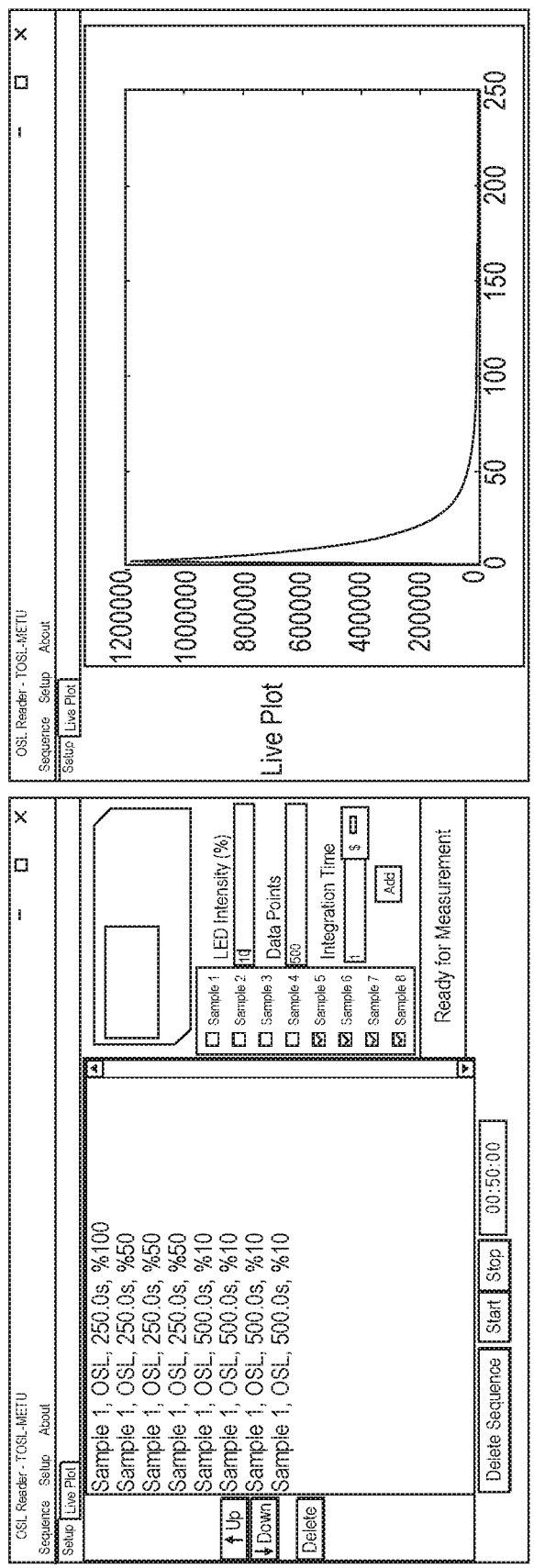
FIG. 17 Screenshot of user interface software: Setup Tab Section (LEFT), Live Plot Tab Section (RIGHT).

Measurement Electronics and User Interface Software. The core control system of the OSL reader is an Arduino DUE single-board microcontroller, which operates an Atmel SAM3X8E ARM Cortex-M3 CPU running at 84 MHz. This microcontroller is responsible for control of sample tray motors, control of stimulation light, counting pulses coming from PMT module and any other electronic switches and indicators. The firmware that controls the mentioned tasks were developed with a modified C language using the Arduino's integrated development environment (IDE). In order to control the measurement system, collect and store measured data, a user interface software is written Python language. The software enables the user to create a measurement sequence for each individual dosimeter; runs these sequences and handles data coming from Arduino DUE microcontroller board. The measurement data is presented graphically and can be stored for further analysis. A screenshot of the designed PC software is given in FIG. 17.

Figure 18:
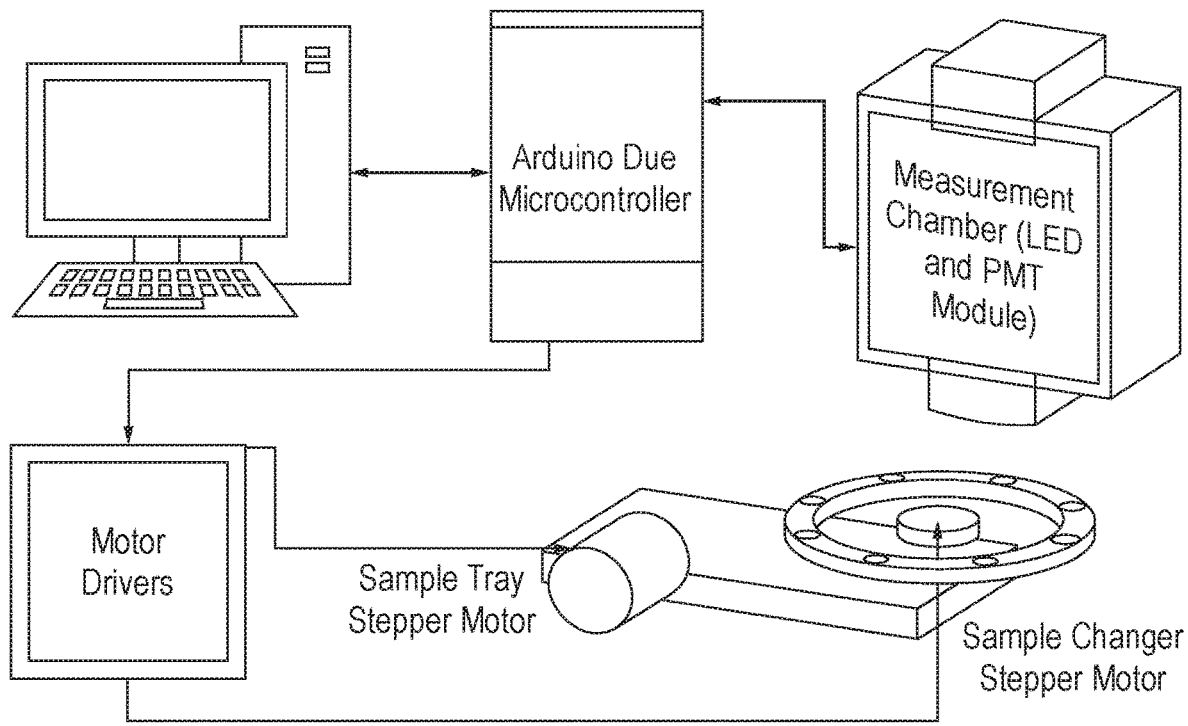
FIG. 18 Simplified block diagram of the reader.

The main objective of the user interface software is to allow users to define measurement sequences, to handle the order of measurements by sending appropriate commands to Arduino, to obtain measurement data from the microcontroller and to save as a tab separated text file to the computer. Users also can observe ongoing measurement using 'Live Plot' tab section. For every measurement step, the PC software and the microcontroller need to communicate with each other. Every time the device is powered on, it moves tray inside and find sample position 1. After initialization process is complete, the microcontroller informs PC software that the device is ready for measurement. Once samples are loaded into the instrument and the parameters for the measurement sequence are entered by the user, the PC software stores them and waits for 'Start' button on the software screen to be pressed. A simplified block diagram of the system showing the main parts of the measurement system can be seen in FIG. 18.

After that, the user interface software sends the parameters of the measurement sequence to the microcontroller for every step of sequence. Then, the microcontroller first sets the desired sample position and initializes timers and counters for data collection timing and photon counting. Recorded data is sent to computer and saved as a tab separated text file. The data is then displayed on a plot and saved for further analysis for dose evaluation.

Figure 19:
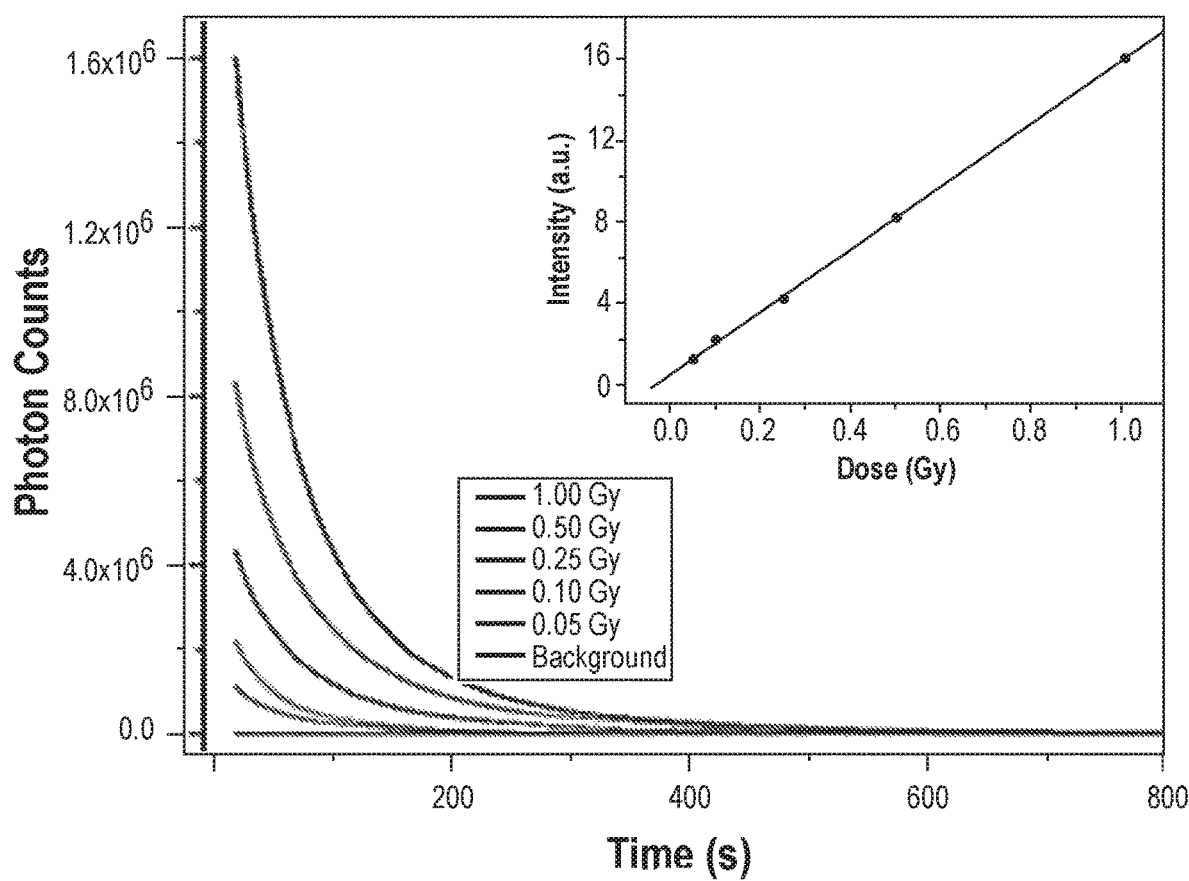
FIG. 19 Decay curves of BeO (Thermalox 995, Brush-Wellman Inc.) chips with different doses. Inset: Dose response of BeO (Thermalox 995, BrushWellman Inc.) chips in the interval 0.05 Gy to 1.00 Gy.

Operation Testing. After having completed the system its lab tests for electronic and mechanical validation. The functionality of the OSL measurement system was tested using luminescence materials relevant for radiation dosimetry. For this purpose, BeO (Thermalox 995, BrushWellman Inc.), Al2O3:C (Landauer Inc.) chips are used. In FIG. 19, decay curves of BeO chips with different doses is given together with background level (signal measured using non-irradiated chips). This background level is around 350 counts per second. Inset to FIG. 19, dose response of the OSL signal BeO in the interval 0.05 Gy to 1.00 Gy is also shown. LED intensity for these measurements are set to 10%.

Thus, the fulfilled development of OSL reader and performed operation tests with using of produced in frames of the studied dosimeters shows the feasibility of concept put as an approach of invention.

Fiber Optic OSL Probes

DESCRIPTION OF INVENTION

In-vivo measurement of irradiation dose in radiology and radiotherapy requires refined and sensitive remote irradiation dose measurement techniques. Optical fiber dosimetry using OSL probes has been studied as an alternative method of monitoring real time patient dose by different researchers.

Being light weight and nonintrusive, optical fibers based dosimeters provide several advantages in in-vivo medical applications.

The fiber optic coupled radiation dosimeters used have been described in detail previously. This invention suggests that a prototype fiber optic dosimetry system coupled to BeO based dosimeters for example beryllium oxide doped with sodium, dysprosium and erbium, could be designed and developed using optically stimulated luminescence (OSL) technique. The first investigation in to the use of BeO based ceramic dosimeters for example beryllium oxide doped with sodium, dysprosium and erbium as the OSL probe for a fiber coupled luminescence dosimeter can be presented in future work related with BeO. Its feasibility for potential use in radiotherapy dosimetry can be demonstrated in future works.

The fiber optic dosimetry system uses OSL materials like a BeO based ceramic dosimeter for example beryllium oxide doped with sodium, dysprosium and erbium to detect radiation and a bifurcated optical cable to illuminate the sensor with the suitable light source and also to guide the light from the sensor to the detector.

In this invention we suggest a new fiber optic coupled novel OSL dosimeter that is based on the detection of luminescence from a BeO based ceramic dosimeter for example beryllium oxide doped with sodium, dysprosium and erbium. The unique physical and luminescence properties of BeO based ceramic dosimeter for example beryllium oxide doped with sodium, dysprosium and erbium fiber dosimeter as a near tissue equivalent material will permit novel solutions to accurate and reproducible in-vivo dose measurements with a linear dose rate and dose response. It will meet the needs of current radiotherapy with characteristics including real-time, small volume, highly sensitive and reproducible dosimetry.

Description of Method

Currently, in-vivo patient monitoring has mainly been performed using one of four available detector systems; thermoluminescence (TL)/optically stimulated luminescence (OSL) dosimeters, Si-diode detectors, MOSFET, or diamond detectors. Commonly used conventional electronic dosimeter systems have several shortcomings like use of external power supply with a high voltage (HV), degradation, sensitivity changes and no provision for real time dose under irradiation and no tissue equivalence. Fiber optic probes based on OSL are capable of measuring radiation for medical in-vivo applications. Being light weight and nonintrusive, optical fibers provide several advantages in the field of dosimetry. In fiber optic probes based on OSL, the radiation-sensing component is coupled to an optical fiber. Here, the fiber acts only as a wave guiding component to carry an optical signal from the sensing component to a detector.

(Razvan Gaza, Stillwater, Okla. (US); Mark S. Akselrod, Stillwater, Okla.; McKeever, S. W. Stillwater, Okla. (US), Optically stimulated luminescence irradiation dosimetry method to determine dose rates during radiotherapy procedures, United States Patent, Aug. 30, 2005, U.S. Pat. No. 6,936,830 B2)

(Jerimy C. Polf, Razvan Gaza, Stephen W. S. McKeever, Optically stimulated luminescence radiation dosimetry method to determine integrated doses and dose rates and a method to extend the upper limit of measureable absorbed radiation doses during irradiation; United States Patent, February 2006; U.S. Pat. No. 7,002,163 B2)

Two examples of materials used as the radiation-sensing component are Cut-doped silica (Huston et al., 2002) and $Al_2O_3$:C (Polf et al., 2002). Recent work with these materials demonstrates the ability of this sensor architecture to perform nonintrusive, in-vivo monitoring during radiotherapy. If OSL material attached to the end of a multimode fiber optic cable, it emits light when it is stimulated by means of laser. In applications where heating of the tip of the fiber is unacceptable, such as monitoring of dose to tumor during radiotherapeutic treatment of cancer patients, OSL dosimeter has importance where the dose can be read by stimulating with light (Magne and Ferdinand, 2004). Single channel BeO ceramic sensor based fiber optic dosimeter of small sensitive volume has a potential for use a reliable dosimeter in radiotherapy applications (Alaxsandre et al., 2013).

Fiber Optic OSL Probes

Figure 20:
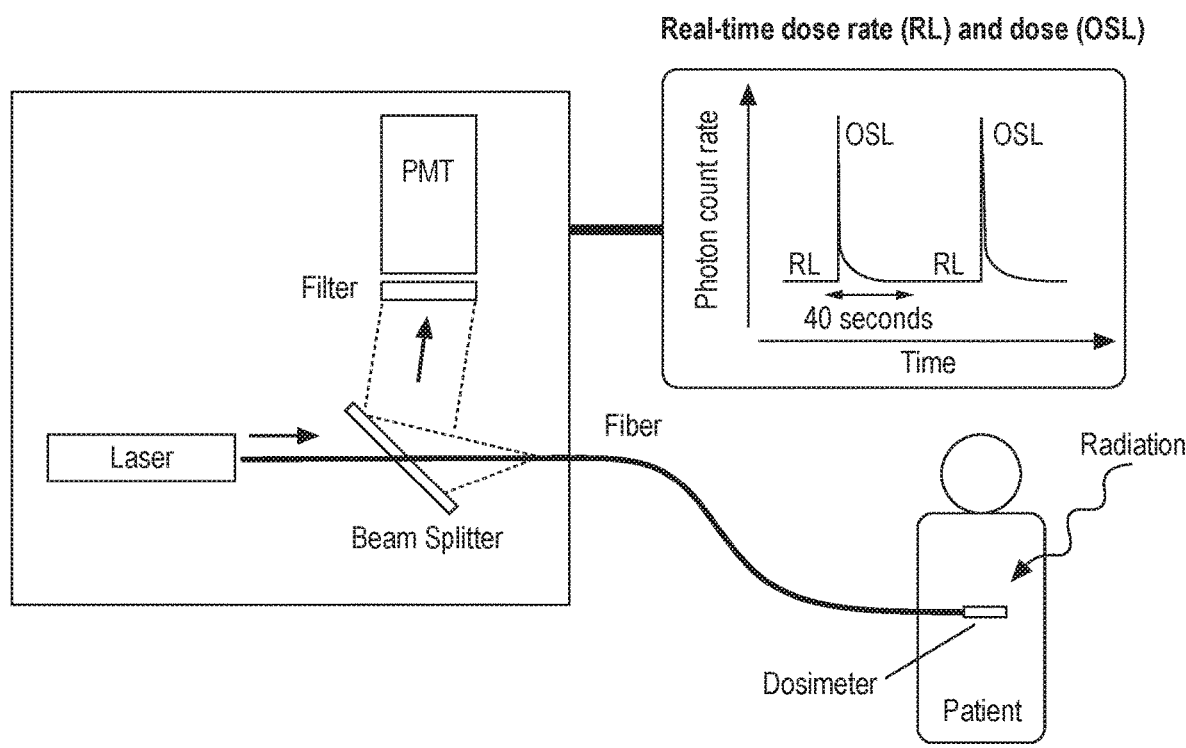
FIG. 20 A schematic diagram of a newly developed remote optical fiber dosimetry system for radiotherapy.

In OSL, since the stimulation wavelength is different from that of the emitted luminescence, such measurements can be carried out using a single optical fiber in connection with a suitable detection filter placed in front of a photomultiplier (PM) detector. Thus, the main advantages of an optical fiber dosimeter over the currently available radiation detectors used in clinical applications are a small-size sensor, and the capability to measure both real tune dose rate and absorbed dose. Furthermore ultrathin fiber dosimeters can be placed either on the body surface or in cavities near the organs of interest. A schematic diagram of a newly developed remote optical fiber dosimetry system for radiotherapy is shown in FIG. 20. To produce OSL a green laser beam is focused through a dicronic color beam-splitter positioned in a 45° angle relative to the incident beam, and via the light fiber into the $Al_2O_3$:C dosimeter. The stimulated OSL signal, which mainly consists of blue light, is sent back from the dosimeter in the same fiber and reflected by the beam splitter into a miniature PM detector. In the current work the fiber dosimeter probe consists of a small single crystal of $Al_2O_3$:C (produced by Landauer Inc.) coupled to the end of a thin fiber made of plastic.

Further Investigations on Fiber Optic OSL Probes

In the last decade, there exits more information available on the fiber optic OSL probes. Unlike $Al_2O_3$:C crystals, BeO ceramics are near water equivalent (Zeff=7.13) and hence have the potential to be a near water equivalent alternative to $Al_2O_3$:C although its potential use as a BeO-coupled fiber optic dosimeter (FOD) has not yet been investigated. BeO may prove to be a more versatile FOD, which can bridge the gap between the near tissue equivalent plastic scintillators and OSL based $Al_2O_3$:C crystals.

A common concern with the use of BeO ceramics has been the toxicity. Inhalation of beryllium has been known to cause a chronic disease called Chronic Beryllium Disease (CBD) (NRC, 2008). BeO in solid form has not been shown to present any health risk. Only in its powder form where inhalation is possible does proper handling need to be considered (Walsh and Vidal, 2009).

Recent studies of Santos et al. at the University of Royal Hospital Adelaide suggest use of BeO as a radioluminescence (RL) and OSL material for fiber optical luminescence dosimetry (Santos et al., 2013; Santos et al., 2014; Santos et al., 2015). Techmann et al. from TU Dresden, Germany, determined the fundamental dosimetric and temporal properties of fiber optic probes based on the RL and OSL of BeO and evaluate its suitability for dose rate measurements in brachytherapy and other applications using non-pulsed radiation fields (Teichmann et al., 2016).

A Mm-Scale Dosimetry System Based on Optically Stimulated Luminescence of Beryllium Oxide Because of their small dimension, almost no active dosimetry systems are able to measure inside the radiation field existing thermoelement pipes. New mm-scale luminescence dosimeters in combination with a packing and transport technique are presented. The dosimeters could measure doses from 0.1 mGy up to more than 100 Gy. Hence, over the possible exposure time durations, dose rates from µGyh−1 up to 1000 Gyh−1 are ascertainable. For potential users the system opens the opportunity for investigation of dose rates inside of shielding and in contaminated environments. Particularly in constricted environments the technique is a unique solution for dose and dose rate measurement tasks.

For more than ten years a valuable dosimetric method employing optically stimulated luminescence (OSL) of the material beryllium oxide (BeO) has been developed at Technical University Dresden (TU Dresden). Since 2006, with the BeOmax reader, a semi-commercial dosimetry system has been available for scientific as well as industrial users. The system has been continuously upgraded and adapted based on the requirements of the users. As a result, several forms of encapsulated dosimeters and handling techniques for bare BeO detectors are now available for dosimetric use. One detector form is a cylindric BeO substrate with a diameter and a height of 1 mm each, which is very useful for dosimetry within small or restricted spaces.

The BeO detector material is offered as Thermalox 995® by Materion Ceramics, Tucson, Ariz. (former known as Brush Wellmann Inc.). According to the intensive use of BeO in electronic industries, the BeO-chips are clearly cheaper than standard luminescence materials.

REFERENCES

Huston A L, Justus B L, Falkenstein P L, Miller R W, Ning H, Altemus R. Optically stimulated luminescent glass optical fibre dosemeter. Radiat Prot Dosimetry 2002; 101:23-6.

Polf J C, McKeever S W, Akselrod M S, Holmstrom S. A real-time, fibre optic dosimetry system using $Al_2O_3$ fibres. Radiat Prot Dosimetry 2002; 100:301-4.

Magne S, Ferdinand P. Fiber optic remote gamma dosimeters based on optically stimulated luminescence: State-of-the-art at CEA. Paper Presented at 11th International Congress of the International Radiation Protection Association, Madrid, Spain; 2004.

Alaxandre M, Santos C, Mohammadi M, Asp J, Monro M T, Afshar VS. Characterization of a real-time fiber-coupled beryllium oxide (BeO) luminescence dosimeter in X-ray beams. Radiat Meas 2013; 53:1-7.

National Research Council, 2008, Managing Health Effects of Beryllium Exposure. Washington, D.C.: The National Academies Press. https://doi.org/10.17226/12464.

Kenneth A. Walsh, Editor: David L. Olson, Edgar E. Vidal, Edward Dalder, Alfred Goldberg, and Brajendra Mishra, Beryllium Chemistry and Processing, ASM International, ISBN: 978-0-87170-721-5.

A. M. C. Santos, Mohammad Mohammadi, Shahraam Afshar, Energy dependency of a water-equivalent fibre-coupled beryllium oxide (BeO) dosimetry system, February 2015 Radiation Measurements 73:1-6, DOI10.1016/j.radmeas.2014.12.0060-87170-721-5.

A. M. C. Santos, M. Mohammadi, and S. Afshar V., "Investigation of a fibre-coupled beryllium oxide (BeO) ceramic luminescence dosimetry system", Radiat. Meas., vol. 70, pp. 52-58, November 2014.

A. M. C. Santos, M. Mohammadi, and S. Afshar V., "Evaluation of a real-time BeO ceramic fiber-coupled luminescence dosimetry system for dose verification of high dose rate brachytherapy", Med. Phys., vol. 42, no. 11, pp. 6349-6356, October 2015.

E. G. Yukihara, "Luminescence properties of BeO optically stimulated luminescence (OSL) detectors", Radiat. Meas., vol. 46, no. 6-7, pp. 580-587, June 2011.

A. Jahn et al., "The BeOmax system—Dosimetry using OSL of BeO for several applications", Radiat. Meas., vol. 56, pp. 324-327, September 2013.

T. Teichmann et al., "Real time dose rate measurements with fiber optic probes based on the RL and OSL of beryllium oxide", Radiat. Meas., vol. 90, pp. 201-204, July 2016.

Marian Sommer, Axel Jahn, Reiner M. Praetorius, Dora Sommer, Juergen Henniger, A mm-Scale Dosimetry System Based on Optically Stimulated Luminescence of Beryllium Oxide for Investigation of Dose Rate Profiles in Constricted Environments, WM2012 Conference, Feb. 26-Mar. 1, 2012, Phoenix, Ariz.

Sommer, M., Freudenberg, R. and Henniger, J. (2007). New aspects of a BeO-based optically stimulated luminescence dosimeter. Radiation Measurements, 42, 617-620.

Sommer, M., Jahn, A. and Henniger, J. (2008). Beryllium oxide as optically stimulated luminescence dosimeter. Radiation Measurements, 43, 353-356.

Sommer, M., Jahn, A. and Henniger, J. (2011). A new personal dosimetry system for HP(10) and HP(0.07) photon dose based on OSL dosimetry of beryllium oxide, Radiation Measurements, 46, 1818-1821.

EXAMPLES

The following examples are given for the purpose of illustration of this invention and are not intended as limitations thereof.

Example 1—Synthesis of BeO:Na(x % Molar)

Beryllium oxide phosphors were prepared using precipitation method. During the production process, sodium (Na) which is the alkali metal group was used with different concentrations as a dopant ion.

Figure 21A:
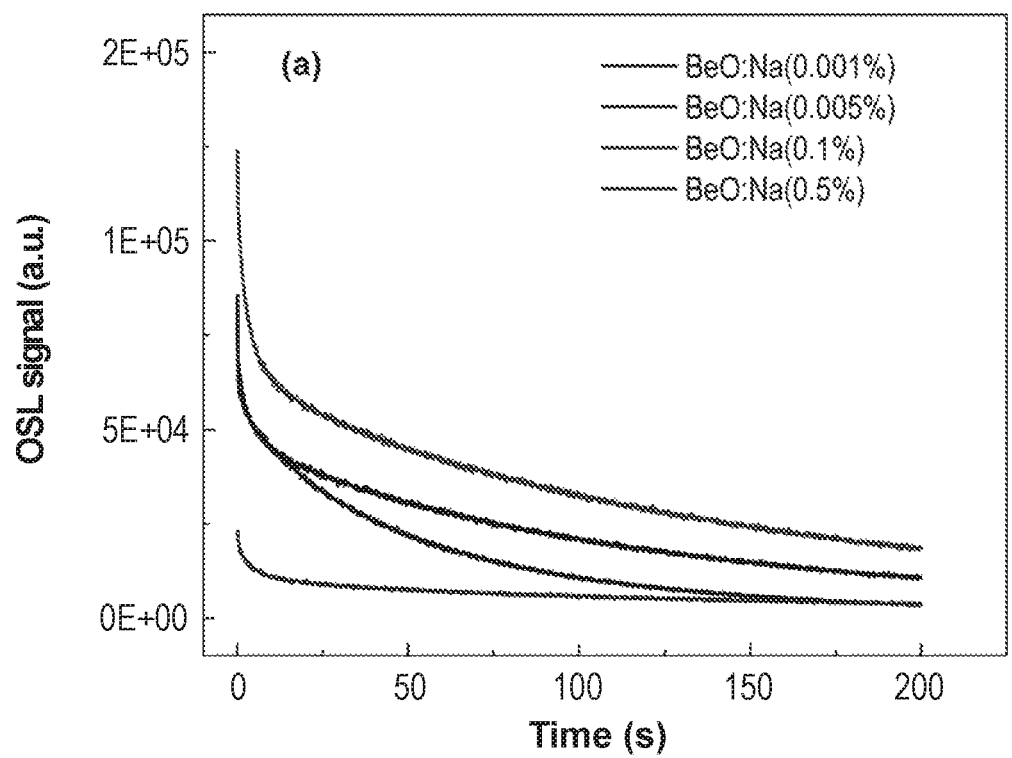
FIGS. 21 A and B. OSL decay curves (a) and integrated OSL signals obtained from Na doped BeO pellets (b).
Figure 21B:
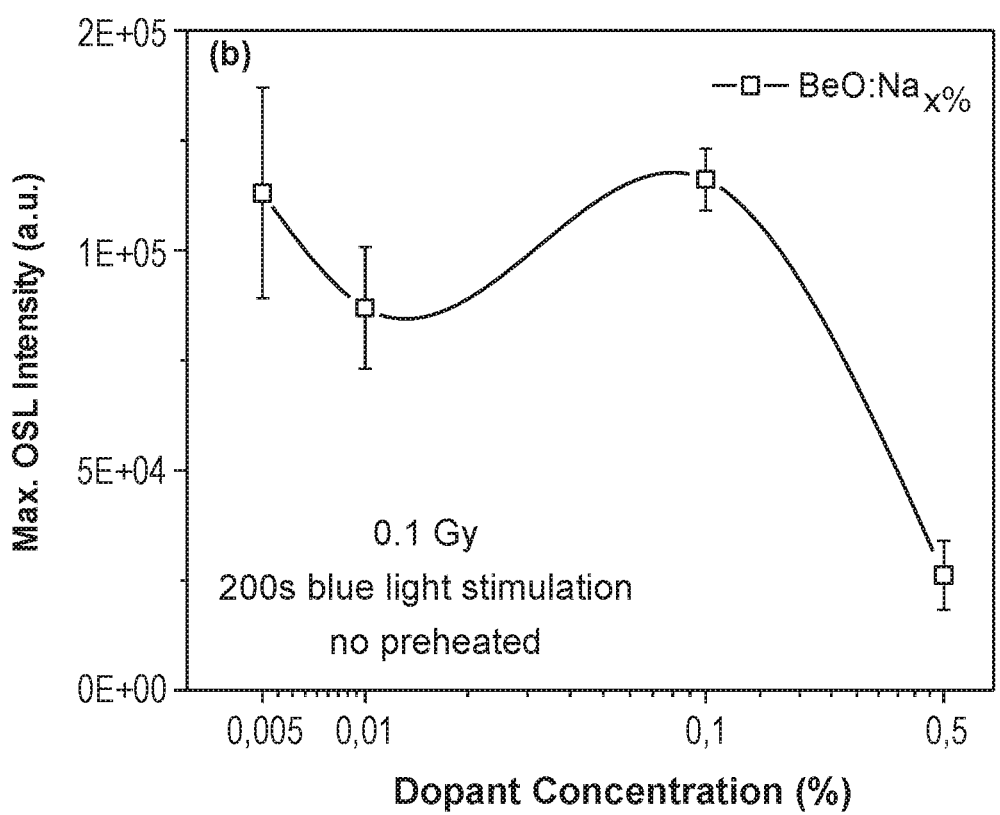

A small amount of pure water was added to the beaker and stirred vigorously. Beryllium sulfate as a starting material was added into pure water and mixed up to the dissolved. Then, sodium nitrate as a dopant was added at different concentration into a resulting solution. When the sodium nitrate is dissolved Alkaline Poly(ethyleneimine) solution which is a precipitator was drop by drop under vigorously stirring. During this step, precipitated material was observed slowly. The pH of the resulting mixture was checked and found to be an acidic solution. Since the medium must be balanced by the acidic-basic level, we can say that the solution has non-precipitated material. If the medium is acidic, we add Ammonium hydroxide solution and balance the pH between 6-7. Obtained mixture was poured into porcelain crucible and dried at 370° C. (this is hot plate temperature) on the hot-plate about 2 hours. Dried precipitate was calcined at 800° C. for 4 hours in air furnace for the burning of organics. Calcined powder was ground in agate mortar and prepared in pellet form by evacuable pellet die. Prepared BeO:Na pellets were measured 6.15 mm in diameter by 0.82 mm in thickness. In order to impart strength and integrity, prepared BeO pellets were sintered using a box furnace at 1600° C. for 4 hours (with 5° C./s heating rate) in the middle of two alumina boat crucibles. OSL signals of Na doped beryllium oxide pellets are shown in FIGS. 21A and 21B.

Example 2—Synthesis of BeO:Dy(x %), Er(x %)

Beryllium oxide phosphors were prepared with double combinations of different concentrations of dysprosium (Dy) and erbium (Er) ions which are the lanthanide group as a dopant ion according to the same procedures in Example 1.

Figure 22A:
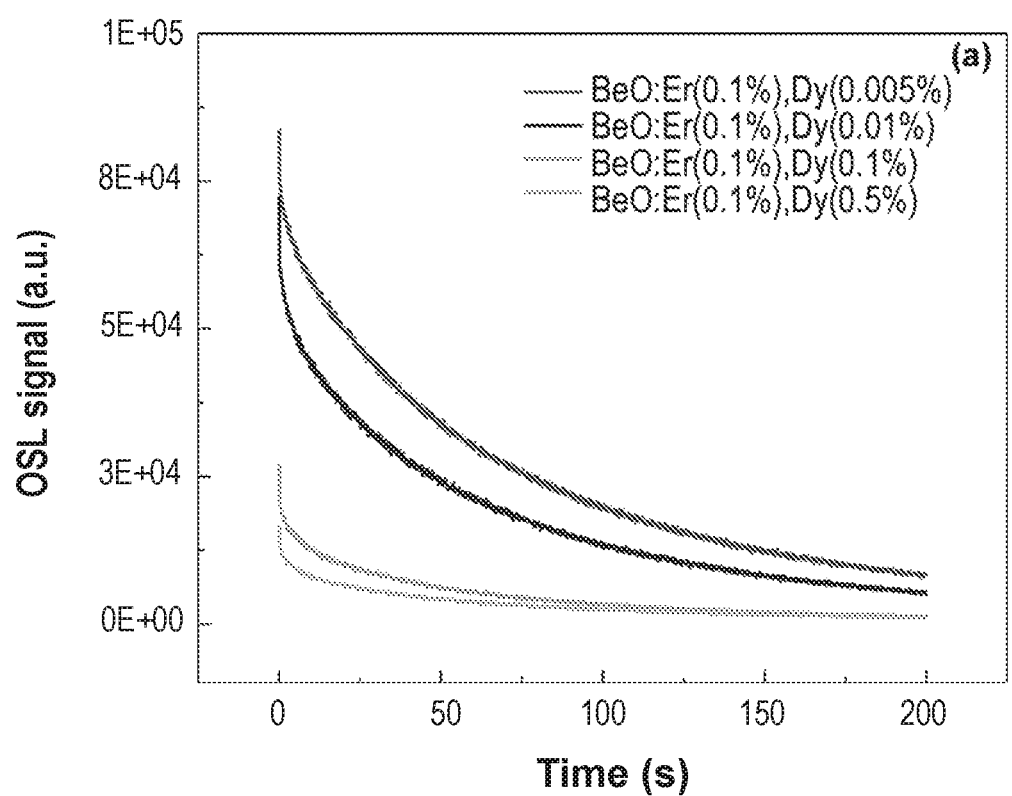
FIGS. 22 A, B, and C. OSL decay curves of BeO pellets doped with different Dy (a) and Er (b) concentrations and maximum OSL intensities versus concentrations (c).
Figure 22B:
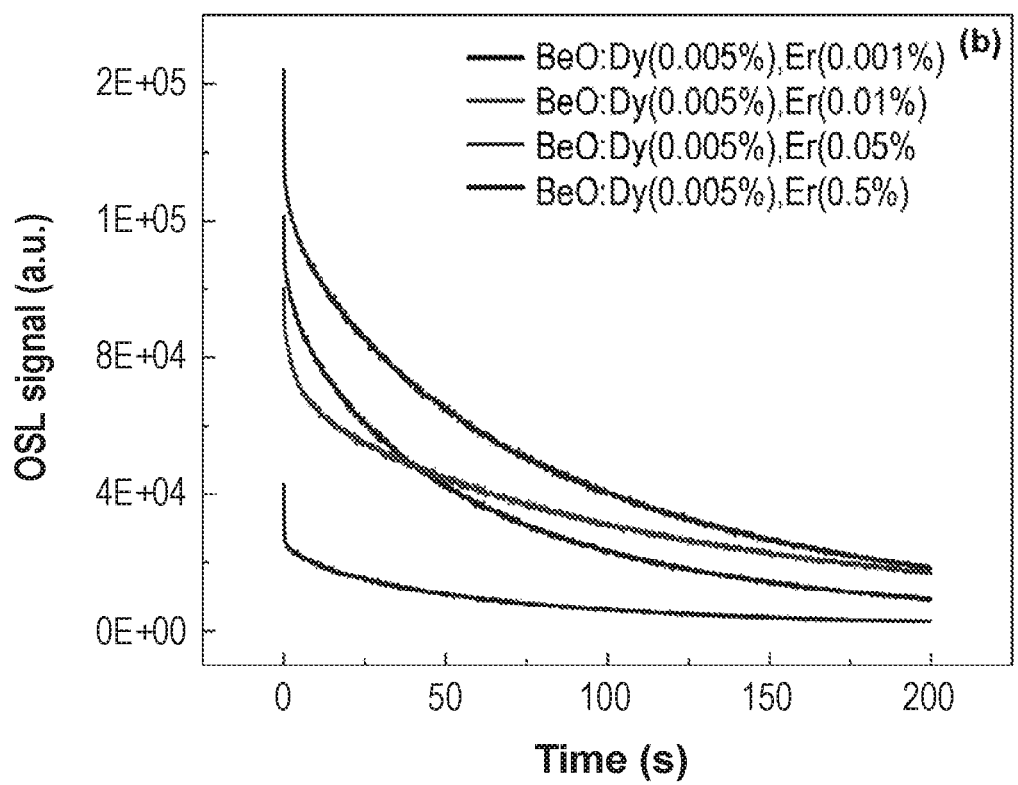
Figure 22C:
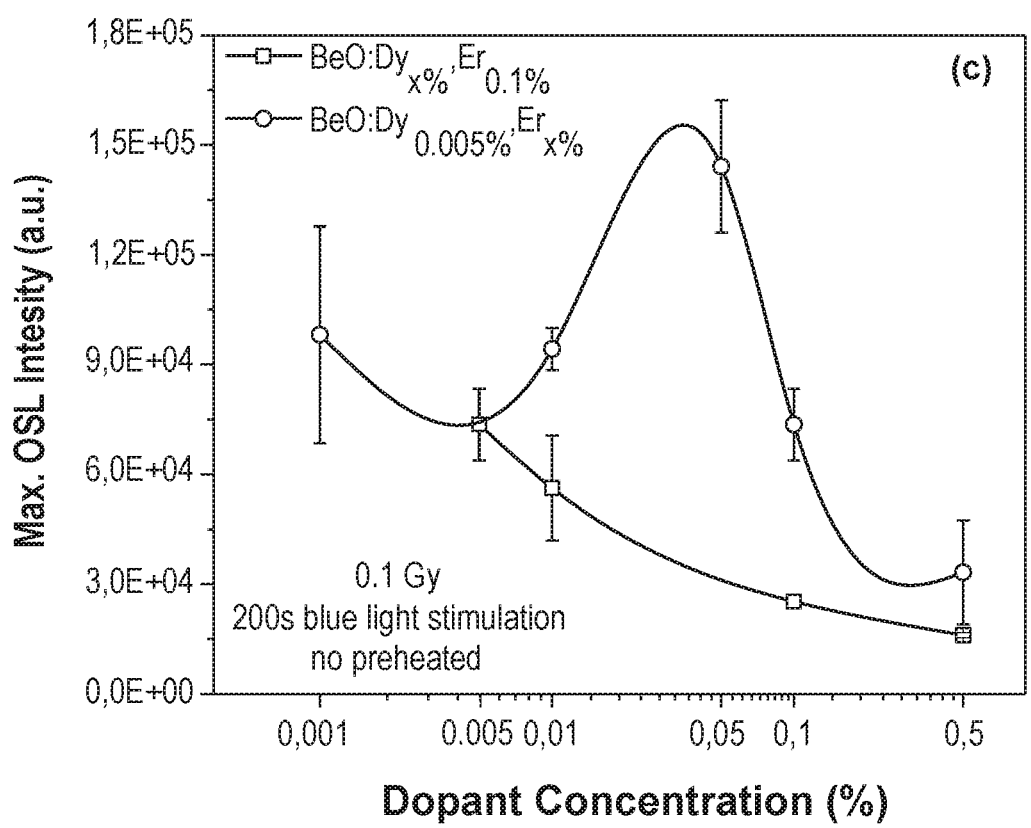

To increase the impurity of the crystal structure new doping were made. Er and Dy lanthanide ions were used as a dopant. Nitrate based Dy and Er ions as a dopant were added at different concentrations into a resulting solution. Keeping constant the concentration of Er as 0.1% molar and changing the concentrations of Dy as 0.005, 0.01, 0.1, 0.5% molar, doping treatments were performed. With the aim of checking the possibility of using OSL signals of BeO:Dy,Er pellets for dosimetric purposes, Luminescence signals were obtained from BeO:Dy,Er pellets which were irradiated with 0.1 Gy dose. Before the OSL measurements, BeO:Dy,Er pellets were annealed at 650° C. for 20 min and the measurements started after half an hour of waiting at the room temperature for stabilization of traps. The maximum intensities of OSL decay curves from Dy and Er doped beryllium oxide pellets were showed in FIG. 22C and the concentration of Dy ion was determined as 0.005%. After the determination of the Dy concentration, Er and Dy dopants were doped keeping constant the concentration of Dy and changing Er concentrations as 0.001, 0.01, 0.05, and 0.5% molar. The highest OSL signals were obtained from BeO:Dy(0.005%), Er(0.05%) (see FIGS. 22A, 22B and 22C).

Example 3—Synthesis of BeO:Na(x %), Dy(x %), Er(x %)

Beryllium oxide phosphors were prepared with triple combinations of different concentrations of Dy, Er and Na ions according to the same procedures as in Example 1.

Figure 23A:
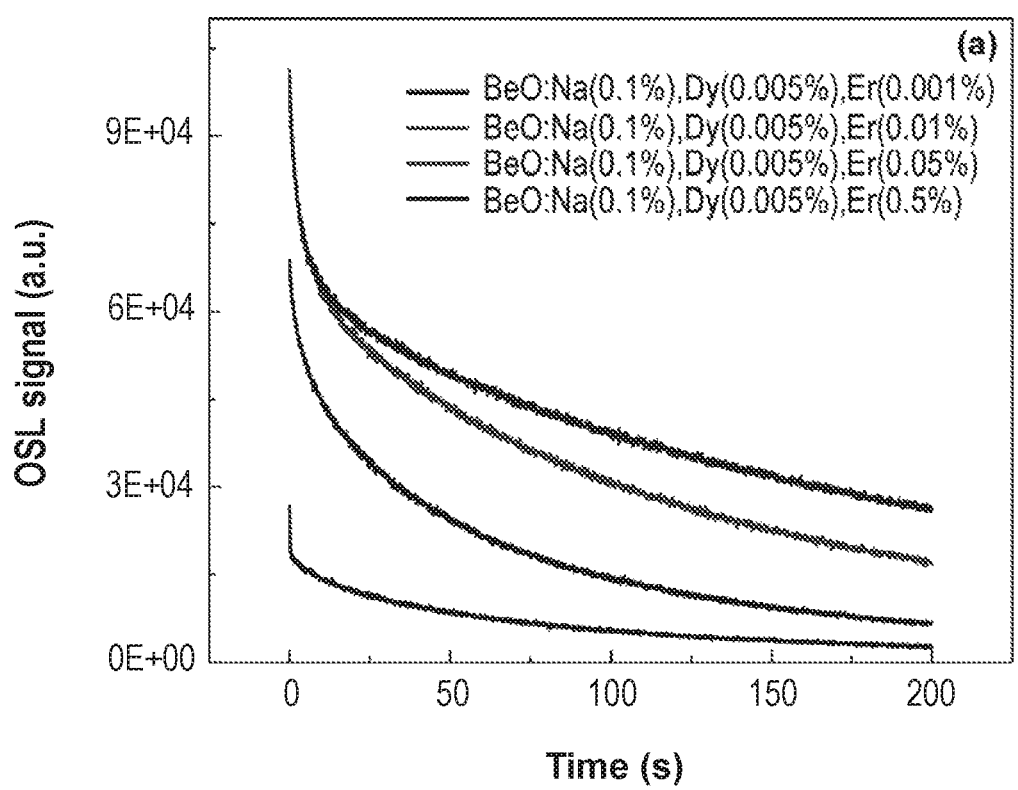
FIGS. 23 A, B, C, and D. Maximum intensities of OSL signals for 0.1 Gy beta irradiation from the triple combination of all different concentrations of Er (a), Na (b) and Dy (c) doped BeO pellets. (d) Maximum intensities of OSL signals for 0.1 Gy beta irradiation from the triple combination of all Na, Dy and Er doped BeO pellets.

Na, Dy and Er were used as a dopant for BeO. Firstly, Na and Dy concentrations were keeping constant 0.1% and 0.005% mole, respectively. Er concentrations were changed about 0.001, 0.01, 0.05, 0.5% mole. With the aim of checking the possibility of using OSL signals of BeO:Na,Dy,Er pellets for dosimetric purposes, Luminescence signals were obtained from BeO:Na,Dy,Er pellets which were irradiated with 0.1 Gy dose. Before the OSL measurements, BeO:Na, Dy,Er pellets were annealed at 650° C. for 20 min and the measurements started after half an hour of waiting at the room temperature for stabilization of traps. The OSL decay curves from Na, Dy and Er doped beryllium oxide pellets were showed in FIG. 23A and the concentration of Er ion was determined as 0.05% molar.

Figure 23B:
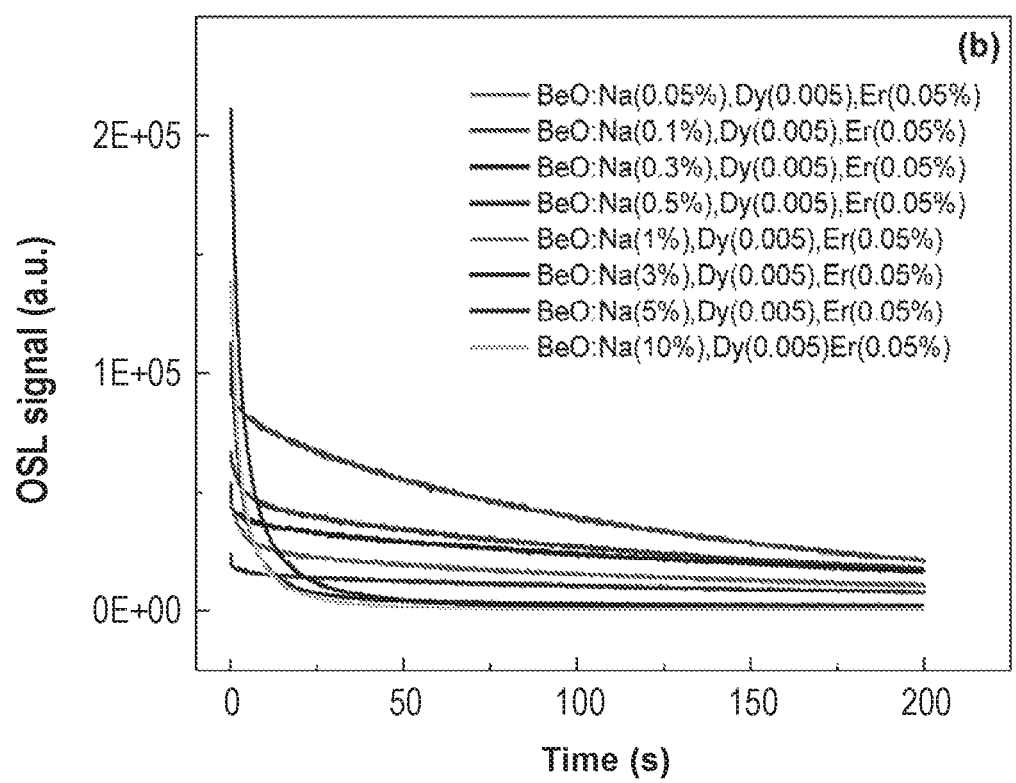

After the determination of the Er concentration, Na, Dy and Er ions were used as a dopant in the same way, but in this case, keeping constant Er (0.05%) and Dy (0.005%) concentrations, changing Na concentrations as 0.05, 0.1, 0.3, 0.5, 1, 3, 5 and 10% molar, doping treatments were performed. Wherein the reason for the use of high concentrations is thought that it will not change the crystallography, due to Na element with lower atomic radius than lanthanide. After the producing the materials, the OSL signals of each pellets were obtained and given in FIG. 23B and the concentration of Na ion was determined as 5% molar.

Figure 23C:
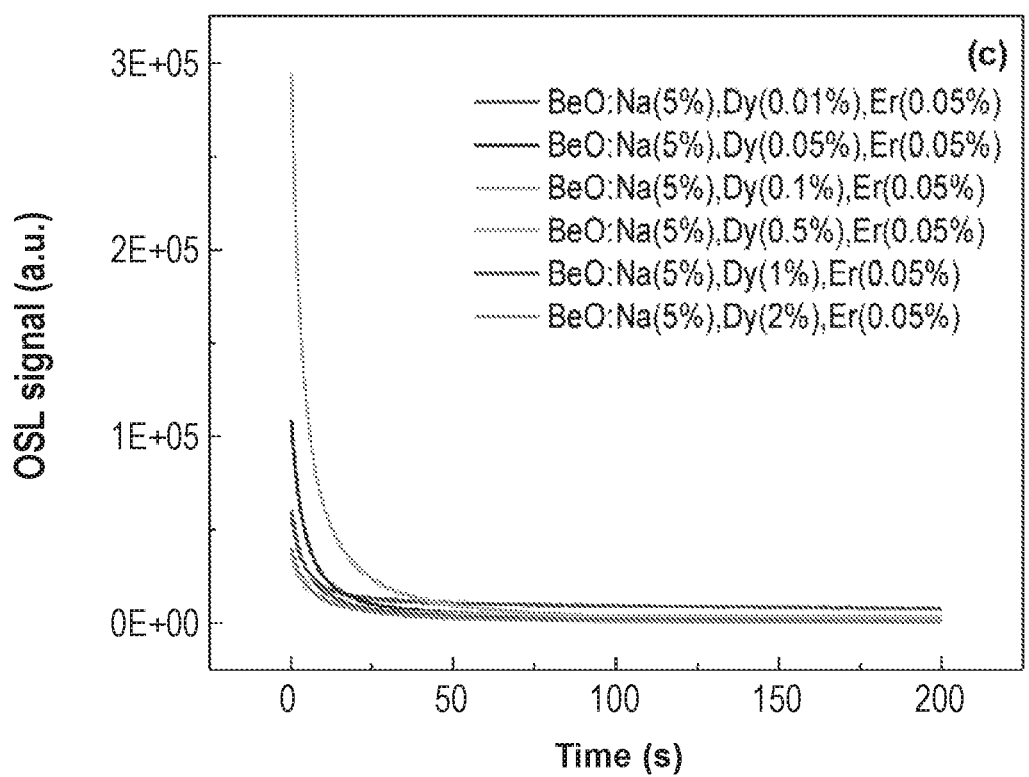
Figure 23D:
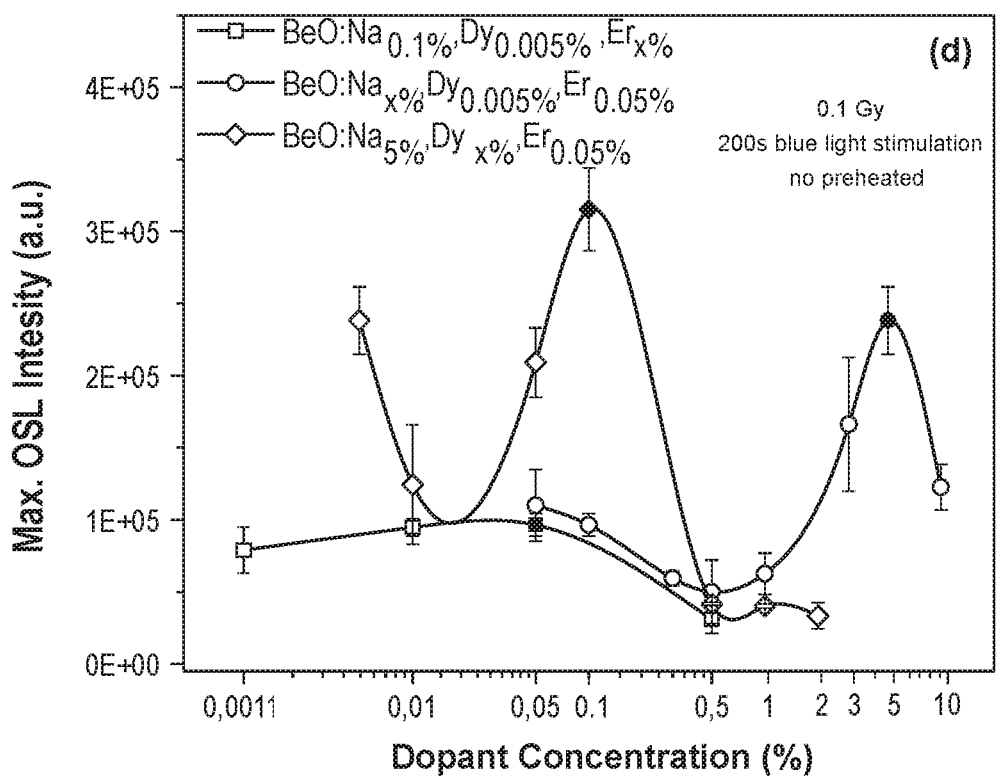

Finally, keeping constant the determined concentrations of Er (0.05%) and Na (5%), Dy ion were doped at concentrations of 0.01, 0.05, 0.1, 0.5, 1, 2% molar. In the same way, the OSL signals of each produced pellets were obtained and given in FIG. 23C. The highest luminescence signals were observed from BeO:Na(5%), Dy(0.1%), Er(0.05%) samples. Maximum intensities of OSL signals for 0.1 Gy beta irradiation from the triple combination of all Na, Dy and Er doped BeO pellets was illustrated in FIG. 23D.

Example 4—Synthesis of BeO:Mg(x % Molar)

Beryllium oxide phosphors were prepared with different concentrations of magnesium (Mg) ion as a dopant according to the same procedures as in Example 1.

Figure 24A:
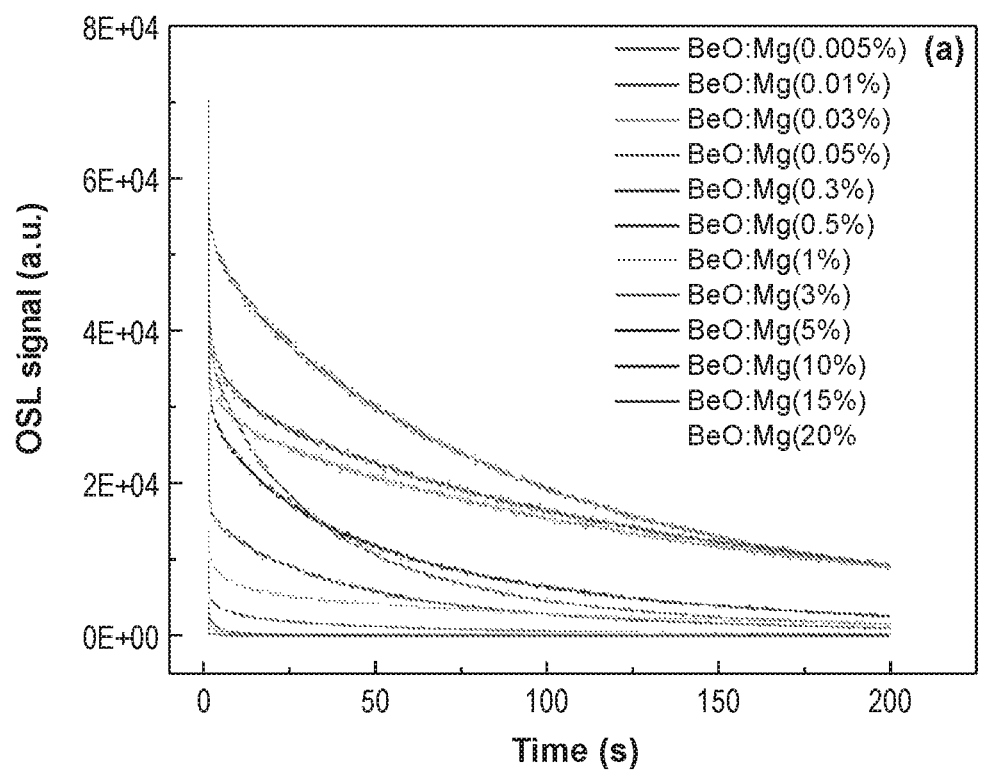
FIGS. 24 A and B. OSL decay curves (a) and integrated OSL signals (b) obtained from different concentrations of Mg doped BeO pellets.
Figure 24B:
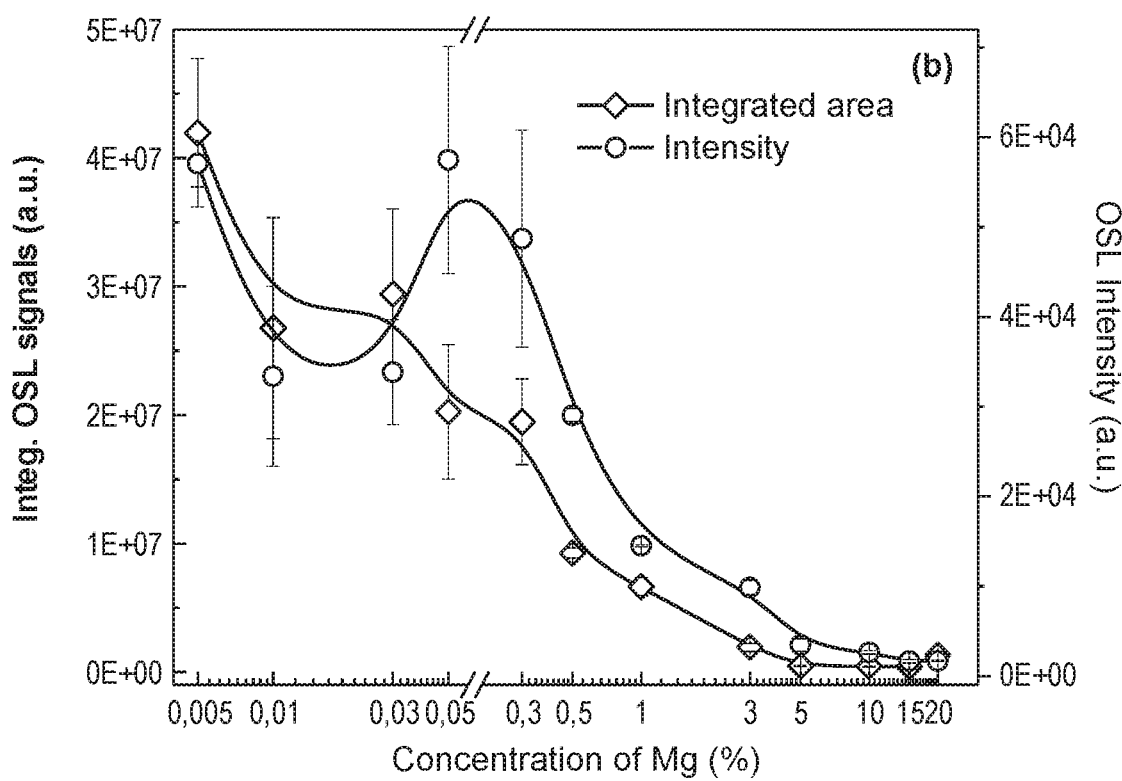

Firstly, magnesium was used as a dopant with different concentrations (0.005, 0.01, 0.03, 0.05, 0.3, 0.5, 1, 3, 5, 10, 15, 20% mole) OSL measurements were carried out using Risø, DA-20 model TL/OSL reader system (see FIG. 24A). With the aim of checking the possibility of using OSL signals of BeO:Mg pellets for dosimetric purposes, Luminescence signals were obtained from BeO:Mg pellets which were irradiated with 0.1 Gy dose. Before the OSL measurements, BeO:Mg pellets were annealed at 650° C. for 20 min and the measurements started after half an hour of waiting at the room temperature for stabilization of traps. According to obtained OSL signals, concentration of magnesium was determined as 0.05 and 0.3% mole (see FIG. 24B).

Synthesis of BeO:Mg(x %), Al(x %), BeO:Mg(x %), Ca(x %) and BeO:Na(x %), Mg(x %), Ca(x %)

Beryllium oxide phosphors were prepared in the same way with different concentrations of the double combinations of Mg—Al and Mg—Ca and the triple combinations of Na—Mg—Ca ions according to the same procedures as in Example 1.

Figure 25A:
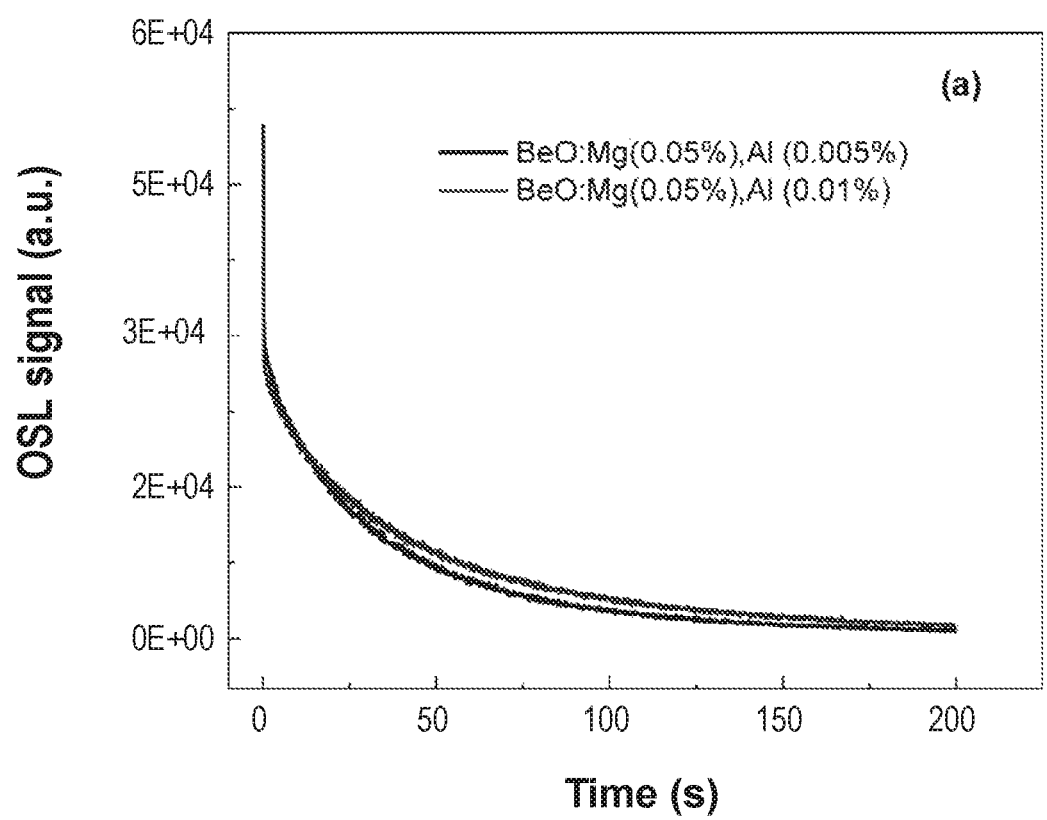
FIGS. 25 A, B, and C. OSL decay curves of BeO:Mg,Al (a); BeO:Mg,Ca (b) and BeO:Mg,Ca,Al (c) pellets.
Figure 25B:
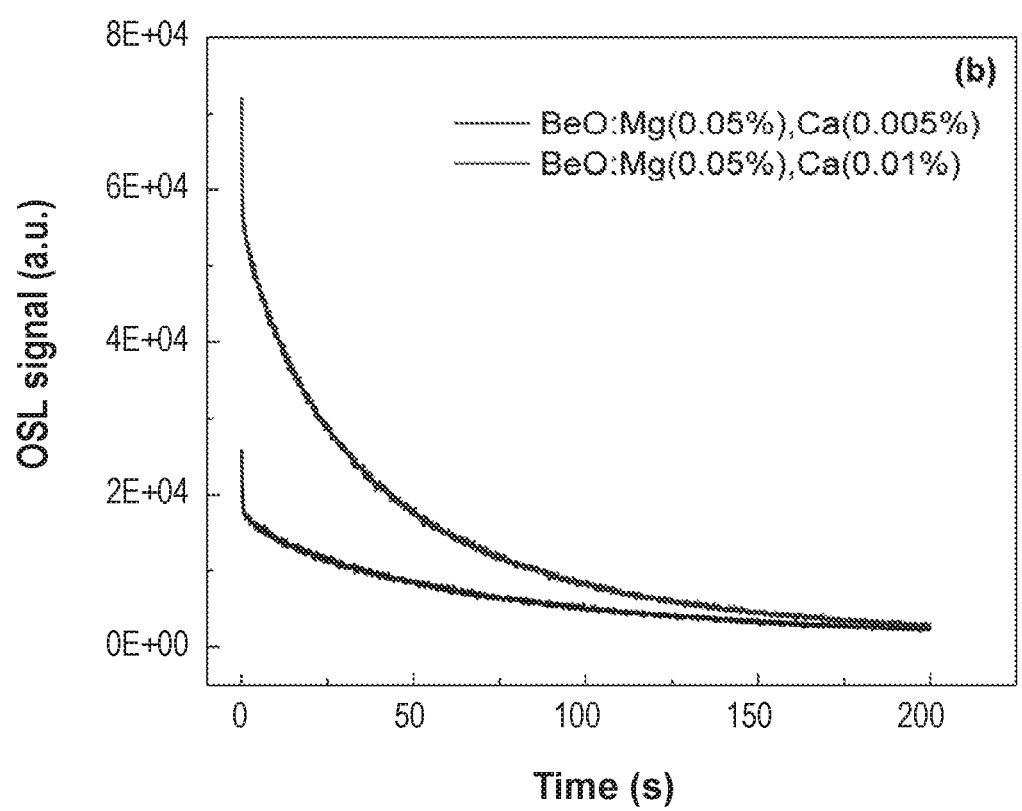
Figure 25C:
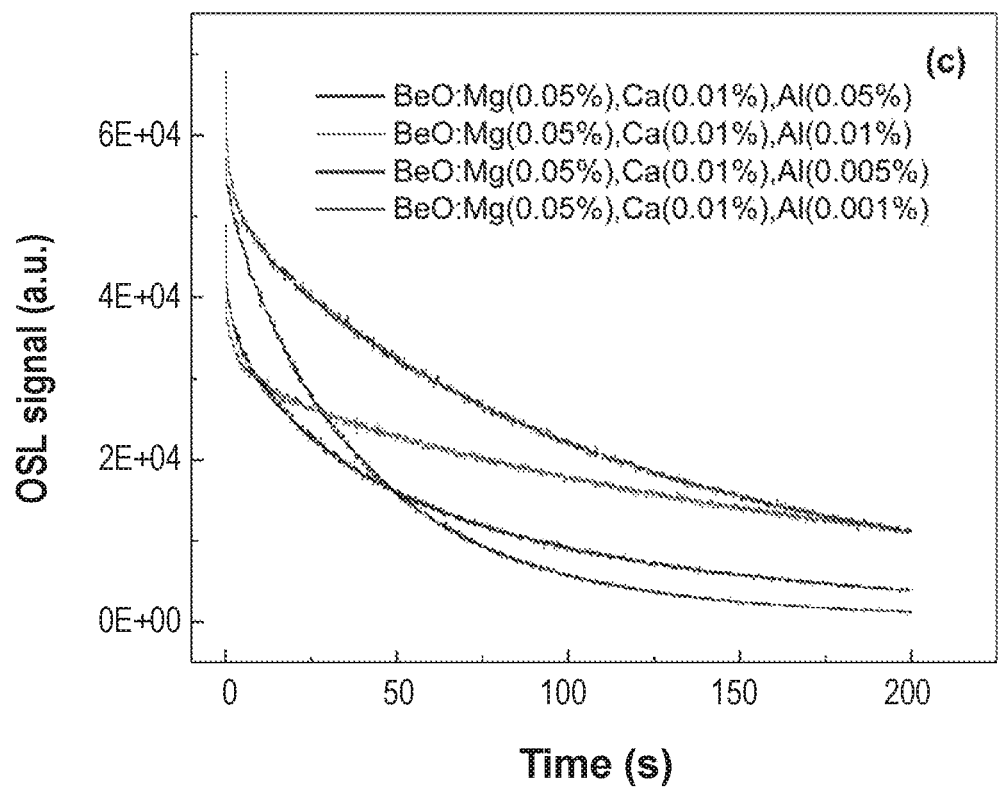

When Al $(Al(NO_3)_3.9H_2O)$ and Ca $(Ca(NO_3)_2.4H_2O)$ ions in different concentrations (0.005, 0.01% molar) were doped separately and together to the BeO:Mg(0.05 and 0.3%), the highest OSL signals were obtained from BeO: Mg(0.05%), Ca(0.01%). Whereupon, to improve the trap structure, create different energy levels and increase the OSL signals, Al $(Al(NO_3)_3.9H_2O)$ ion was doped keeping constant the concentration of Mg and Ca ions as 0.05% and 0.01% molar, respectively (FIGS. 25A and B). In this process, the concentrations of the Al ions were chosen as 0.001, 0.005, 0.01, 0.05% molar. The highest OSL signals were obtained from the BeO:Mg(0.05%), Ca(0.01%), Al(0.05%) (see FIG. 25C).

Synthesis of BeO:Mg(x %), Er(x %), Dy(x %)

In addition, beryllium oxide phosphors were also prepared with different concentrations of the triple combinations of Mg—Er—Dy ions according to the same procedures as in Example 1.

Figure 26A:
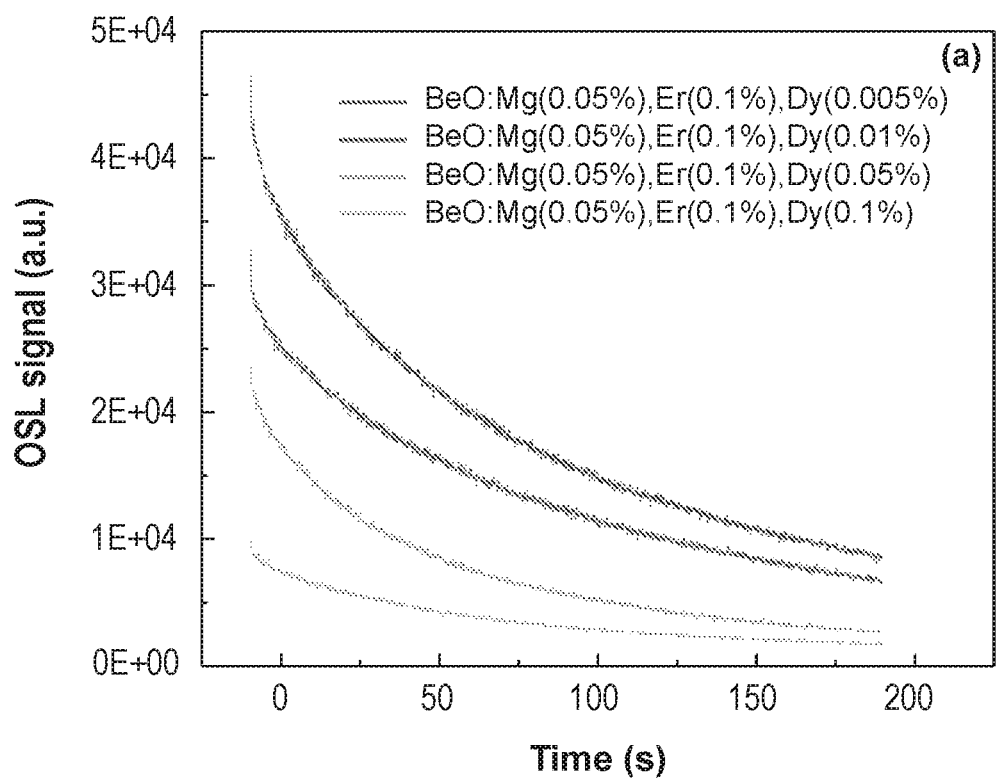
FIGS. 26 A and B. (a) and (b) OSL decay curves obtained from BeO pellets doped with different concentrations of Mg, Er and Dy.
Figure 26B:
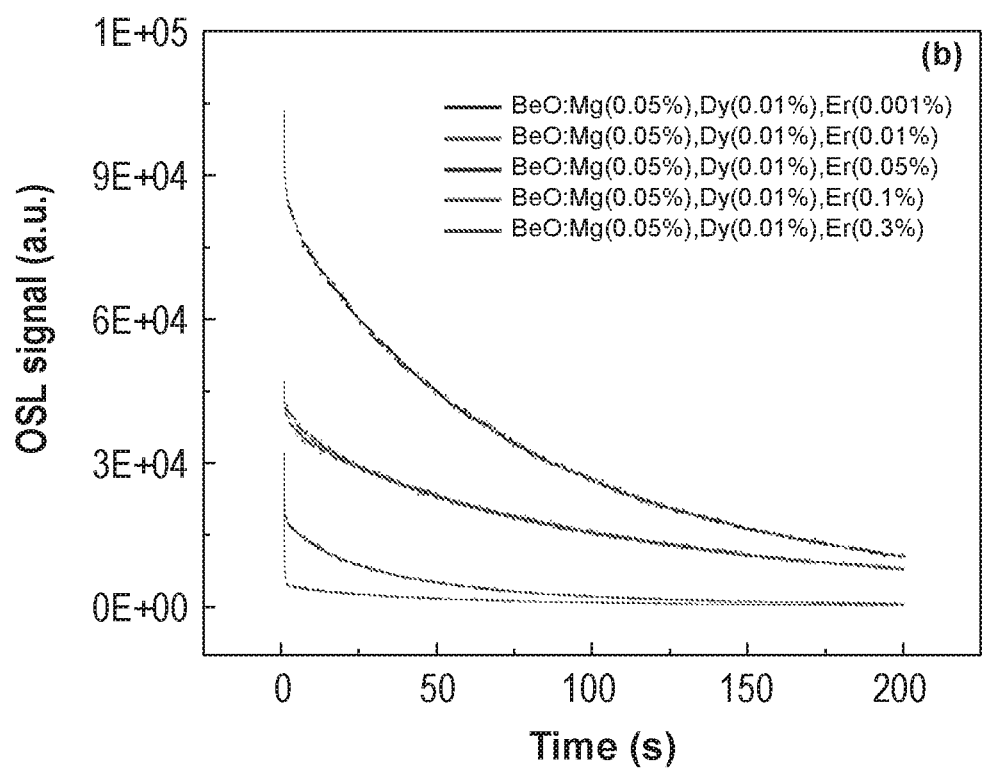
Figure 27:
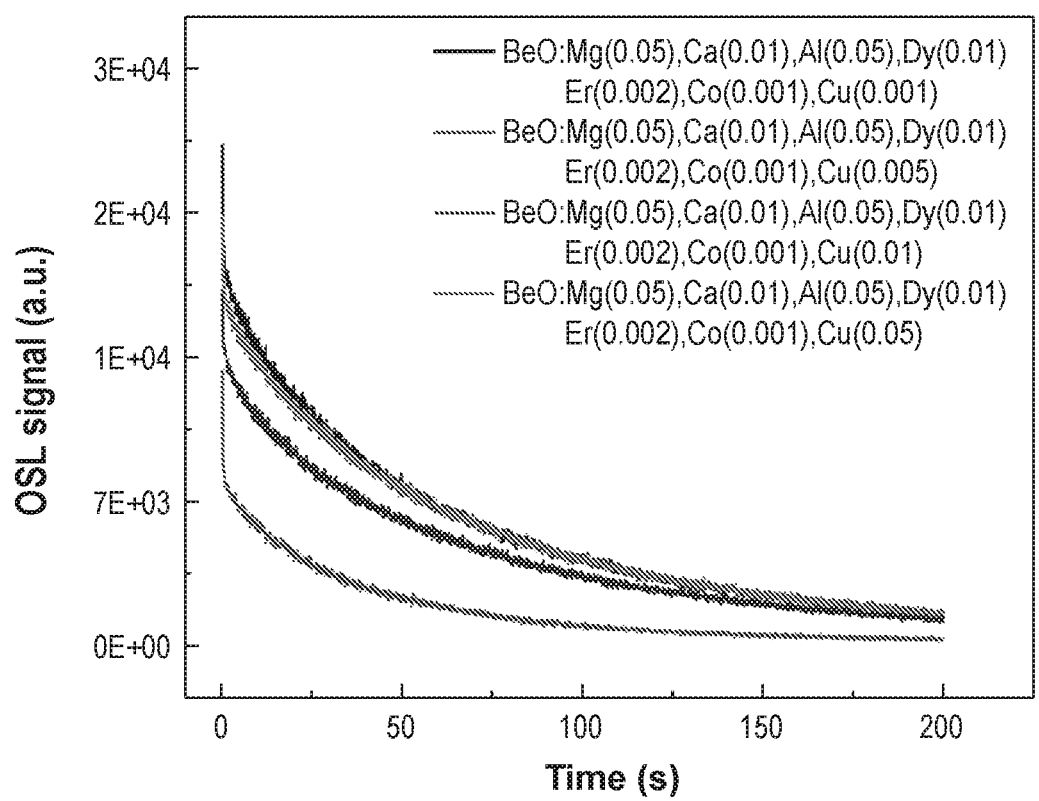
FIG. 27. OSL decay curves obtained from doped with Mg, Ca, Al, Dy, Er, ions and different concentrations of Co and Cu.

In order to improve the OSL signals obtained from BeO:Mg(0.05%) samples, lanthanide ions Erbium and Dysprosium were doped to BeO:Mg(0.05%) compound keeping constant Er concentration as 0.1% and changing Dy concentrations as 0.005, 0.05, 0.01 and 0.1%) (FIG. 26A). After applying this procedure, OSL signals were obtained for each doped BeO samples and according to OSL results, the suitable OSL signals were achieved when Dy concentration was chosen as 0.01% molar. After the determination of the suitable Dy concentration, Er with the concentrations of 0.001, 0.005, 0.01, 0.05% molar was doped keeping constant Dy concentration as 0.01% molar (FIG. 26B). Finally, OSL signals were recorded from the pellets and the highest OSL signal was recorded from BeO:Mg(0.05%), Dy(0.01%), Er(0.001) pellets.

Synthesis of BeO:Mg(x %), Ca(x %), Al(x%), Dy(x %), Er(x %), Co(x %), Cu(x %)

After the determination of the Mg, Al, Ca, Er and Dy ion concentrations, Cobalt and Copper ions were doped to BeO:Mg(0.05%),Ca(0.01%),Al(0.05%),Dy(0.01%),Er (0.001%) compound using the concentration of Cobalt as 0.001% molar and changing the concentrations of Copper as 0.001, 0.005, 0.01, 0.05% molar. In order to understand the effect of doping Co and Cu ions on BeO:Mg,Ca,Al,Dy,Er samples, OSL signals were obtained from the each pellets and the highest luminescence signals were observed in BeO:Mg(0.05%),Ca(0.01%),Al(0.05%),Dy(0.01%),Er (0.001%),Co(0.001%),Cu(0.001%). Comparing the results of the OSL signals from BeO:Mg(0.05%),Dy(0.01%),Er (0.001), a decline of 60% in signals was observed (see FIG. 37).

Synthesis of BeO:Mg(x %),Ce(x %) and BeO:Mg(x %),Ce(x %),Li(x %)

On the other hand, beryllium oxide phosphors were also prepared with different concentrations of the double combinations of Mg—Ce and the triple combinations of Mg—Ce—Li ions according to the same procedures as in Example 1.

Figure 28A:
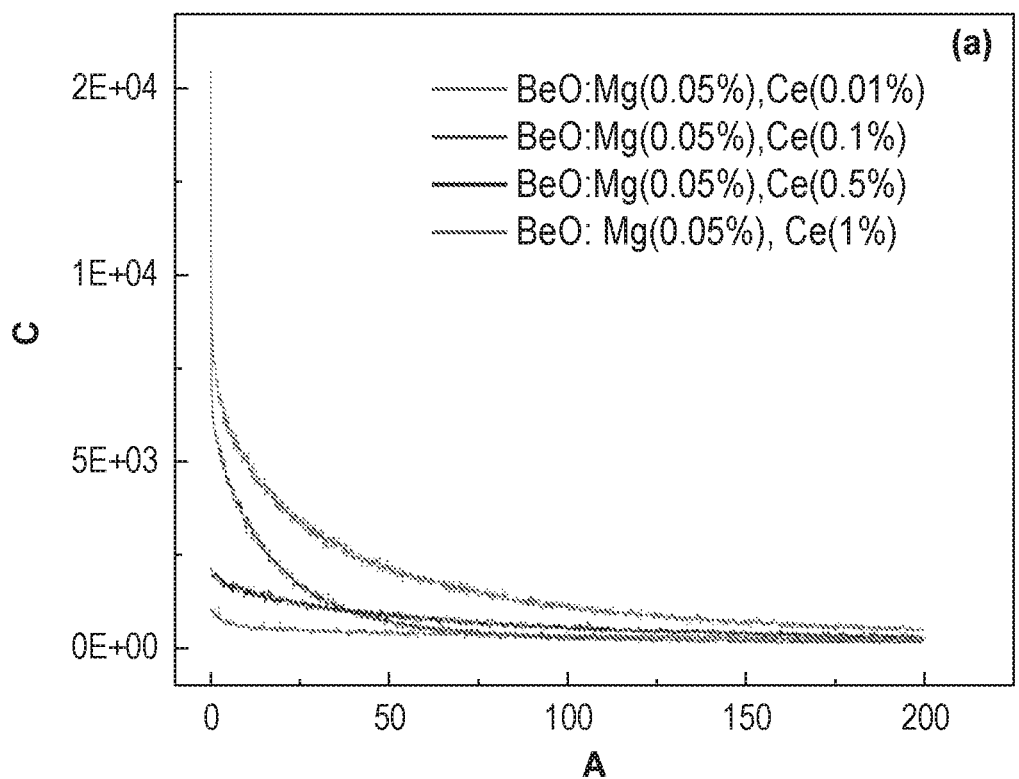
FIGS. 28 A, B, and C. (a), (b) and (c) OSL decay curves obtained from BeO pellets doped with different Mg, Ce and Li concentrations.
Figure 28B:
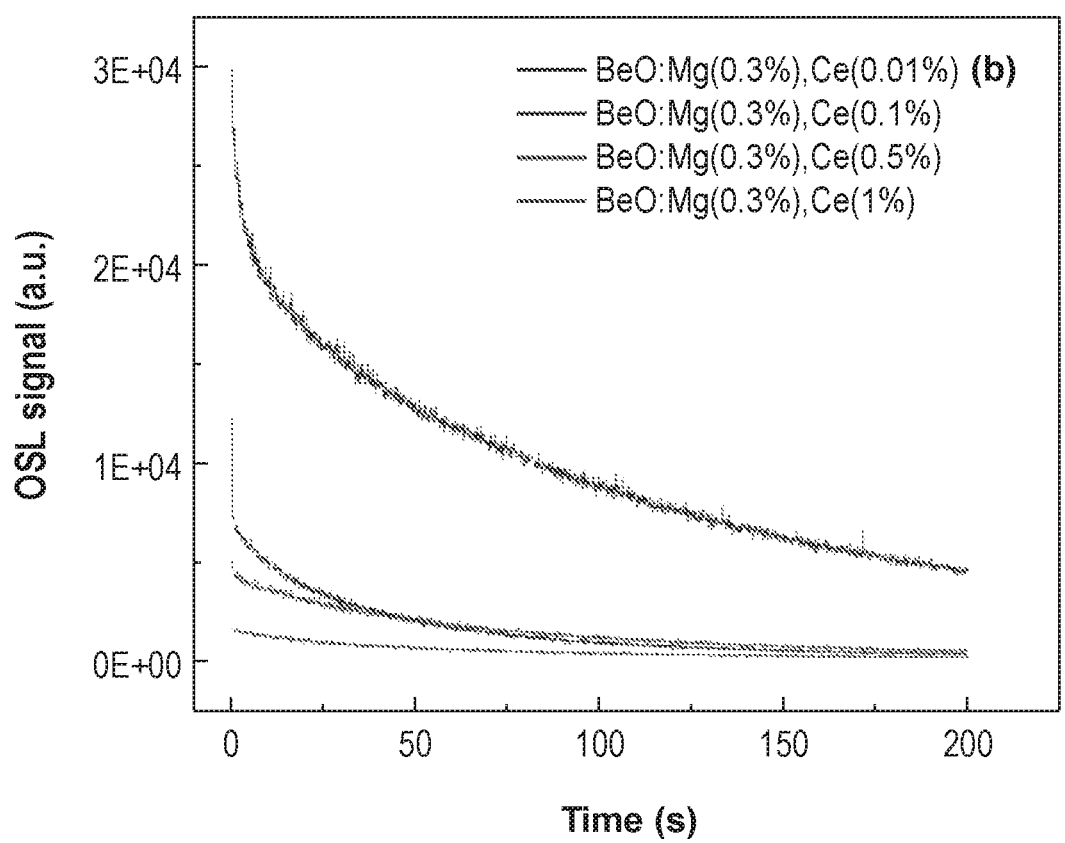
Figure 28C:
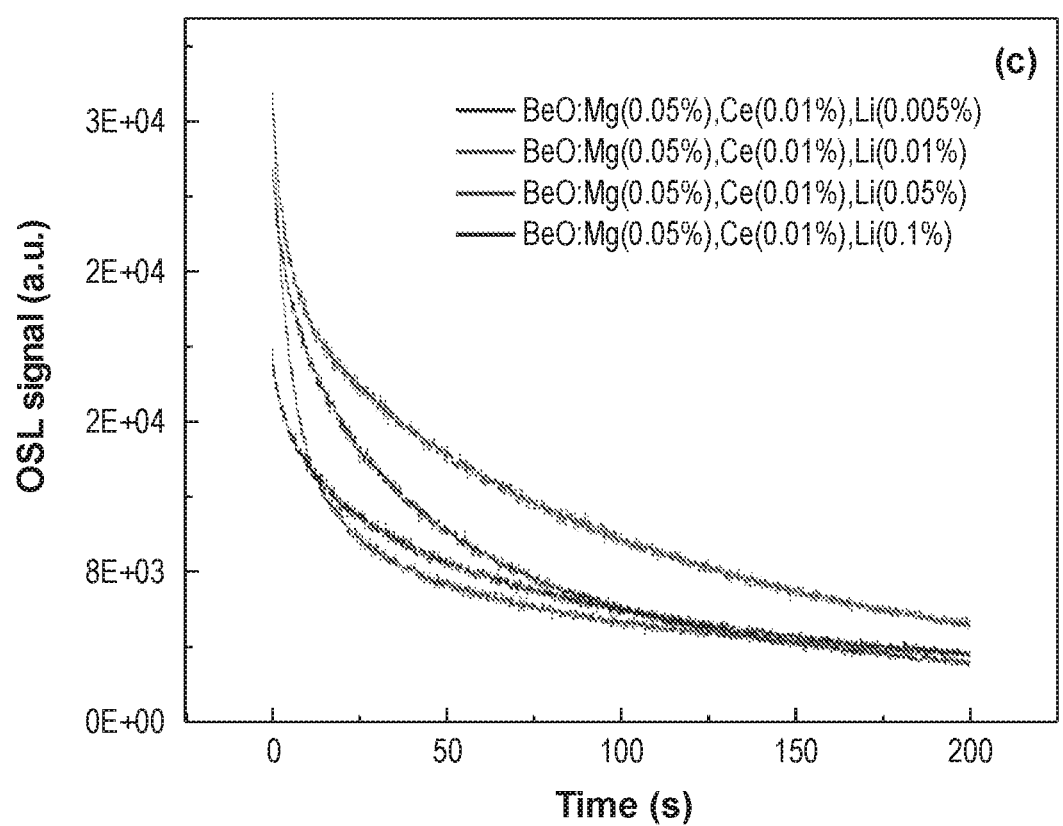

In addition to use of Mg as an additive at determined concentration, Cerium (Ce(NO$_3$)$_3$.6H$_2$O) was added with different concentrations (0.01, 0.1, 0.5, 1% molar) into each of BeO doped with the concentrations of magnesium with 0.3 and 0.05% molar (FIGS. 28A and 28B). After this synthesized and preparation process as mentioned example 1, OSL signals were obtained from product pellets. As a result, the highest OSL signal was observed from BeO:Mg (0.3%),Ce(0.01%) and BeO:Mg(0.05%),Ce(0.01%). After the determination of the suitable Mg and Ce concentrations, Lithium (LiNO$_3$) ion was doped keeping constant the concentration of Mg and Ce ions as 0.05% and 0.01% molar, respectively. In this process, the concentrations of the Li ions were chosen as 0.005, 0.01, 0.05, and 0.1% molar. The highest OSL signals were obtained from the BeO:Mg (0.05%),Ce(0.01%), Li(0.01%) (FIG. 28C).

Example 5—Synthesis of BeO:Tb(x %),Gd(x %)

Figure 29:
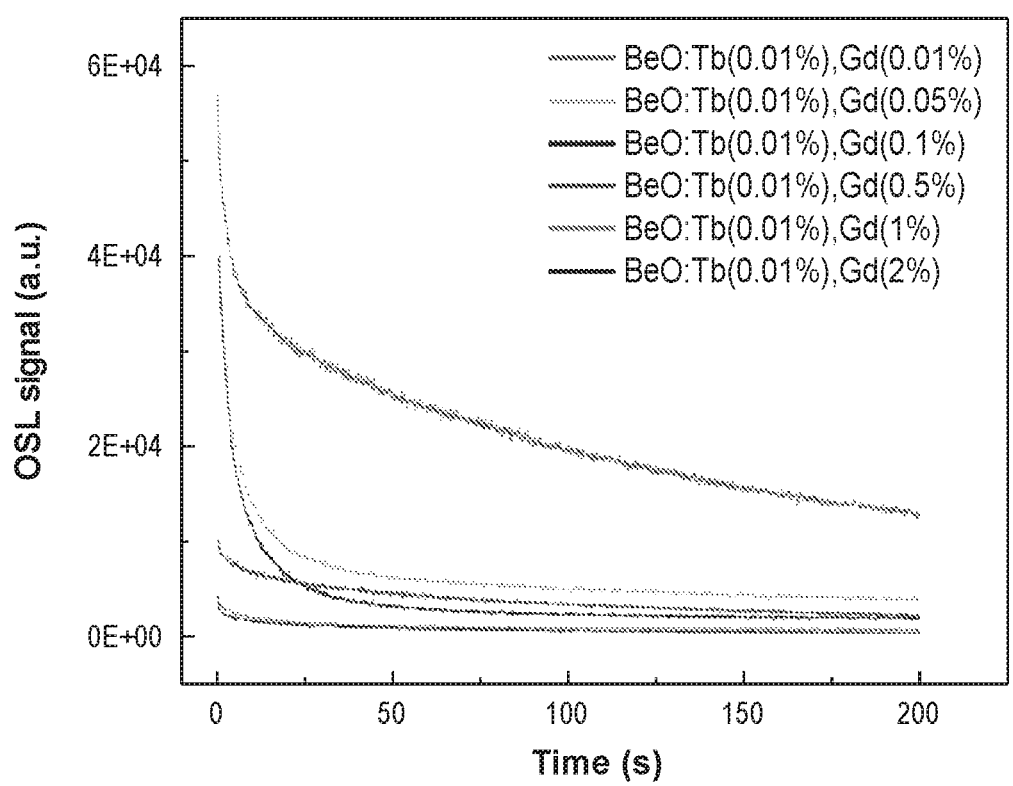
FIG. 29. OSL decay curves obtained from BeO pellets doped with different concentrations of Tb and Gd.

Another doping to the BeO material is the terbium (Tb)-gadolinium (Gd) combinations. BeO phosphors doped with this combination were prepared according to the same procedures as in Example 1. Tb concentrations was kept constant as 0.01% molar and Gd concentrations were chosen as 0.01, 0.05, 0.1, 0.5, 1 and 2% molar. The highest OSL signal was observed from the BeO:Tb(0.01%),Gd(0.01%), as seen in FIG. 29.

Example 6—Synthesis of BeO:Al(x %),Ca(x %), (Lanthanides) Using Another Technique BeO phosphors were obtained with another technique which is the Sol-Gel method and the lanthanides were used as a dopant ion during the production method. The ions doped by the sol-gel method were performed in triple combination with constant concentration of Al (1% molar) and Ca (0.1% molar) dopants and nitrate-based lanthanides La, Ce, Pr, Nd, Sm, Eu, Gd, Tb, and Dy.

In this technique, the starting material was Beryllium sulfate tetra-hydrate as the precursor for the inorganic component, and Ethylene glycol solution and citric acid salts was chosen as an organic complexing/fuel agent. A certain amount of BeSO$_4$ was dissolved in ethylene glycol on the magnetic stirrer, then the hot plate of magnetic stirrer was turned on and a certain amount of citric acid was added. Hot-plate temperature was increased slowly up to about 300° C. through 2 hours. At this stage the amount of water in the environment gradually evaporated and it became a gel form. When the all medium was converted to gel form, the magnetic stirrer was taken, and the gel solution was fired in furnace at 500° C. for 1-2 hours. Since the gel form cannot be separated easily from the beaker, this burning process was carried out. Obtained material was in charred form after the burning treatment. Therefore, the charred material was exposed a second heat treatment to ensure the crystal structure and burn the material to obtain a white powder. Finally, a white soft BeO powder was obtained by calcination treatment at 800° C. for 4 hours. This production method and dopants show a relatively lower brightness than the precipitation method.

Figure 30:
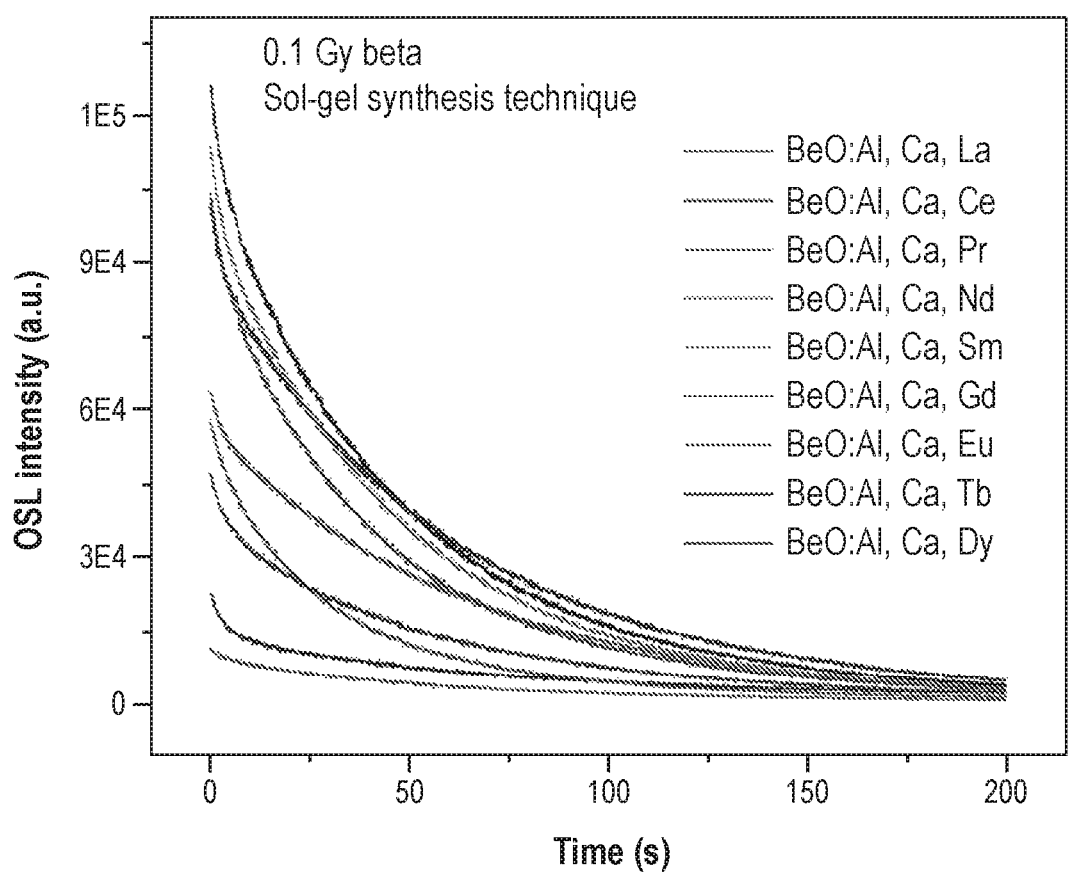
FIG. 30. OSL decay curves for 0.5 Gy beta irradiation from BeO pellets doped with different Al, Ca and some lanthanides concentration, which the Al and Ca concentrations were kept constant.

Preparation of luminescent phosphor pellets is applied heat treatment to material after pressing it by cold pressing. This process is convenient for shaping the phosphorus, and at the same time it is a process in which the crystallographic structure is arranged, and the phosphor is made brighter. Heat treatment depends on both the basic material BeO and the small amount of doped ions. After the pelletization process, BeO:Al(1%),Ca(0.1%), (La, Ce, Pr, Nd, Sm, Eu, Gd, Tb, Dy 1%) sintered at 1600° C. for 4 hours. OSL measurements were carried out using Risø, DA-20 model TL/OSL reader system. With the aim of checking the possibility of using OSL signals of BeO:Al(1%),Ca(0.1%), (La, Ce, Pr, Nd, Sm, Eu, Gd, Tb, Dy 1%) pellets for dosimetric purposes, Luminescence signals were obtained from doped BeO pellets which were irradiated with 0.1 Gy dose. Before the OSL measurements, doped BeO pellets were annealed at 650° C. for 20 min and the measurements started after half an hour of waiting at the room temperature for stabilization of traps. According to obtained OSL signals, the brightest samples were determined as BeO:Al(1%),Ca(0.1%),La(1%) pellets (see FIG. 30).

Example 7—Synthesis of BeO:Na(x %),Er(x %),Dy(x %) Using a New Technique

BeO phosphors doped with Na, Er and Dy were produced by a new method followed by heat treatment.

In this method, citric acid (C$_6$H$_8$O$_7$, ACS reagent, ≥99.5%) and ethylene glycol (C$_2$H$_6$O$_2$, Anhydrous, 99.8%) solution was chosen to construct the polymer in the solution and create organic complex/fuel agent, respectively. Firstly, stoichiometric quantities of Beryllium sulfate tetra hydrate (BeSO$_4$.4H$_2$O, ≥99.0%) as starting material was solved in ethylene glycol solution using magnetic stirrer and nitrate based doping materials (Sodium nitrate (NaNO$_3$≥99.0%), Erbium (II) nitrate pentahydrate (Er(NO$_3$)$_3$·5H$_2$O≥99.9%) and Dysprosium (III) nitrate hydrate (Dy(NO$_3$)$_3$·xH$_2$O≥99.9%)) were added to this solution at certain concentrations. Then, citric acid was added in this beryllium sulfate-ethylene glycol solution. Ammonium hydroxide solution (H$_5$NO, ACS reagent, 28.0-30.0% NH$_3$ basis) was added to this solution, which had a pH value of about 2-3. It was obtained the solution which the pH value ~7 after stirring for 10 min. At the same time, a certain amount of Poly(ethyleneimine) solution (50% (w/v) in H$_2$O) was diluted with water in another beaker. And now we have 2 solutions. One of them is beryllium sulfate-ethylene glycol-citric acid solution (including dopant ions) and the other is diluted poly solution. Now we add the two mixtures together to obtain the material as a precipitate. Diluted poly(ethyleneimine) solution was added to beryllium sulfate solution under vigorous stirring and precipitate particles were observed homogeneously.

Figure 31:
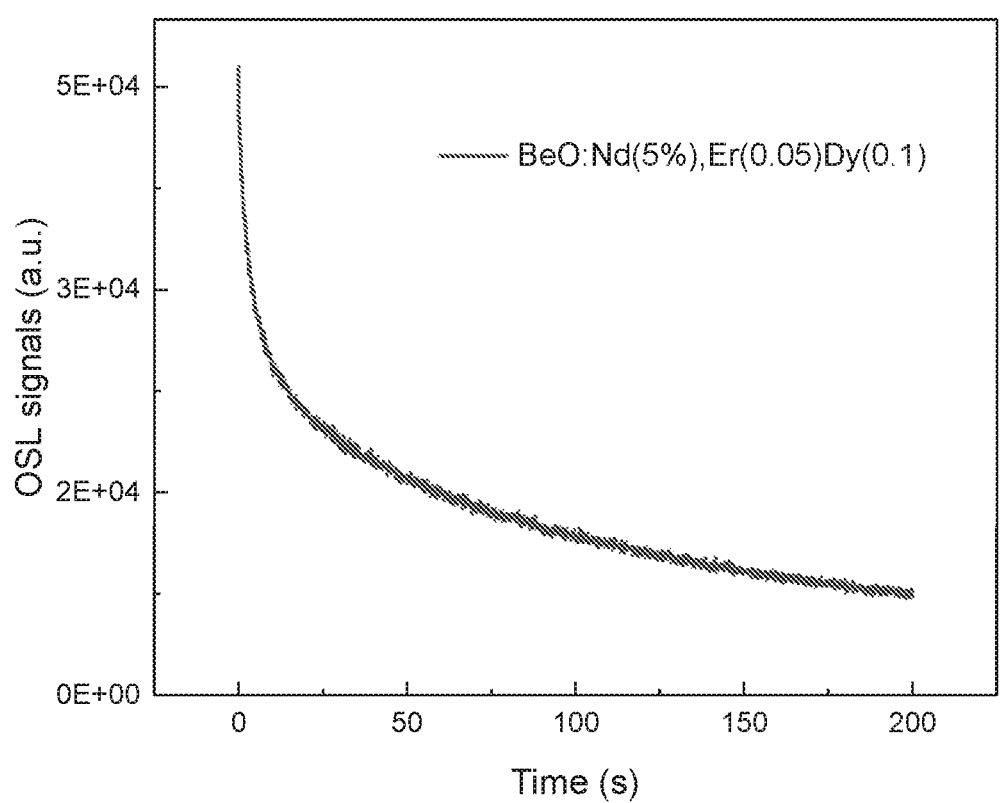
FIG. 31. OSL decay curve obtained from BeO:Na,Dy,Er pellet synthesized using an unusual method (Vol-Vey) followed by heat treatment.

Obtained final solution become the dark brown gel after dried on the heater about 3 hours. In order to burn formed organics, the dried sample was burned at 500° C. with 2° C./min heating rate for 1 hours in an oxygen atmosphere. Dried sample was obtained as charred powder after heat treatment and it was calcined at 800° C. with 5° C./min. Calcined powder was ground in agate mortar and prepared in pellet form by evacuable pellet die. In order to impart strength and integrity, prepared BeO pellets were sintered using a box furnace at 1600° C. for 4 hours (with 5° C./s heating rate) in the middle of two alumina boat crucibles. In the same way, after β-irradiation with 0.1 Gy, the OSL decay curve of the produced pellets was obtained using Risø, DA-20 model TL/OSL reader system and given in FIG. 31.

What is claimed is:

1. A polycrystalline powder capable of storing energy of incident ionizing radiation and releasing at least part of the stored energy upon optical stimulation and heating, the polycrystalline powder comprising a base material comprising beryllium oxide (BeO) and of the following dopants or combinations of dopants:
    (a) dysprosium (Dy), erbium (Er), and optionally sodium (Na);
    (b) magnesium (Mg) and optionally at least one additional dopant selected from the group consisting of aluminum (Al), sodium (Na), dysprosium (Dy), erbium (Er), calcium (Ca), lithium (Li), copper (Cu), cobalt (Co), terbium (Tb), gadolinium (Gd), lanthanum (La), cerium (Ce), praseodymium (Pr), neodymium (Nd), samarium (Sm), and europium (Eu);
    (c) terbium (Tb) and gadolinium (Gd); or
    (d) aluminum (Al), calcium (Ca), and lanthanum (La).

2. The polycrystalline powder of claim 1, wherein at least one of the following applies:
    (a) the Na is present in the base material and comprises a percentage of the base material of between 0.05% and 10% by mole;
    (b) the Dy is present in the base material and comprises a percentage of the base material of between 0.01% and 2% by mole;
    (c) the Er is present in the base material and comprises a percentage of the base material of between 0.001% and 0.5% by mole.

3. The polycrystalline powder of claim 1, wherein at least one of following applies:
    (a) the Na is present in the base material and comprises a percentage of the base material of about 5% by mole;
    (b) the Dy is present in the base material and comprises a percentage of the base material of about 0.1% by mole;
    (c) the Er is present in the base material and comprises a percentage of the base material of about 0.05% by mole.

4. The polycrystalline powder of claim 1, wherein the polycrystalline powder material includes at least two metastable thermoluminescence (TL) charge traps.

5. The polycrystalline powder of claim 4, wherein the at least two metastable TL charge traps have at least two delocalization temperatures which are selected from the group consisting of about 200° C., about 350° C., and about 500° C.

6. The polycrystalline powder of claim 5 wherein at least one of:
    (a) the metastable TL charge trap having a delocalization temperature of about 200° C. contributes to generation of an optically-stimulated luminescence (OSL) signal;
    (b) the metastable TL charge trap having a delocalization temperature of about 350° C. contributes to generation of an optically-stimulated luminescence (OSL) signal; and
    (c) the metastable TL charge trap having a delocalization temperature of about 500° C. does not contribute to generation of an optically-stimulated luminescence (OSL) signal.

7. The polycrystalline powder of claim 1, wherein the base material comprises:
    (a) about 0.005% Dy and about 0.05% Er by mole;
    (b) about 5% Na, about 0.1% Dy, and about 0.05% Er by mole;
    (c) about 0.05% or about 0.3% Mg by mole;
    (d) about 0.05% Mg and about 0.01% Ca by mole;
    (e) about 0.05% Mg, about 0.01% Ca, and about 0.05% Al by mole;
    (f) about 0.05% Mg, about 0.01% Dy, and about 0.001% Er by mole;
    (g) about 0.05% Mg, about 0.01% Ca, about 0.05% Al, about 0.01% Dy, about 0.001% Er, about 0.001% Co, and about 0.001% Cu by mole;
    (h) about 0.3% or about 0.05% Mg and about 0.01% Ce by mole;
    (i) about 0.05% Mg, about 0.01% Ce, and about 0.01% Li by mole;
    (j) about 0.01% Tb and about 0.01% Gd by mole; or
    (k) about 1% Al, about 0.1% Ca, and about 1% La by mole.

8. A method for preparing the polycrystalline powder of claim 1, comprising:
    (a) dissolving a beryllium (Be) salt in distilled water to provide a base material solution;
    (b) adding to the base material solution a first dopant comprising sodium (Na) to provide a doped material;
    (c) adding to the doped material a second dopant comprising dysprosium (Dy) to provide a Na,Dy—BeO doped material;
    (d) adding to the Na,Dy—BeO doped material a third dopant comprising erbium (Er) to form to provide a Na,Dy, Er—BeO solution;
    (e) forming a white precipitate from the Na,Dy,Er—BeO solution; and
    (f) drying the white precipitate to provide the polycrystalline powder.

9. The method of claim 8, wherein at least one of:
    (a) the beryllium salt is $BeSO_4$;
    (b) the first dopant comprising Na is $NaNO_3$;
    (c) the second dopant comprising Dy is $(Dy(NO_3)_3)$; and
    (d) the third dopant comprising Er is $(Er(NO_3)_3)$.

10. The method of claim 8, wherein the forming of the white precipitate comprises:
    (a) adding a solution of polyethyleneimine Na,Dy,Er—BeO solution; and
    (b) adding a sufficient amount of ammonium hydroxide to the solution to adjust the pH to nearly 7 to form the white precipitate.

11. The method of claim 8, wherein the drying of the white precipitate comprises heating the white precipitate at a temperature of about 200° C. to 400° C. on a hot plate to form the polycrystalline powder.

12. The method of claim 8, further comprising heating the polycrystalline powder with a heating rate of 5° C. per minute up to a temperature of 800° C. and maintaining the temperature for a period of time of 4 hours in an ash furnace, in an oxygen atmosphere to provide calcined polycrystalline solid BeO:Na,Dy,Er.

13. The method of claim 12, further comprising the step of cold pressing of the calcined polycrystalline powder with a weight of about 25 mg under 250 kg-force/cm$^2$ pressure for 1 min to provide a polycrystalline powder in pellet form.

14. The method of claim 13, wherein the polycrystalline powder in pellet form has a diameter of about 6 mm and a thickness of about 0.8 mm.

15. The method of claim 14, wherein the polycrystalline powder in pellet form is sintered at a temperature of about 1600° C. in an ash furnace for about 4 hours in an atmosphere to provide BeO:Na,Dy,Er ceramic pellets, which are optionally cooled to room temperature in the furnace.

16. A method of preparing a phosphor-doped BeO compound in ceramic pellet dosimeter form, comprising the polycrystalline powder of claim 1, suitable for use in an optically stimulated luminescence radiation dosimeter, comprising:
1) preparing a mixture of undoped beryllium sulfate base material and ethylene glycol in a stoichiometric ratio;
2) preparing a mixture of solutions comprising undoped beryllium sulfate base material and at least three dopants selected from the group sodium (Na), dysprosium (Dy), and erbium (Er), wherein:
  (a) the first dopant comprising sodium (Na) comprises a percentage of the beryllium sulfate base material of about 5% by mole;
  (b) the second dopant comprising dysprosium (Dy) comprises a percentage of the beryllium sulfate base material of about 0.1% by mole; and
  (c) the third dopant comprising erbium (Er) comprises a percentage of the beryllium sulfate base material of about 0.05% by mole;
3) adding citric acid to the mixture of step 2);
4) adding an ammonium hydroxide solution to the mixture of step 3) and stirring the mixture for about 10 minutes until a pH value of about 7 is obtained;
5) diluting a poly(ethyleneimine) solution (50% (w/v) in $H_2O$) with double distilled water;
6) adding the solution of step 4) and the solution of step 5) together under vigorous stirring to obtain a precipitate;
7) heating the precipitate on a hot plate at 350° C. for 3 hours to provide an organic gel;
8) heating the organic gel in an ash furnace to a temperature of 500° C. with a heating rate of 2° C. per minute, and maintaining the temperature at 500° C. for 1 hour in an oxygen atmosphere to provide a polycrystalline powder;
9) cooling the polycrystalline powder in the ash furnace to room temperature to obtain a charred powder;
10) heating the charred powder in the ash furnace to a temperature of 800° C. with a heating rate of 5° C. per minute, and maintaining the temperature at 800° C. for 4 hour in an oxygen atmosphere to obtain a polycrystalline powder;
11) crushing the polycrystalline powder of step 10);
12) cold pressing the polycrystalline powder of step 11) for a period of time sufficient to prepare a pellet, wherein the cold pressing is conducted at room temperature with a weight of about 25 mg under 250 kg-force/cm$^2$ pressure for 1 min to provide a polycrystalline powder in pellet form;
13) sintering the pellet of step 12) in an ash furnace at 1600° C. for 4 hour in a reducing atmosphere; and
14) cooling the pellets of step 13) to room temperature.

* * * * *